(12) United States Patent
Gan et al.

(10) Patent No.: US 9,854,654 B2
(45) Date of Patent: Dec. 26, 2017

(54) SYSTEM AND METHOD OF CONTROL OF A PROGRAMMABLE LIGHTING FIXTURE WITH EMBEDDED MEMORY

(71) Applicant: PQJ Corp, Valencia, CA (US)

(72) Inventors: Quan Gan, Castaic, CA (US); Jun Dong, Shanghai (CN)

( * ) Notice: Subject to any disclaimer, the term of this patent is extended or adjusted under 35 U.S.C. 154(b) by 0 days.

(21) Appl. No.: 15/423,566

(22) Filed: Feb. 2, 2017

(65) Prior Publication Data

US 2017/0223801 A1   Aug. 3, 2017

Related U.S. Application Data

(60) Provisional application No. 62/290,751, filed on Feb. 3, 2016.

(51) Int. Cl.
| | | |
|---|---|---|
| *H05B 37/02* | (2006.01) |
| *G06F 3/048* | (2013.01) |
| *G06F 3/0481* | (2013.01) |
| *G06F 3/0484* | (2013.01) |
| *G06F 3/0482* | (2013.01) |

(52) U.S. Cl.
CPC ....... *H05B 37/029* (2013.01); *H05B 37/0245* (2013.01); *G06F 3/0482* (2013.01); *G06F 3/04817* (2013.01); *G06F 3/04847* (2013.01)

(58) Field of Classification Search
CPC .................. H05B 37/029; H05B 37/0245
USPC ......................................... 315/292
See application file for complete search history.

(56) References Cited

U.S. PATENT DOCUMENTS

| | | |
|---|---|---|
| 4,964,065 A | 10/1990 | Hicks et al. |
| 5,627,885 A | 5/1997 | Paneth et al. |
| 5,769,527 A | 6/1998 | Taylor et al. |
| 6,016,038 A | 1/2000 | Mueller et al. |
| 6,150,774 A | 11/2000 | Mueller et al. |
| 6,175,201 B1 | 1/2001 | Sid |
| 6,181,499 B1 | 1/2001 | Hutchins et al. |
| 6,665,020 B1 | 12/2003 | Stahl et al. |
| 6,815,842 B2 | 11/2004 | Fehd et al. |
| 6,931,231 B1 | 8/2005 | Griffin |
| 6,967,448 B2 | 11/2005 | Morgan et al. |
| 6,976,448 B2 | 11/2005 | Morgan et al. |
| 7,228,190 B2 | 6/2007 | Dowling et al. |
| 7,324,836 B2 | 1/2008 | Steenstra et al. |
| 7,332,877 B2 | 2/2008 | Crodian et al. |
| 7,401,162 B2 | 7/2008 | Baker et al. |
| 7,427,840 B2 | 9/2008 | Morgan et al. |

(Continued)

FOREIGN PATENT DOCUMENTS

CN       203313466 U       5/2013

OTHER PUBLICATIONS

PCT/US2015/022570 ; Filing Date: Mar. 25, 2015; International Search and the Written Opinion; dated Jun. 16, 2015.

(Continued)

*Primary Examiner* — Dylan White
(74) *Attorney, Agent, or Firm* — Patent Law Agency, LLC; Peter Ganjian

(57) ABSTRACT

A computing device that displays graphic user interface (GUI) icons that represent index mapping of one or more functions of a firmware of a programmable apparatus, enabling transmission of a command as a command control signal packet to control the programmable apparatus by selection of any GUI icon.

9 Claims, 37 Drawing Sheets

(56) References Cited

U.S. PATENT DOCUMENTS

| | | |
|---|---|---|
| 7,450,085 B2 | 11/2008 | Thielemans et al. |
| 7,835,809 B2 | 11/2010 | Griffin, Jr. |
| 7,868,562 B2 | 1/2011 | Salsbury et al. |
| 7,994,732 B2 | 8/2011 | Zulch |
| 8,035,320 B2 | 10/2011 | Sibert |
| 8,115,407 B2 | 2/2012 | Chang et al. |
| 8,179,161 B1 | 5/2012 | Williams et al. |
| 8,229,721 B1 | 7/2012 | Desmet et al. |
| 8,279,079 B2 | 10/2012 | Bergman et al. |
| 8,299,721 B2 | 10/2012 | Smith |
| 8,386,266 B2 | 2/2013 | Feng et al. |
| 8,573,487 B2 | 11/2013 | McKelvey |
| 8,589,908 B2 | 11/2013 | Gupta et al. |
| 8,661,429 B2 | 2/2014 | Ruster et al. |
| 8,922,570 B2 * | 12/2014 | Archer ............... H05B 37/0245 345/204 |
| 9,204,519 B2 | 12/2015 | Gan et al. |
| 2002/0007510 A1 | 1/2002 | Mann |
| 2004/0212309 A1 | 10/2004 | St.-Germain |
| 2005/0070153 A1 | 3/2005 | Tang |
| 2005/0075134 A1 | 4/2005 | Steenstra et al. |
| 2008/0136334 A1 | 6/2008 | Robinson et al. |
| 2009/0024865 A1 | 1/2009 | Fugaro et al. |
| 2009/0085500 A1 | 4/2009 | Zampini, II et al. |
| 2009/0219305 A1 | 9/2009 | Diederiks et al. |
| 2010/0184479 A1 | 7/2010 | Griffin, Jr. |
| 2010/0283894 A1 | 11/2010 | Horan et al. |
| 2011/0035029 A1 * | 2/2011 | Yianni ............... H05B 37/029 700/90 |
| 2011/0109228 A1 | 5/2011 | Shimomura et al. |
| 2011/0131356 A1 | 6/2011 | Devam et al. |
| 2011/0137757 A1 | 6/2011 | Paolini et al. |
| 2011/0144778 A1 | 6/2011 | Fung et al. |
| 2011/0153885 A1 | 6/2011 | Mak et al. |
| 2011/0234119 A1 | 9/2011 | Zulch |
| 2012/0008851 A1 | 1/2012 | Pennock et al. |
| 2012/0013255 A1 | 1/2012 | Young |
| 2012/0026019 A1 | 2/2012 | Lin et al. |
| 2012/0086345 A1 | 4/2012 | Tran |
| 2012/0126722 A1 | 5/2012 | Archdale |
| 2012/0169249 A1 | 7/2012 | Loveland et al. |
| 2012/0225645 A1 | 9/2012 | Sivan |
| 2012/0231837 A1 | 9/2012 | Hilbrink et al. |
| 2012/0236160 A1 | 9/2012 | Rezek et al. |
| 2012/0290742 A1 | 11/2012 | Sun et al. |
| 2013/0018240 A1 | 1/2013 | McCoy |
| 2013/0073058 A1 | 3/2013 | Wei et al. |
| 2013/0130743 A1 | 5/2013 | Lin |
| 2013/0134891 A1 | 5/2013 | Woytowitz |
| 2013/0147367 A1 | 6/2013 | Cowburn |
| 2013/0207481 A1 | 8/2013 | Gobburu et al. |
| 2013/0221872 A1 | 8/2013 | Gan et al. |
| 2013/0249429 A1 | 9/2013 | Woytowitz et al. |
| 2013/0264943 A1 * | 10/2013 | Bora ............... H05B 33/0863 315/113 |
| 2013/0271004 A1 | 10/2013 | Min et al. |
| 2014/0019653 A1 | 1/2014 | Amchislavsky et al. |
| 2014/0266340 A1 | 9/2014 | Huang et al. |
| 2014/0269881 A1 | 9/2014 | He et al. |
| 2014/0285090 A1 * | 9/2014 | Chemel ............... F21S 2/005 315/131 |
| 2015/0145435 A1 * | 5/2015 | Ogawa ............... H05B 37/0272 315/294 |
| 2015/0278137 A1 * | 10/2015 | Gan ............... G06F 13/387 710/11 |
| 2016/0330819 A1 * | 11/2016 | Leadford ........... H05B 37/0272 |
| 2017/0027045 A1 * | 1/2017 | Chemel ............... G05B 15/02 |
| 2017/0223807 A1 * | 8/2017 | Recker ............... H05B 37/0227 315/77 |
| 2017/0223811 A1 * | 8/2017 | Vangeel ............. H05B 37/0272 315/312 |

OTHER PUBLICATIONS

PCT/US2015/022571; Filing Date: Mar. 25, 2015; International Preliminary Report on Patentability—dated Oct. 6, 2016; International Search and Written Opinion; dated Jun. 16, 2015.

Color Kinetics, Philips; ZAP1 1.5 Brochure 2005; http://colorkinetics.com/patents/.

http://www.ronex.ee/; image of a conventional 3.5 mm stereo plug to 39 screw terminal—DC Connector and plug.

ENTTEC control products ;—open DMX ethernet ODE ; www.enttec.com; 2013.

Luminair for iOS Digital Lighting control for iPad, iPhone, ; http://synthe-fx.com/products/luminair; 2008.

Microchip PIC12(L)F1822/PIC16(L)F1823 Data Sheet—2010.

www.beyondlogic.org ; USB in a NutShell—Chapter 2—Hardware ; Sep. 17, 2010.

Boobox controller ; www.frightideas.com/booboxes/booboxflexmax.html; inventor Travis Cook (fightideas); product name: Boo Box.

Inventor: Gantom (Quan Gan) ; Date: Jan. 2012 ; Gantom DarkBox RePlay; http://www.gantom.com/controllers/darkbox-replay/.

Online Retailers with RGB remote controllers: https://www.walmart.com/ip/PLATINUM-Small-Remote-Controller-for-RGB-LED/37563144 https://www.amazon.com/Button-Wireless-LED-Controller-LEDwholesalers/dp/B003WJ5PVK https://www.amazon.com/SUPERNIGHT-Remote-Controller-Light-Strip/dp/B00AF5YOK2.

\* cited by examiner

Keep-Alive Packet

Header    Payload    Trailer

Command Control Signal Packet

Header    Payload    Trailer

| | A/V | Multichannel Serial Output |
|---|---|---|
| Tip | Left | Serial Signal 1 |
| Ring | Right | Serial Signal 2 |
| Ring | GND | Common |
| Sleeve | Video | Serial Signal 3 |

| | USB | USB OUT | RS-485 |
|---|---|---|---|
| Pin 1 | Vcc (e.g., +5V) | --- | |
| Pin 2 | Data- | Signal- | D- |
| Pin 3 | Data+ | Signal+ | D+ |
| Pin 4 | GND | Common | GND |

| | USB | USB OUT |
|---|---|---|
| Pin 1 | Vcc (e.g., +5V) | --- |
| Pin 2 | Data- | Common |
| Pin 3 | Data+ | Signal+ |
| Pin 4 | GND | Common |

| LOOKUP TABLE | |
|---|---|
| Mapped Index Number: Command Index: •Single Command Index •Macro Index | Function (s) |
| 1 | ... |
| ... | ... |
| 13 | Red Color Function |
| Red=0 Green=255 Blue=0 | Green Color Function |
| 15 | Blue Color Function |
| 42 (Macro) | Macro Function (e.g., heartbeat) |
| ... | ... |
| Y Marco | Marco Function Z |

FIG. 7B

CLEAR MEMORY ROUTINE - 442

Command Control Signal Packet: CLEAR MEMORY

Header       Payload       Trailer

Updated Output Buffer Routine (Part of Overall Output Process)

Command Control Signal Packet: Single Command Output

Header          Payload          Trailer

SELECT PLAYBACK PROFILE NUMBER

Packet Type: Playback

Header      Payload      Trailer

SYSTEM AND METHOD OF CONTROL OF A PROGRAMMABLE LIGHTING FIXTURE WITH EMBEDDED MEMORY

CROSS-REFERENCE TO RELATED APPLICATIONS

This application claims the benefit of priority of co-pending U.S. Utility Provisional Patent Application 62/290,751, filed 3 Feb. 2016, the entire disclosure of which is expressly incorporated by reference in its entirety herein.

All documents mentioned in this specification are herein incorporated by reference to the same extent as if each individual document was specifically and individually indicated to be incorporated by reference.

It should be noted that throughout the disclosure, where a definition or use of a term in any incorporated document(s) is inconsistent or contrary to the definition of that term provided herein, the definition of that term provided herein applies and the definition of that term in the incorporated document(s) does not apply.

BACKGROUND OF THE INVENTION

Field of the Invention

One or more embodiments of the present invention relate to a system and a method for mapping various operational capabilities of a programmable device (e.g., a fixture) represented as one or more graphic user interface (GUI) icons onto a display of a computing device to thereby enable easy operation and programming of a fully functioning fixture. In other words, one or more embodiments of the present invention allow a novice user to program an intelligent fixture (or any other type of programmable output device) to automatically behave differently at different times after being disconnected from the computing device. That is, one or more embodiments of the present invention relate to using a computing device to generate and store various output sequences to an intelligent fixture in real time and allowing the intelligent fixture to play back the output sequence.

Description of Related Art

In general, professional equipment for color mixing are largely controlled by the well-known DMX 512 protocol, which is a theatrical lighting standard that requires an intelligent fixture to be connected to a master show controller (e.g., a DMX console). These DMX consoles are capable of unlocking all the functionality from an intelligent lighting fixture and allow for different behavior at different times. However DMX 512 based systems are very complex, costly, and require a steep learning curve for users. Further, they are based on centralized control using a centralized processing system.

There are a plethora of consumer grade home automation lighting controls for controlling lighting fixtures for color mixing, but they have very limited capabilities, with most requiring additional infrastructure and support such as Wi-Fi routers, external storage devices, system setup, and actual presence of users to manipulate the lighting fixture (with explicit manual input at each desired transition). For example, only an instantaneous control of a light fixture by a user is possible. Most have no flexibility for customizations. There are others that may provide some basic level of programming using complex proprietary Application Program Interface (API) and or Software Development Kit (SDK), which also provide very limited programming capability while requiring fairly sophisticated computer programming skill set.

Accordingly, in light of the current state of the art and the drawbacks to current controller systems mentioned above, a need exists for a system and a method that would abstract the complexities of a professional lighting system from a user by presenting a distributed rather than a centralized processing and control of programmable apparatuses. Further, a need exists for a system and a method that would provide a simplified interface while retaining substantial capabilities of the programmable apparatuses for customization, including instantaneous control and programming of the programmable apparatuses (or any other type of programmable output device) by well-known computing devices using simple direct link. Additionally, a need exists for a system and a method that would store a recorded or programmed sequence on an integrated memory of the programmable apparatus itself without requiring an external control device, enabling a standalone operation of the programmable apparatus in accordance with recorded or stored data.

BRIEF SUMMARY OF THE INVENTION

A non-limiting, exemplary aspect of an embodiment of the present invention provides a system for control of a programmable lighting fixture, comprising:

a computing device that has a user interface, representing index mapping of one or more functions of a firmware of the programmable lighting fixture, enabling programming of a sequence of operations into an embedded memory of the programmable lighting fixture in real time, with the programmable lighting fixture executing the sequence of operations to output light effects with high fidelity in real time.

Another non-limiting, exemplary aspect of an embodiment of the present invention provides a system for control of a programmable apparatus, comprising:

a computing device that displays one or more graphic user interface (GUI) icons that represent index mapping of a corresponding set of functions of a firmware of the programmable apparatus, enabling transmission of a command as a command control signal packet to control and program a sequence of operations into embedded memory of the programmable apparatus in real time by selection of one or more GUI icons;

wherein the programmable apparatus executes the sequence of operations with high fidelity in real time, including extrapolation and execution of non-corresponding set of functions of the firmware in relation to transmitted commands, wherein the non-corresponding set of functions of the firmware are not index mapped and are not displayed by the computing device.

Still another non-limiting, exemplary aspect of an embodiment of the present invention provides a system for control of a programmable apparatus, comprising:

a computing device that displays one or more graphic user interface (GUI) icons, representing index mapping of one or more functions of a firmware of the programmable apparatus, enabling transmission of a command as a command control signal packet to control the programmable apparatus by selection of a GUI icon from one or more GUI icons;

a header of command control signal packet having an ID control packet that includes one or more of:
  Packet Type comprising one or more of:
    Record (Store)
    Single Command Output
    Playback
    Clear Memory Configuration Profile Number Keystroke index a payload of command control signal packet having payload data that includes one or more of:

Command Index comprising one or more of:

Single Command Index

Macro Index

Transition Rate comprising one or more of:

Single Command Transition rate—Transition Time

Macro Execution Rate

Memory Block# the programmable apparatus operating in accordance with data modulated by the command control signal packet of the computing device;

the programmable apparatus seamlessly executing functions sequentially and chronologically associated with the command index, at rates dictated by transition rate and with timing dictated by timestamp of that command.

These and other features and aspects of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention. Throughout the disclosure, the word "exemplary" may be used to mean "serving as an example, instance, or illustration," but the absence of the term "exemplary" does not denote a limiting embodiment. Any embodiment described as "exemplary" is not necessarily to be construed as preferred or advantageous over other embodiments. In the drawings, like reference character(s) present corresponding part(s) throughout.

FIG. 3A to 3B-8 are non-limiting, exemplary illustration of a controller application for control and programming of a programmable apparatus in accordance with an embodiment of the present invention;

FIGS. 4B-1 and 4B-2 are non-limiting, exemplary illustrations of different types of data packets (i.e., keep alive and control packets) used in accordance with one or more embodiments of the present invention;

FIG. 4C-1 is a non-limiting example of a analog signal (in a analog pseudo-digital signal) of a converted stream of digital packets (control and or keep alive) in accordance with one or more embodiments of the present invention; and FIGS. 4C-2 and 4C-3 are sampling schemes used to maintain signal integrity in accordance with one or more embodiments of the present invention;

FIG. 7B is a non-limiting, exemplary illustration of an exemplary lookup table in accordance with one or more embodiments of the present invention;

DETAILED DESCRIPTION OF THE INVENTION

Figure 1:
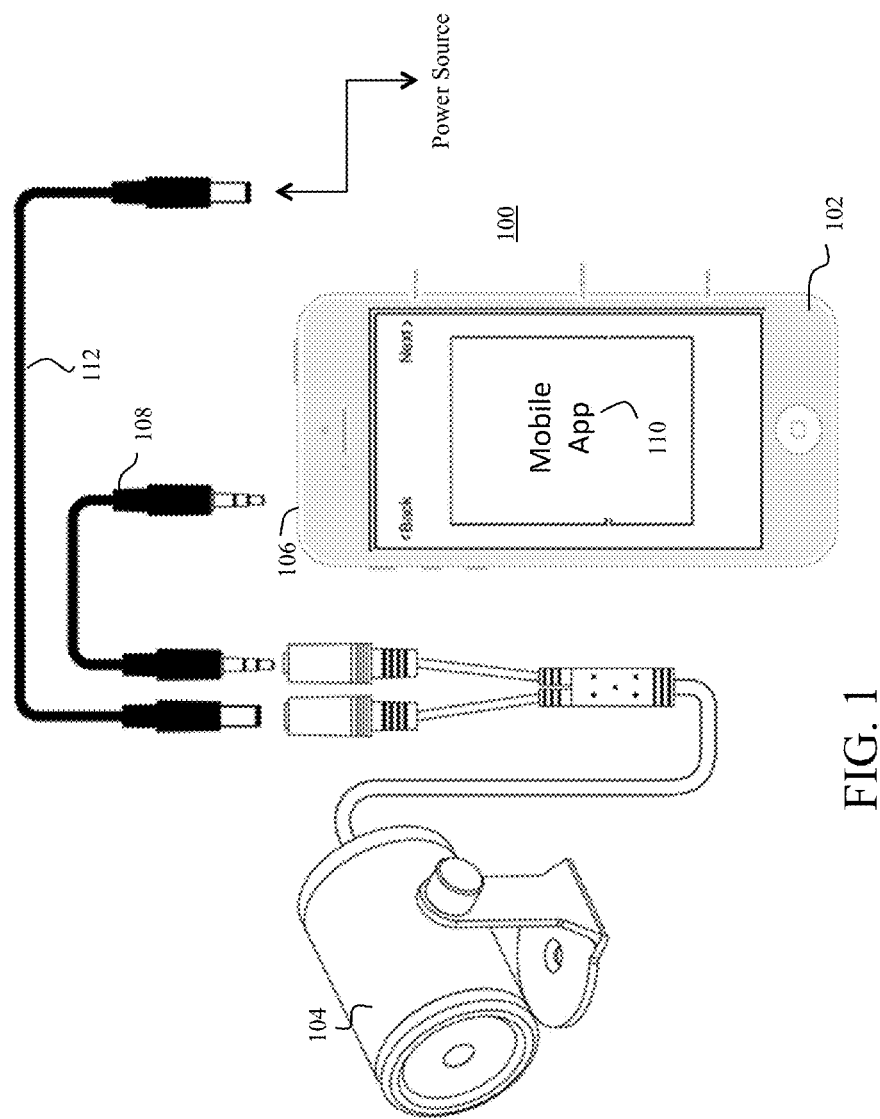
FIG. 1 is a non-limiting, exemplary illustration of a system and a method for direct communication with and for direct control of an exemplary programmable apparatus using a computing device in accordance with an embodiment of the present invention.

The detailed description set forth below in connection with the appended drawings is intended as a description of presently preferred embodiments of the invention and is not intended to represent the only forms in which the present invention may be constructed and or utilized.

It is to be appreciated that certain features of the invention, which are, for clarity, described in the context of separate embodiments, may also be provided in combination in a single embodiment. Conversely, various features of the invention that are, for brevity, described in the context of a single embodiment may also be provided separately or in any suitable sub-combination or as suitable in any other described embodiment of the invention. Stated otherwise, although the invention is described below in terms of various exemplary embodiments and implementations, it should be understood that the various features and aspects described in one or more of the individual embodiments are not limited in their applicability to the particular embodiment with which they are described, but instead can be applied, alone or in various combinations, to one or more of the other embodiments of the invention.

For purposes of illustration, programs and other executable program components are illustrated herein as discrete blocks, although it is recognized that such programs and components may reside at various times in different storage components, and are executed by the data processor(s) of the computers. Further, each block within a flowchart (if a flowchart is used) may represent both method function(s), operation(s), or act(s) and one or more elements for performing the method function(s), operation(s), or act(s). In addition, depending upon the implementation, the corresponding one or more elements may be configured in hardware, software, firmware, or combinations thereof.

One or more embodiments of system and method of the present invention provide a user interface that is understandable by human intellect and human senses for interaction. A non-limiting example of a user interface may include a graphic user interface (GUI) to allow a visual way of interacting with the various elements of the present invention.

The disclosed user interface provided throughout the disclosure is meant to be illustrative and for convenience of example only and should not be limiting. Therefore, various embodiments of the present invention are not limited to any particular GUI configuration and may be implemented in a variety of different types of user interfaces.

Further, all GUI representations of any concepts, aspects, functions, operations, or features may be varied and therefore, none should be limiting. The non-limiting, non-exhaustive illustrations of the GUI used throughout the disclosure are provided only for a framework for discussion. For example, the mere act or function of "selection" (e.g., selecting a color of light) may be accomplished by numerous GUI configurations or representations of the concept of "selection" that are too numerous to mention individually, non-exhaustive, non-limiting examples of which may include the use of GUI color wheel, GUI radio-buttons, GUI pull-down menus, individual GUI icons that are tapped or selected, which may direct users to other types of "selection" GUI, a simple list of links that may be tapped or selected and etc. As another simple example, GUI that is used to represent a "Record" button to record a sequence of operations (i.e., commence programming of the programmable device) for example, or some other concept, aspect, function, feature, or operation may be represented by a completely different set of GUI representations (i.e., configurations, shapes, colors, etc.) shown in the present application without limitations and without departing from the spirit and scope of the claims.

It should be noted that the present invention defines an intelligent apparatus as a device that is programmable—a programmable apparatus or any other type of programmable output device. Throughout the disclosure, references to programmable fixtures/devices/apparatuses (e.g., intelligent micro-spotlight lighting fixtures, fog machines, etc.) are meant to be illustrative, are for convenience of example, and are for discussion purposes only. That is, the use of the one or more embodiments of the system and method of the present invention should not be limited to intelligent micro-spotlight lighting fixtures only but is equally applicable to other programmable apparatuses or programmable output devices such as, for example, any well-known single- or multi-channel controller.

Throughout the disclosure, the term "control," in addition to its plain and ordinary meaning, may also encompass configuration and programming of changes or modifications for a programmable apparatus. Accordingly, for example, a control signal may be a signal that may include data in a form of control data packets with respect to configuration and programming of a programmable apparatus such as, for example, an intelligent micro-spotlight lighting fixtures.

The present invention defines firmware as software or software application (program code and data) programmed into an integrated non-volatile (or persistent) memory (e.g., ROM, EEPROM, Flash memory, etc.), which provides specific features or functionalities (e.g., modes of operations) that define the capabilities of that programmable device. Non-limiting examples of functions that may be provided by a typical firmware for the programmable apparatus such as an intelligent micro-spotlight lighting fixture may include program code and data that may for example respond to exemplary Red, Green, and Blue (RGB) color channels, a strobe function, flicker function, motion, vibration, or any other function defined by firmware of a programmable apparatus. It should be noted that the term RGB defining a color as a combination of only three channels or outputs of Red, Green, and Blue is used only for discussion purposes and should not be limiting. For example, combination may comprise of four or more color channels or outputs or other color combinations such as Yellow, Cyan, Magenta (or YCM).

Further, one or more functions (or features or modes of operations) of the programmable device may be configured by one or more commands from a computing device as desired, using one or more assigned attributes of that function to one or more commands. Attributes (or parameters or properties) may be modulated based on predetermined values assigned to the attributes, defining a configuration of the function for the programmable apparatus. Non-limiting, non-exhaustive listing of examples of attributes may include, for example, a color of light that may be assigned a value to define the color of the light, a combination of which is assigned to a command. An intensity of light as an attribute may be assigned a value to define the intensity of light, a combination of which is assigned as another command. Other examples may include combinations of colors of lights, a strobe intensity and rate, and many others.

One or more embodiments of the present invention define a command as an instruction or command signal that causes a programmable apparatus to perform one or more of its functions, with each function including one or more attributes. A command may be input by one or more keystrokes.

One or more embodiments of the present invention define command index as a unique index mapped identifier of a particular GUI element that may represent one or more functions of a firmware of programmable apparatus 104.

One or more embodiments of the present invention define a keystroke index as a sequentially assigned number to a keystroke by computing device, which enables programmable apparatus 104 to determine the order in which a command is received. The keystroke index may also be used to increment an address pointer of a memory block of programmable apparatus.

One or more embodiments of the present invention define a configuration profile number (or profile number for short) as a unique number that associates or links a specific configuration profile identifier displayed by computing device that identifies with a specific memory block of programmable apparatus 104.

One or more embodiments of the present invention define timestamp as data that amongst others identifies when a certain event occurred. It should be noted that timestamp in accordance with one or more embodiments of the present invention is not just the time at which an event is recorded, but may also (optionally) include data related to the time of the event itself. Throughout the disclosure, references to timestamp are meant as illustrative, for convenience of example, and for discussion purposes only. That is, the present invention is not limited to only providing timestamp data in relation to time and date data but may also be used (without much modifications, if any) for other data related to other information in the context within which the present invention is used in relation to other programmable devices. For example, in some settings, "other information" may also accompany "timestamp data" such as security or authorization code or data.

One or more embodiments of the present invention define the term "protocol" in accordance with its plain and ordinary meaning, which is a well-known set of rules governing the exchange and/or transmission of data between devices.

One or more embodiments of the present invention provide a system and a method that abstract the complexities of a professional lighting system from a user by presenting a distributed rather than a centralized processing and control of programmable apparatuses. Further, one or more embodiments of the present invention provide a system and a method with simplified interface while retaining substantial capabilities of the programmable apparatuses for customization, including instantaneous control and programming of the programmable apparatuses (or any other type of programmable output device) by well-known computing devices using simple direct (wired) link. The one or more embodiments of the present invention also provide a system and a method that store the recorded or programmed sequences on an integrated memory of the programmable apparatus itself without requiring an external control device, enabling a standalone operation of the programmable apparatus in accordance with stored data in the integrated memory of the programmable apparatus.

One or more embodiments of the present invention provide a system and a method for index mapping various operational capabilities of a programmable apparatus (e.g., an intelligent fixture) represented as one or more graphic user interface (GUI) icons onto a display of a computing device to thereby enable easy operation and programming of a fully functioning fixture. In other words, one or more embodiments of the present invention allow a novice user to program an intelligent fixture (or any other type of programmable output device) to automatically behave differently at different times after being disconnected (standalone operation) from the computing device. That is, one or more embodiments of the present invention relate to using a computing device to generate and store various output sequences to an intelligent fixture in real time and allowing the intelligent fixture to play back the output sequence, even when standalone.

One or more embodiments of the present invention provide system and method for direct communication with and for direct control of programmable apparatuses using computing devices such as desktops, mobile computing devices (e.g., mobile phones, etc.) that do not use or require a dedicated WI-FI™ router, do not require or use DMX-512 protocols, and do not require an initial setup or configuration for exclusive communications between a computing device and a programmable apparatus.

One or more embodiments of the present invention provide system and method for direct communication with and for direct control of a programmable apparatus using a direct cable connection between a physical interface of a computing device and that of the programmable apparatus. The physical interfaces may be a physical port, non-limiting examples of which may include commonly available standard ports such as an audio port, a Universal Serial Bus (USB) port, XLR connectors, or others, including combinations thereof where for example, the computing device may have an audio port for example, and the programmable apparatus may have a USB or XLR connectivity.

One or more embodiments of the present invention provide a system and a method for reconciling certain incompatibilities between programmable devices and computing devices for connectivity, communication, and control (including exchange or transmission of data) between incompatible computing devices and programmable devices without hardware modifications (if any). More particularly, a system and a method is provided for communicating with and for controlling of programmable devices using computing devices such as desktops, mobile computing devices, etc. that communicate with and control programmable devices through physical interface (such as a physical port) of the computing device. Non-limiting examples of control may include configuration and or programming of the programmable apparatus using an implemented graphic user interface (GUI) within the computing device.

It should be noted that although one or more embodiments of the present invention are described using a direct, wired link between a computing device and a programmable device such as an intelligent fixture using an audio output port of the computing device, other forms of communications are contemplated and may be used, including very well-known wireless communications protocol (and techniques thereof) such as for example, WiFi, Infrared (IR), Near Field Communication (NFC), Bluetooth, etc. In other words, all aspects of the invention, including those claimed may be practiced using any one of the well-known wireless communications protocols for transmission of data between devices. However, it is only for its simplicity and ease of use in terms of users' experience and user friendliness that direct, wired link between computing device and a programmable device is discussed (and generally more preferred). Non-limiting examples of use of direct, wired control of and communications with an intelligent fixture using a computing device and certain other hardware (e.g., controller) and aspects discussed in this application are fully disclosed in U.S. patent application Ser. No. 13/775,061, filed 22 Feb. 2013 (now U.S. Pat. No. 9,204,519 to Quan Gan et al.) and U.S. patent application Ser. No. 14/668,761 filed 25 Mar. 2015 to Quan Gan et al., the entire disclosures of which is expressly incorporated by reference in their entirety herein.

FIG. 1 is a non-limiting, exemplary illustration of a system and a method for direct communication with and for direct control of an exemplary programmable apparatus using a computing device in accordance with an embodiment of the present invention. As illustrated in FIG. 1, computing device 102 (e.g., a mobile computing device such as a Smartphone) may be directly connected with non-DMX based programmable apparatus 104 (e.g., an intelligent micro-spotlight lighting fixture) using a physical wire (such as an audio plug cable 108) through commonly available standard physical interface port (such as an audio port 106) of computing device 102 for direct communication with and for direct control of programmable apparatus 104 with no additional hardware change.

Once connected, computing device 102 may be used to control programmable apparatus 104 using an implemented non-DMX based controller application 110 residing within the computing device 102. It should be noted that a non-DMX based controller application 110 is implemented because programmable apparatus 104 is a non-DMX based fixture. Accordingly, unlike DMX based fixture and controller application disclosed in U.S. patent application Ser. No. 14/668,761 filed 25 Mar. 2015 to Quan Gan et al., both programmable apparatus 104 and controller application 110 of the present invention are non-DMX based and do not use DMX protocol.

As detailed below, significant advantage of using a non-DMX based programmable apparatus 104 and implementing a non-DMX based controller application 110 is the simplicity of the entire system in terms of its use and further, compatibility in terms of control of programmable apparatus 104. That is, frequency of operation (baud rate) of programmable apparatus 104 need no longer be modified (e.g., slowed down) from a DMX based frequency to audio based frequency to enable control of programmable apparatus 104 via an audio output port 106 of computing device 102. In other words, both rate of transmission of data or transmission speed (amount of data per unit of time) at which computing device 102 and programmable apparatus 104 communicate via audio port 106 of computing device 102 is no longer a concern. Accordingly and as detailed below, synchronization of transmission rate of data is no longer needed or necessary.

Figure 2:
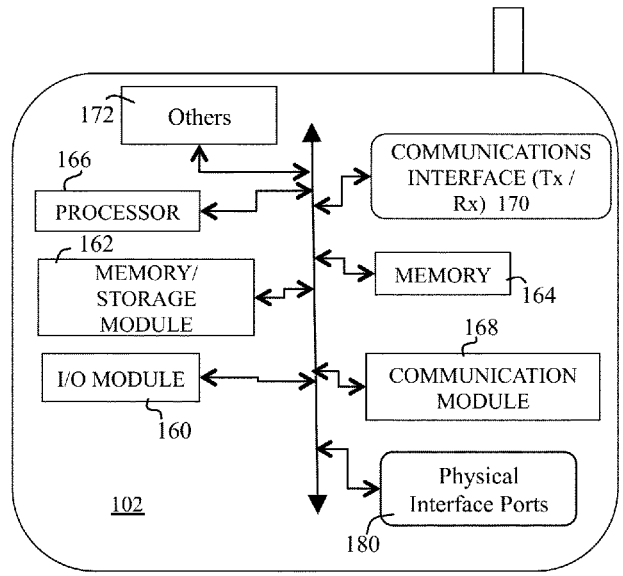
FIG. 2 is a non-limiting, schematic block diagram of an exemplary illustrated computing device shown in FIG. 1 in a form of a well-known and conventional mobile phone that may be used to implement one or more embodiments of the present invention.

One or more aspects of the present invention may be implemented on a conventional computing device 102, detailed in FIG. 2. FIG. 2 is a non-limiting, schematic block diagram of an exemplary illustrated computing device shown in FIG. 1 in a form of a well-known and conventional mobile phone that may be used to implement one or more embodiments of the present invention. As illustrated in FIG. 2, the computing device 102 may be any well-known conventional computing device, non-limiting examples of which may include desktops, netbooks, notebooks, laptops, remote controls, mobile devices such as mobile phones or computing tablets, or any other devices that may or may not be Network and or Internet enabled.

Computing device 102 includes the typical, conventional components such as an I/O module 160 (e.g., a keyboard or touch screen display, etc.). Computing device 102 also includes a storage module 162 for storing information (that may use server based Cloud Computing Systems) and services, a memory 164 used by a processor 166 to execute programs, a communication module 168 for implementing desired communication protocol, a communications interface (e.g., transceiver module) 170 for wirelessly transmitting and receiving data, physical interface ports 180 (e.g., audio port 106, a USB port, etc.), and may or may not include other components 172 such as an image/video/sound capture device such as a camera, voice recording microphone, stylus, etc.

It should be noted that a programmable apparatus 104 may be a computing device 102 and a computing device 102 may be a programmable apparatus 104 as both may be identical. It is only for clarity and discussion purposes that the present invention uses these two terms (e.g., "programmable apparatus" and "computing device") instead of using "first computing device 102/104" and "second computing device 102/104."

Figure 3A:
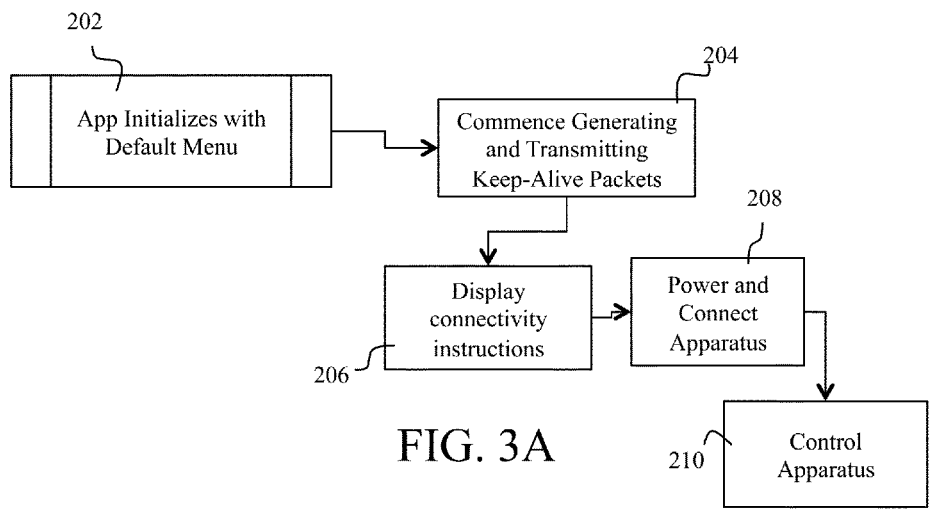
Figures 1, 3B:
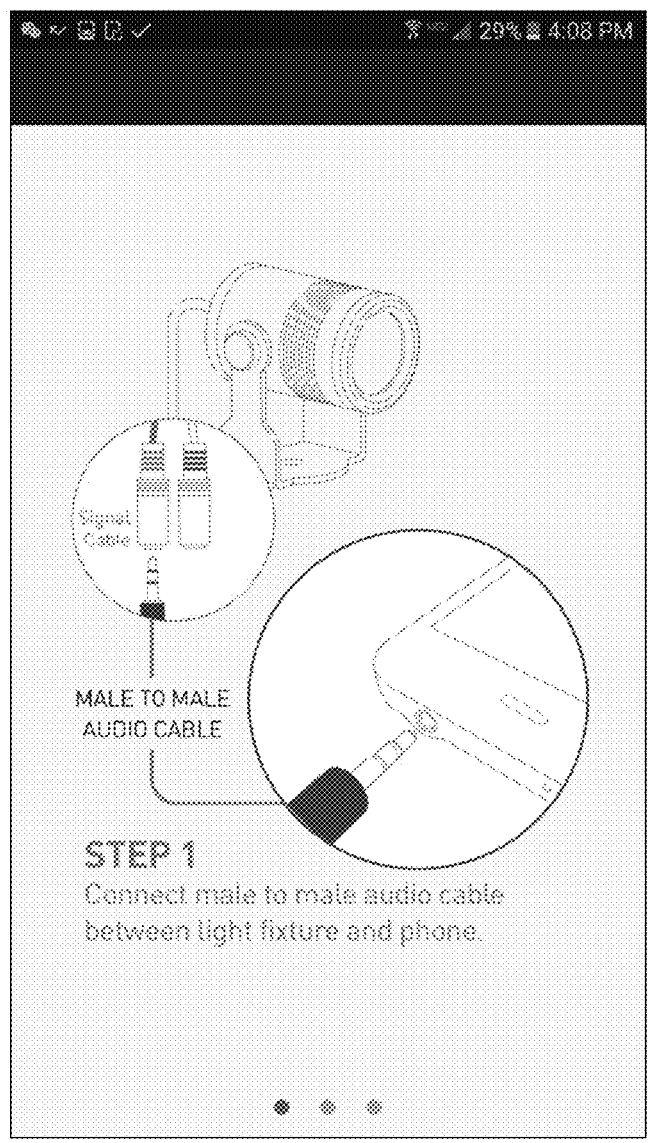
Figures 2, 3B:
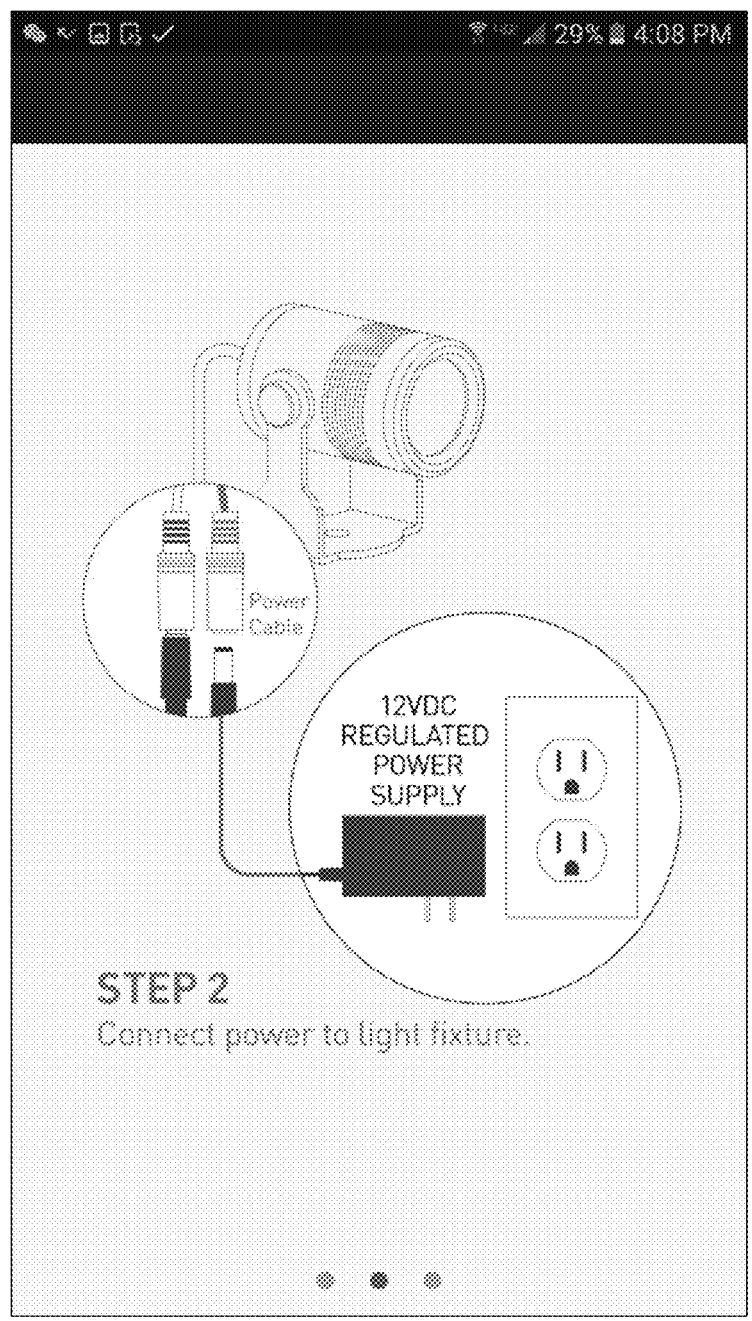
Figures 3, 3B:
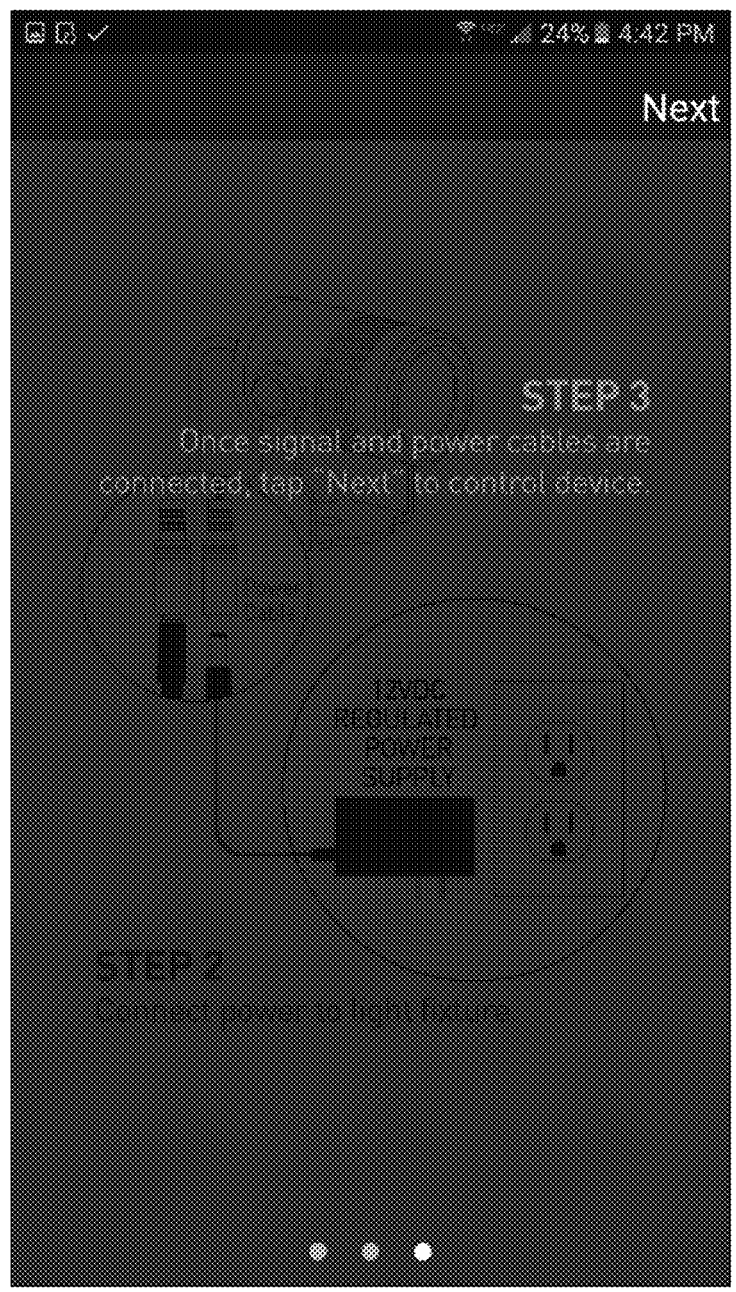
Figures 3, 3B, 4:
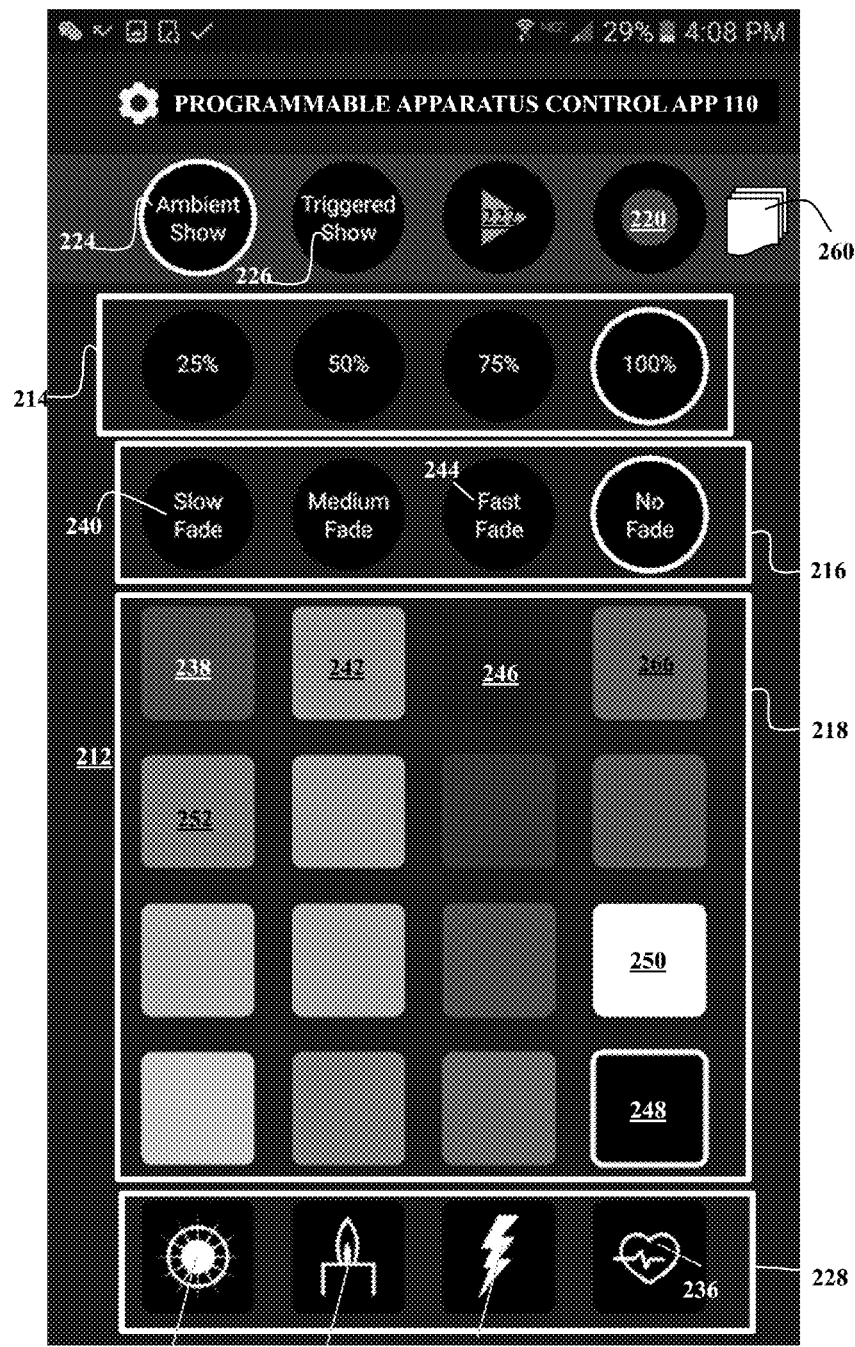
Figures 3, 3B, 4, 5:
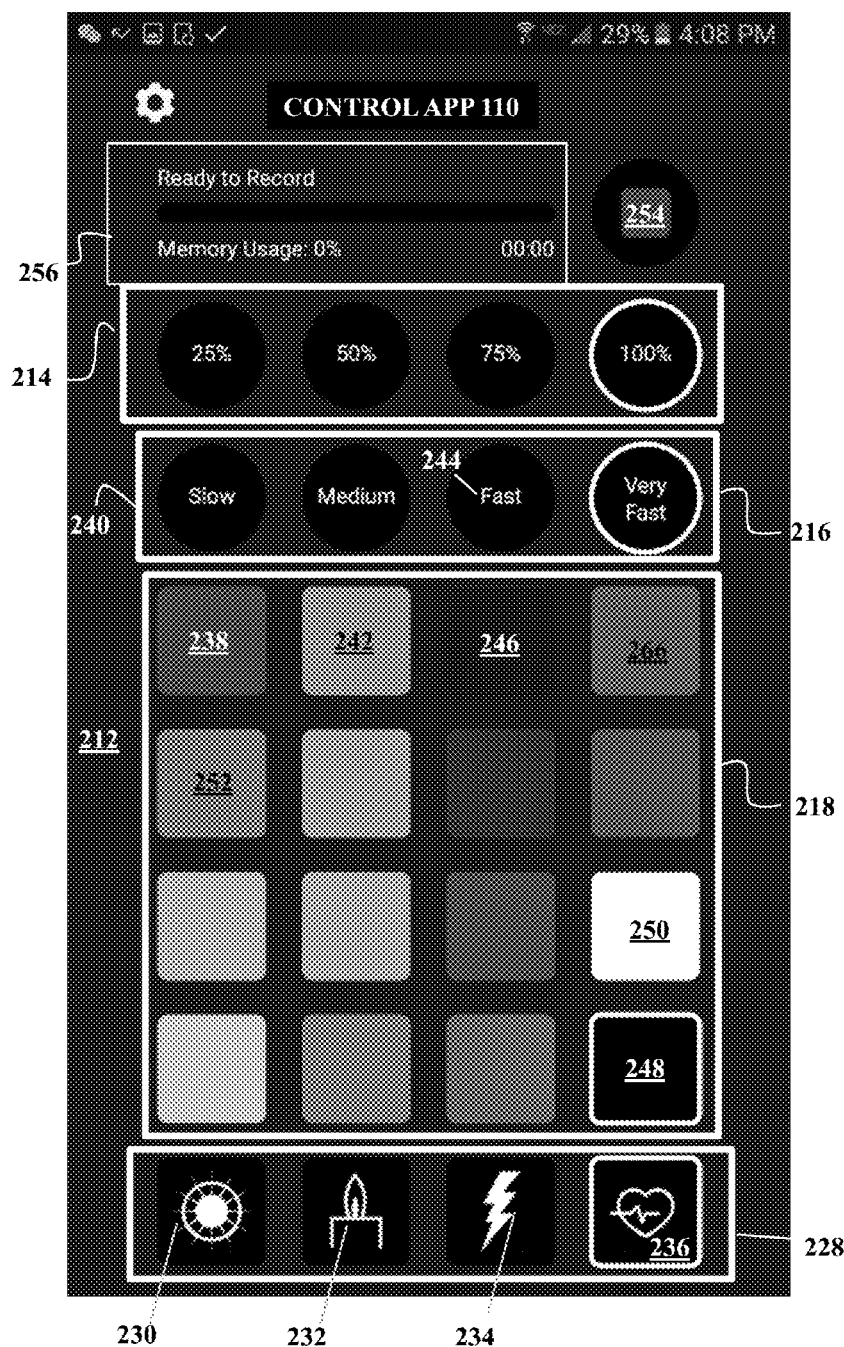
Figures 3, 3B, 4, 5, 6:
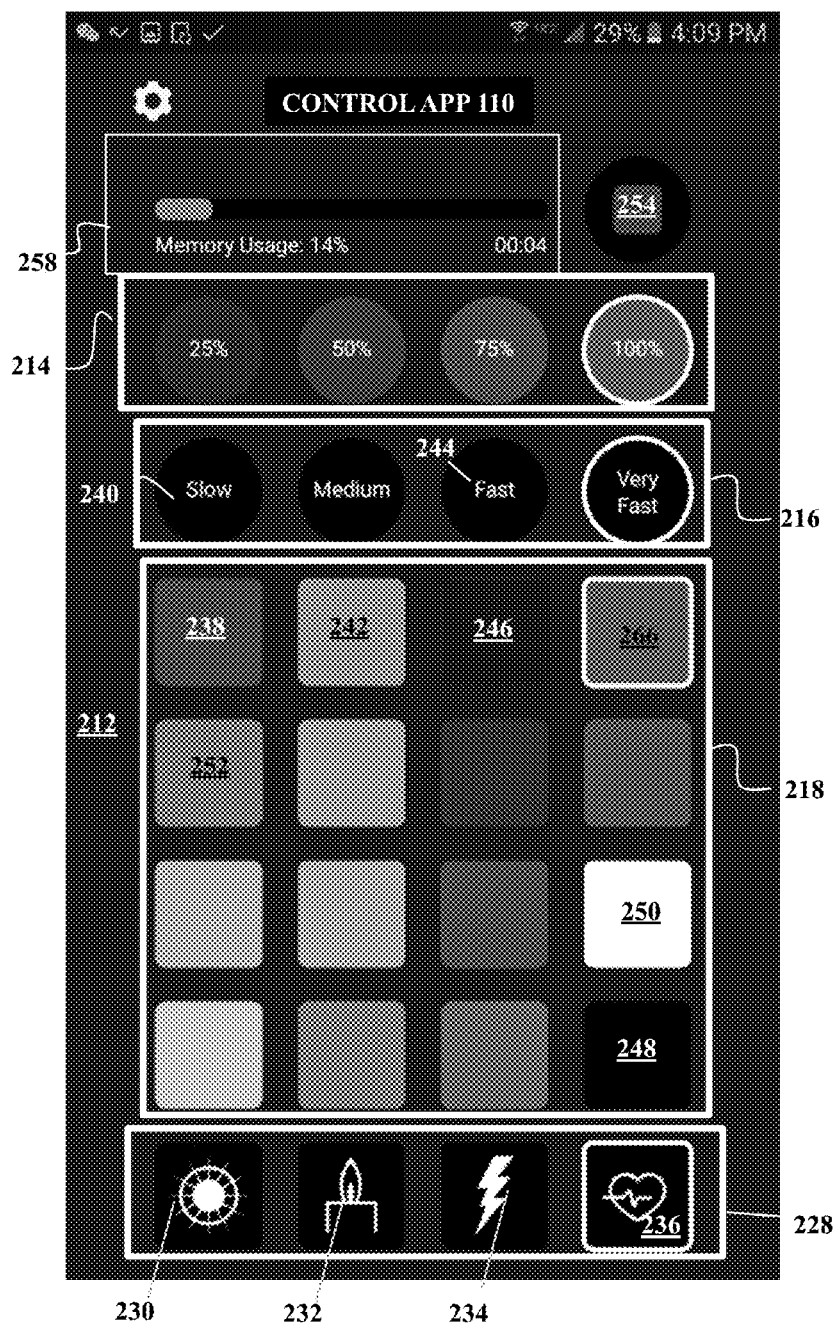
Figures 3, 3B, 4, 5, 6, 7:
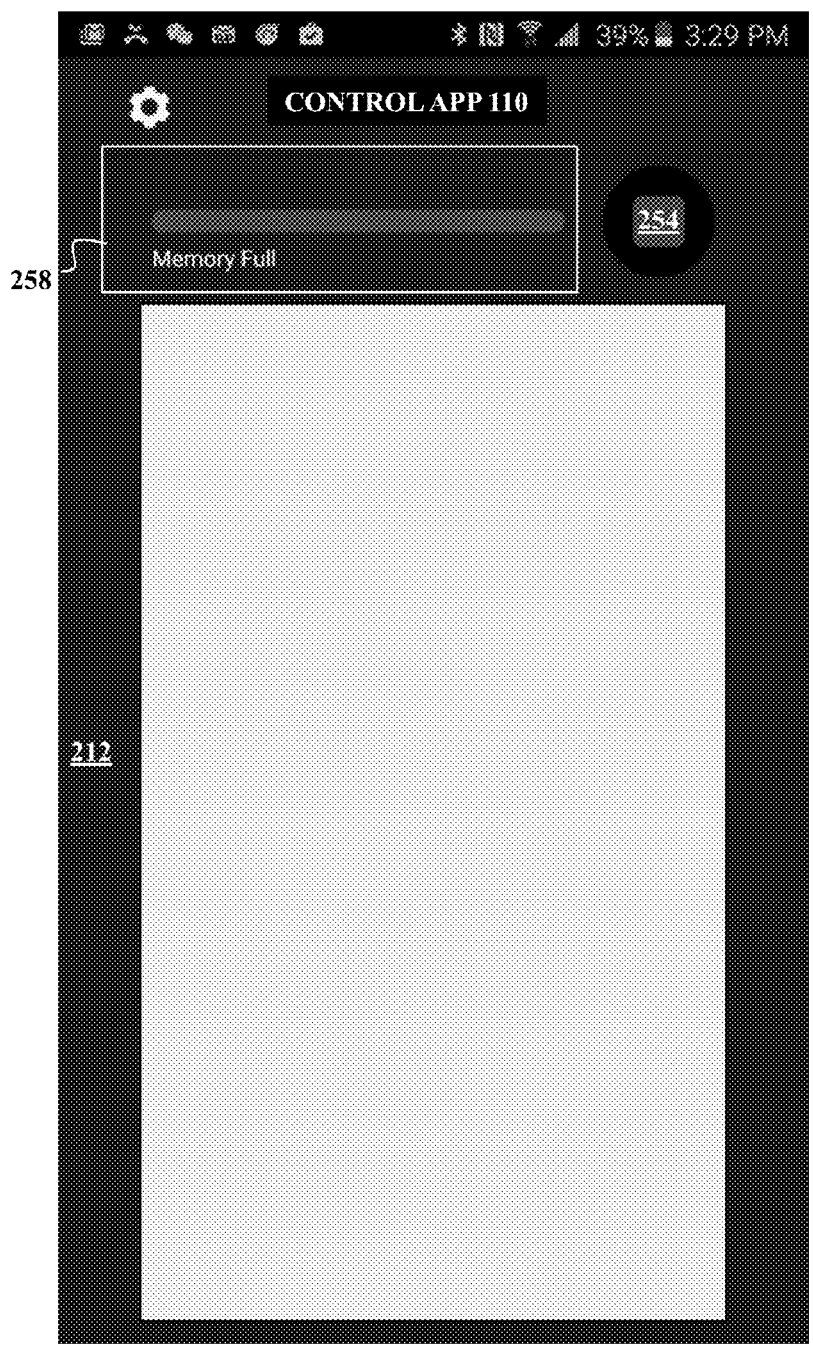
Figures 3, 3B, 4, 5, 6, 7, 8:
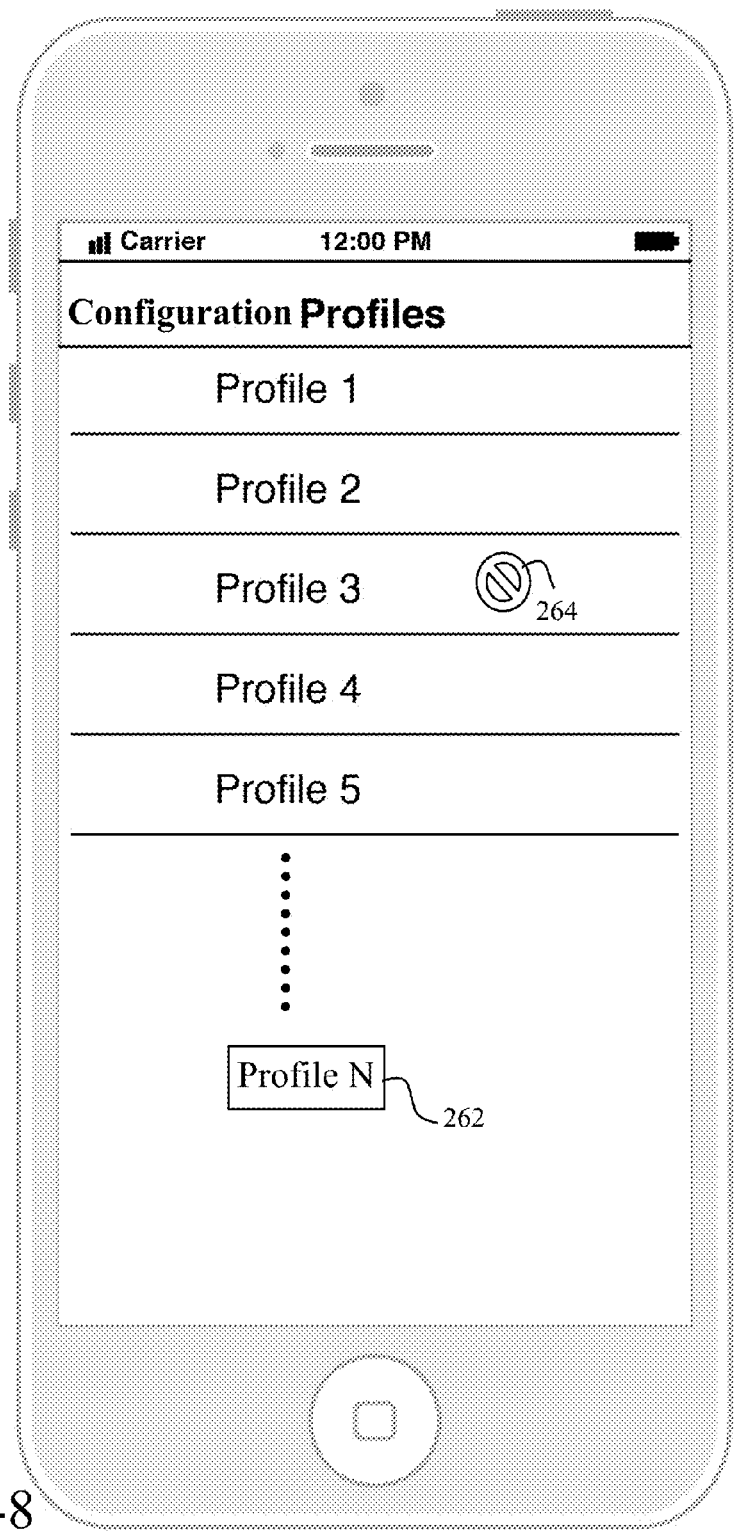

FIG. 3A to 3B-8 are non-limiting, exemplary illustration of a controller application for control and programming of a programmable apparatus that illustrate screenshots that show an exemplary set of GUIs used for navigation and functionalities that may be implemented within computing device for control and programming (e.g., configuration) of a programmable apparatus.

FIG. 3A is a non-limiting, exemplary flowchart block diagram to illustrate the overall control (in terms of configuration-control) for a programmable apparatus using a computing device, with FIGS. 3B-1 to 3B-8 showing non-limiting, exemplary screenshots for a few functionalities related to configuration control. It should be noted that the handful of example screenshots and their respective functionalities illustrated are by no means exhaustive. Accordingly, only a few example screenshots are selected for discussion purposes. It should further be noted that the methods or processes for downloading and installation of controller application 110 may be done through well-known existing processes for various versions of the application such as mobile apps (if a mobile app version is used).

As illustrated in FIG. 3A, upon launching of controller application 110 within computing device 102, controller application 110 initializes at operation 202 and displays default screen (not shown) for configuration control via I/O module 160. After launch and initialization at operation 202, microprocessor unit 166 of computing device 102 commences generation of keep-alive Packet (detailed below with respect to FIG. 4B-1) at operation 204. At operation 206, controller application 110 displays a set of connectivity instructions (FIGS. 3B-1 to 3B-3) for connecting programmable apparatus 104 to the computing device 102, and at operation 208 users may actually physically connect the devices as instructed.

After physically connecting programmable apparatus 104 and computing device 102 at operation 208, if programmable apparatus 104 (as the intelligent micro-spotlight lighting fixture) successfully recognizes the keep-alive packet during programmable apparatus 104 initialization (detailed below), controller application 110 displays control configuration screen 212 for configuration control of apparatus. Thereafter, programmable apparatus 104 simply responds to any configuration control at operation 210, without any further requirement or need for "acknowledgement" of connection between devices.

Controller application 110 at operation 206 (FIG. 3A) displays a sequential series of connectivity screens (shown in FIG. 3B-1 to 3B-3), which provide a set of instructions for users for physical connection of programmable apparatus 104 to be modified with computing device 102. As a reminder, simultaneously during this time, controller application 110 via computing device 102 continues generation of keep-alive packets at operation 204 (which is detailed below) transmitted through an appropriate physical interface port 180.

The instructions provided in connectivity screens of FIGS. 3B-1 to 3B-3 for physical connection of programmable apparatus 104 with computing device 102 may vary depending on programmable apparatus 104 and the type of connectivity used (e.g., audio, USB, XLR etc.). In the non-limiting, exemplary instance illustrated in FIGS. 1 and 3B-1 to 3B-3, the connectivity used is audio port 106 of computing device 102 and programmable apparatus 104 is the intelligent micro-spotlight lighting fixture, with the instruction set directing users to couple data signal cable 108 to programmable apparatus 104 and computing device 102 and next, plug in power cable 112 of intelligent micro-spotlight 104 to an appropriate power supply source. It should be noted that the order of connecting data signal cable and power cable may be reversed.

As further illustrated, in this non-limiting, exemplary instance, physical interface port 180 is exemplarily illustrated as a standard audio port 106 of computing device 102, which requires that data signal cable 108 to have standard audio plugs (rather than, for example, USB or XLR, or others). In this non-limiting, exemplary instance for example, data signal cable 108 used is a male-to-male $\frac{1}{8}^{th}$ inch "mini-jack," (also known as 3.5 mm Tip Ring Sleeve—TRS for short) which plugs between intelligent micro-spotlight 104 and audio port 106 of computing device 102.

The remaining FIGS. 3B-4 to 3B-8 are non-limiting, exemplary illustrations of a few, handful of specific examples of screenshots that show various sets of GUIs used specifically for configuration control and programming of the intelligent micro-spotlight lighting fixture 104 connected to computing device 102. As indicated above, the illustrated screenshots, GUI icons, and their respective operations and functionalities shown are by no means exhaustive and may be varied and are completely device dependent. For example, set discrete GUI icons 214 represented as individual tap "buttons" with numerical percentages in FIG. 3B-4 may be used to control the level of intensity of a particularly selected color of light for the connected intelligent micro-spotlight lighting fixture 104. However, control for variation of color intensity may also be represented by other well-known means such as a sliding bar GUI icon instead, which would provide a more granulated, continuous (rather than discrete) control in variations in color intensities. Further, if instead of intelligent micro-spotlight lighting fixture a programmable fog machine is used as programmable apparatus 104, the same intensity GUI icon 214 (as slider bar or discrete GUI buttons as shown) may be used to control the amount or duration of release of material from the programmable fog machine to create a desired fog affect. As other examples, intensity GUI icon 214 may represent intensity control variations in voltage levels, vibration intensity, temperature variations, etc. depending on the programmable apparatus being controlled. Accordingly, depending on the type of apparatus, a corresponding set of GUIs specific for configuration control of the selected programmable apparatus 104 will be displayed by controller application 110.

All display screens for configuration control may include scrolling capability (up/down and/or left/right) to display more GUI icons (if any) not shown in the viewable area of display screen for configuration control. Therefore, the number of the GUI icons shown in FIGS. 3B-4 to 3B-8 should not be limited to those shown in the current viewing areas of display screens for configuration control. In fact, all screens for controller application 110 include all of the rudimentary navigational functionalities such as scrolling, or other well-known features such as zooming in or out and so on that are well-known and conventional.

As illustrated in FIG. 3B-4, after connection of computing device 102 to programmable apparatus 104, a corresponding user interface (configuration control screen 212) is displayed after connection screens of FIGS. 3B-1 to 3B-3. As illustrated in FIG. 3B-4, configuration control screen 212 includes various GUI icons such as an array of color buttons, etc., all of which are specifically designed to fully and completely configure intelligent micro-spotlight 104 in accordance with the firmware setting (or functional capabilities) of intelligent micro-spotlight 104.

Manipulations (or keystrokes) of any one of the illustrated GUI icons in well-known conventional manner (e.g., via touch screen) is received as input (e.g., gesture input) by computing device 102 and translated to command control signals (i.e., command control signal packets) that are eventually transmitted via the connected physical interface to control the physically connected intelligent micro-spotlight 104. That is, one or more embodiments of the present invention use computing device 102 to provide an indexed "keyboard" of different functions or capabilities of programmable apparatus 104, with each keystroke of a keyboard defining one or more command signals. Users may select (or tap) a keyboard and in real time have these keystrokes (which represent commands, for example, various colors and effects) be output by apparatus 104 and recorded (assuming a record button is selected) into apparatus 104 (or an external controller). As detailed below, recording of commands allow effects defined by the command index to be automatically played back in an identical fashion (defined by keystroke index and system timestamp data) at a later time when apparatus 104 operates standalone.

As illustrated in FIGS. 3B-4 to 3B-8, configuration control screen 212 for intelligent micro-spotlight 104 includes, for example, a set of intensity GUI icons 214 represented as a set of array of buttons with numerical percentage indicators for setting light intensity. As another example, array of GUI icons 216 are associated with setting speed or transition rate setting (for example, strobe rate of the light). As with the set of intensity GUI icons 214 described above, set of transition rate GUI icons 216 may also be represented as single sliding bar GUI instead of an array of descriptive text based buttons as shown. Further included in the configuration control screen 212 is a color palette GUI icon 218 for selecting a color of the light, which may instead be represented as a well-known color wheel GUI icon instead of individual color buttons as shown.

Configuration control screen 212 further includes record GUI icon 220 and play GUI icon 222. In general, play GUI icon 222 when selected, replays the recently recorded configuration once. However, as detailed below, when powered in standalone mode (not connected to any device), programmable apparatus 104 will continuously and repeatedly replay a pre-recorded and saved configuration.

Further included are two pre-recorded configuration profiles represented by a default configuration profile GUI icon 224 and a secondary configuration profile GUI icon 226. This way, users may have easy quick access to at least two saved configuration profiles. A configuration profile is defined as a stored configuration of the apparatus. Accordingly, a single programmable apparatus 104 may include several configuration profiles, with each configurations profile having values defining the attributes of the functions for that configuration profile. The values of the attributes of the functions in a configuration profile may be set using controller application 110 as detailed below.

Configuration control screen 212 additionally includes a set of various macro GUI icons 228, which represent the most popular functions for a particular apparatus by use of a single key abstraction. In the instance illustrated in FIG. 3B-4, since programmable apparatus 104 is the intelligent micro-spotlight lighting fixture, its most popular macro-functions are abstracted and represented by GUI "toggle switching" icons such as strobe GUI icon 230, a flicker GUI icon 232, a flash GUI icon 234, and a heartbeat GUI icon 236 (flashes light mimicking rhythms of the heartbeat).

Some of the functions represented by the GUIs displayed are context based. For example, selecting a red GUI icon 238, then selecting slow fade GUI icon 240, and then green GUI icon 242 would cause the programmable apparatus 104 to output a red light and gradually fade into outputting a green light based on the transition speed or rate defined by the "Slow Fade." However, the same slow fade GUI icon 240 when used in combination with macro heartbeat GUI icon 236 would flash a light (of any selected color) to mimic a slow heartbeat versus one where a fast fade GUI icon 244 is used where a light mimicking a fast heartbeat is output by apparatus 104. Accordingly, the effect of array of GUI icons 216 on the output of programmable apparatus 104 differs depending on whether it was used with any one of the macro GUI icons 228 or any one of the single color GUI icons of color palette 218.

As illustrated in FIG. 3B-4 and detailed below in relation to FIGS. 7A to 7C, the one or more graphic user interface (GUI) icons of configuration control screen 212 represent index mapping of one or more functions of a firmware of the programmable apparatus 104. That is, the GUIs are index and are visual representations of the capabilities of the fixture. Since a function of programmable apparatus 104 may be index mapped as a GUI icon representative, the amount of data transmitted from computing device 102 when selecting the desired function amounts to only transmitting command index number associated with the indexed GUI icon. For example, red GUI icon 238 may be assigned an index number "13." Selecting red GUI icon 238 will transmit a simple index number 13 to programmable apparatus 104 (in addition to other data, detailed below) rather than huge sum of data associated with color red that includes the function red color and its attributes, including data values that define the attributes of the function color red light. As further detailed below, alternatively, for GUI icons representing all of the individual colors within color palette 218, selecting any one or more of the colors may simply transmit an RGB value of the selected color as command index rather than a single position number. For example, selecting red GUI icon 238 would transmit to programmable apparatus the RGB values (color code) of Red output=255; Green output=0, and Blue output=0 instead of a single position index of "13."

In operation, users may control programmable apparatus 104 by simply selecting any color GUI icon from color palette 218 on control configuration screen 212 of computing device 102. Once selected, the connected programmable apparatus 104 will output a light of that particular color. For example, selecting blue GUI icon 246 will result in programmable apparatus 104 outputting a blue color light. While outputting a blue color light, users may also select a desired intensity of that color of light by selecting one of the intensity GUI icons 214. As best shown in FIGS. 3B-6, colors of the set of intensity GUI icons 214 change in accordance with the particular color selected (in this case, color pink GUI icon 266) and display the intensity of that selected color to provide visual in addition to the quantitative measure of intensity, which are provided in percentage values in the set of intensity GUI icons 214. As indicated above, selecting any one of the Fade GUI icons from Fade GUI icon set 216 will enable functions to transition from one function (e.g., color—Blue) to another function (e.g., color—Red) at a desired fade rate. If no fade or transition rate is selected, output of programmable apparatus 104 will quickly change from one function to next. It should be noted that intermediary colors (between initial color and final color) may be generated when fading between two colors on palette 218. In other words, the actual color output is not limited to the color choices shown on color palette 218 but is much larger variety. The intermediate colors and their values are calculated and interpolated in accordance with one or more embodiments of the present invention when transitioning from an initial value for the initial color to a final value for the final color (detailed below).

Controller application 110 also provides a multi-touch (multi-selection) capability that can support multi touch user input, which allows for blending of functions (e.g., colors) or setting of a background color and foreground color. Multi-touch feature is useful when creating effects where the output is predominantly in background output and occasionally the foreground output.

If two fingers are used to select two different colors from palette 218, the background color is the first color selected (the fixture will be activated into that first color immediately when the color is selected). The foreground color is the second color selected while the first color is still active—(the fixture will transition into the second color as soon that second color is selected). If the user then lifts his fingers from the foreground color (the second color selected), the fixture will then transition back into the background color (first color selected).

As an example of multi-touch use, a user may select and hold a black GUI icon 248 as background color for example, while continuously tapping on white GUI icon 250 (at any tapping rate) as the foreground color thus generating an intermittent (e.g., strobing) black-white light effect. In other words, the background color is black and the foreground color is white—the user may maintain a finger on the background color (black) and only tap the foreground color (white) with another finger when desired to activate a white color light wants it activated, knowing that as soon as the finger from white color GUI 250 is lifted the background color will take effect. The same is true for a flickering candle effect where the background color is amber (amber GUI icon 252) and the foreground color is black (black GUI icon 248). The user can enhance the realism of the flicker candle by selecting a finite transition speed (by using one of the transition GUI icons 216) between background and foreground color so that a smooth flickering output can be achieved. When the user only selects a single color, the background and foreground colors are the same. It is important to note that lifting of a second finger from the foreground color will be considered as a keystroke and a command will be sent to the light fixture to activate the background color held by the first finger. Specifically, when considering multi-touch, the release action of a GUI button is also tracked.

Of course, users may also mix in intensity in addition to fade transition where the intensity of red background light for example is selected to be greater than that of yellow foreground color light and there is a slow transition from one color to next. Accordingly, as with most applications, the one or more embodiments of controller application 110 of the present invention provide different methods of accomplishing the same or similar tasks and hence users may simply select strobe GUI icon 230 or, alternatively, generate a desired strobe effect as detailed above using multi-keystrokes. Without multi-touch, users would require a greater amount of coordination in terms of selecting different color GUI icons with appropriate timing to achieve the same effect as those of pre-programmed macro set of GUI icons 228.

Programmable apparatus 104 may be controlled and programmed by computing device 102 through controller application 110 as described above, and also record and store a sequence of commands (e.g., keystrokes) through controller application 110. This way, programmable apparatus 104 may operate in standalone mode in accordance with control configurations programmed by users.

To actually program programmable apparatus 104 to record and save a desired control configuration profile, as best shown in FIGS. 3B-5 and 3B-6 users may simply select record GUI icon 220, followed by command sequence for the desired lighting output effect. For example, after selecting record GUI icon 220, users may select red GUI icon 238 followed by white GUI icon 250, and followed by selecting stop record GUI icon 254 (FIGS. 3B-5 and 3B-6) to indicate end of recording (to stop recording).

It should be noted that the recording of command sequences is in real time (or "live"). That is, a user may select record icon 220, select red GUI icon 238, wait for 1 second, and then white GUI icon 250, wait 1 second and then select stop recording button 254. This way, when play GUI icon 222 is selected, programmable apparatus 104 will play back the saved configuration profile exactly as it was recorded live. That is, programmable apparatus 104 would output a red light, wait 1 second, and then output a white light. When powered in standalone mode (not connected to any device), programmable apparatus 104 will continuously and repeatedly replay the recorded and saved configuration profile (red for 1 second and white for 1 second). Accordingly, users with no knowledge of complex DMX lighting protocols are able to program one or more programmable apparatuses 104 in accordance with one or more embodiments of the present invention to mimic a DMX like lighting show without any knowledge of DMX. As indicated above, programmable apparatus 104 and controller application 110 are not based on DMX protocol.

As further indicated above, multiplicity of configuration profiles may be recorded and saved depending on the integrated memory capacity of programmable apparatus 104. In the non-limiting, exemplary instance shown in FIG. 3B-4, control configuration screen 212 is illustrated as allowing recording of and quick access to two saved configuration profiles, with one (default profile GUI icon 224) being the default configuration profile. This way, when programmable apparatus 104 is powered ON (whether as standalone or connected to computing device 102), it will execute and output the default configuration profile or if recording, it will save the recording as the default configuration profile (if no other profile is explicitly selected as detailed below).

When apparatus 104 is connected to computing device 102, the second configuration profile may be accessed by selecting configuration profile GUI icon 226. When programmable apparatus 104 is standalone and powered ON, a switch (best illustrated in FIG. 3C and detailed below) or an external encoding mechanism to enable selection of a specific profile may be used to access the second or any subsequently saved configuration profiles. To save a second or any other subsequently saved configuration profile rather than a new configuration as a new default configuration profile, users may simply first select the next or second configuration profile GUI icon 226 first, next select record GUI icon 220 to commence recording, and then any command sequence desired to be recorded and saved on programmable apparatus 104 as the second configuration profile as described above for the default configuration.

As best illustrated in FIGS. 3B-5 and 3B-6, application controller 110 displays recording mode when record GUI icon 220 is selected. As indicated, when selecting record GUI icon 220, control configuration screen 212 displays recording wait-mode GUI 256 or "Ready to Record" (best shown in FIG. 3B-5) until and when a first command is input for recording at which time, control configuration screen 212 provide a progress bar GUI icon 258 (shown in FIG. 3B-6) that indicates amount of memory used as a result of commands entered. This wait-mode GUI is important to allow the user to press the first color keystroke in sync with some external action such as the beginning of a music recording without having to select the record button and the color button at the same time.

Memory storage indicator GUI icon 258 provides a visual representation of the amount of memory remaining for recording in the programmable apparatus 104. If integrated memory of the apparatus 104 becomes full (best shown in FIG. 3B-7), controller application 110 will disable and prevent selection (or actuation) of any further GUI icons. At this point selecting stop GUI icon 254 will allow application controller 110 to exit record mode and enable the display again (as show in FIG. 3B-4).

It should be noted that it is only for simplicity and discussion purposes that only two configuration profiles are discussed and illustrated within control configuration screen 212. The limiting factors for the number of configuration profiles that may be saved is dependent on the memory capacity of programmable apparatus 104.

Assuming a large memory capacity that may be divided into several segments (or reserved memory block locations best shown in FIG. 7C) and index mapped by controller application 110 as configuration profile number, control configuration screen 302 may for example, switch to a listing of configuration profiles display shown in FIG. 3B-8 as soon as for example, configuration profiles list GUI icon 260 (FIG. 3B-4) on the control configuration screen 212 is selected. For example, users may first select configuration profiles list GUI icon 260, which would display a listing of a number of configuration profiles allowed by the programmable apparatus 104 as shown in FIG. 3B-8. User may then select a profile number (e.g., profile N 262), which would then re-display control configuration screen 212 (FIG. 3B-4) to allow selection of record GUI icon 220 to enable recording and saving profile N within programmable apparatus 104 as described above. The newly recorded configuration profile N is then saved within correspondingly reserved memory location or block of the memory of apparatus 104 (FIG. 7C), specifically reserved for and associated and indexed mapped as configuration profile N.

As profiles are saved, a used or full GUI icon 264 (FIG. 3B-8) may appear next to each profile number as an indication that that particular profile is used (has saved content associated with memory locations of programmable apparatus 104 dedicated to that profile number). Of course, new configurations may be written over all saved profiles on programmable apparatus 104. Again, the number of configuration profiles (and their respective file sizes) is limited only by the memory capacity of programmable apparatus 104.

Figure 3C:
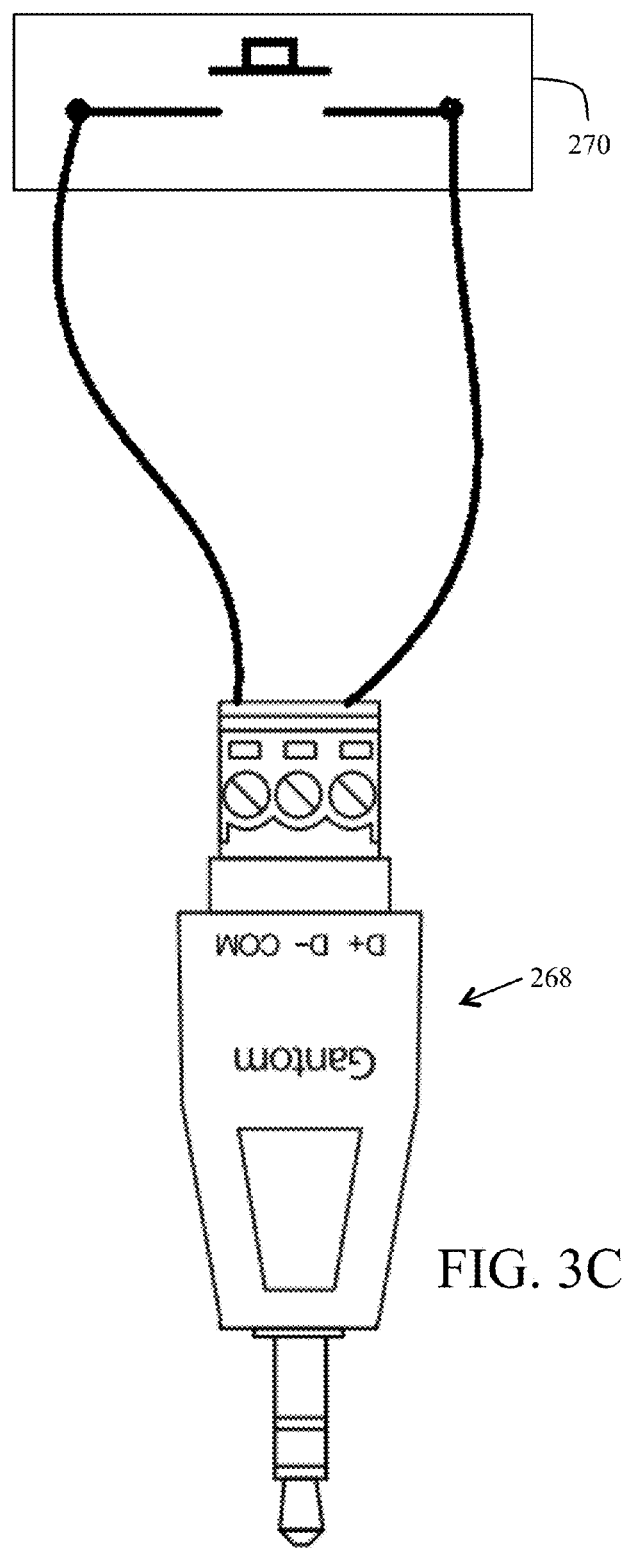
FIGS. 3C and 3D are non-limiting, exemplary illustrations of external switching mechanisms or schemes to enable selection and activation of a desired configuration profile of a programmable apparatus when in standalone mode in accordance with one or more embodiments of the present invention.
Figure 3D:
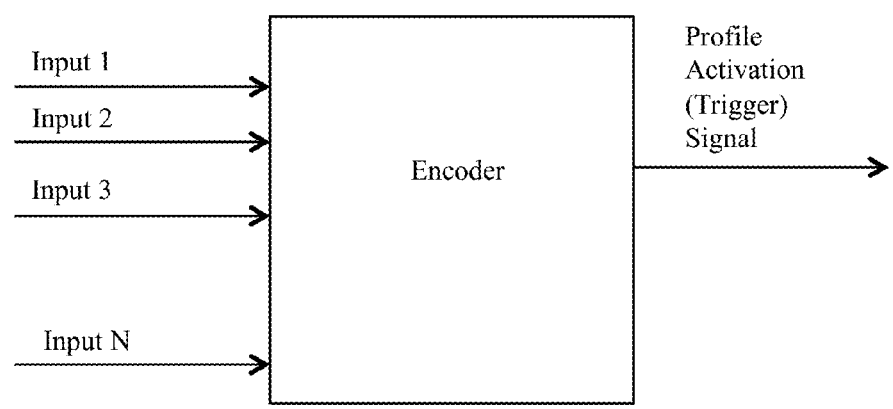

When programmable apparatus 104 is standalone and powered ON, switch 270 illustrated in FIG. 3C or others shown in FIG. 3D may be used to access the non-default profile (i.e., the second or any subsequently saved configuration profiles such as profile N) for execution by programmable apparatus 104. When connected to computing device 102, simple selection of the profile from display screen of FIG. 3B-8 and a play GUI icon 222 on control configuration screen 212 will enable programmable apparatus 104 to retrieve the saved configuration profile from the associated memory location of the programmable apparatus 104 and execute output the effects. In fact, even if the default configuration profile is selected, simply actuating and holding switch 270 would enable programmable apparatus 104 to immediately switch to executing the second configuration profile while the switch 270 is active. As switch 270 is released, programmable apparatus 104 will switch back to outputting default configuration profile after the second configuration profile sequence has finished. It should be noted that the playback of a specific configuration profile sequence may either be immediate or commenced after the current configuration profile sequence has finished.

FIG. 3C is a non-limiting, exemplary illustration of an external switching mechanism to enable selection and activation of a desired recorded and saved configuration profile of programmable apparatus in accordance with one or more embodiments of the present invention. As illustrated, a simple barrel plug adapter 268 may be wired out to a switch 270, with the barrel plug 268 connected to (or inserted into the signal port) of programmable apparatus 104. Switch 270 illustrated may be a momentary button acting to remotely trigger to activate a non-default configuration profile. That is, when actuated, switch 270 electrically connects D+ terminal to COM terminal to generate a trigger single that is recognized by CPU 302 of apparatus 104 to playback a non-default profile.

It should be noted that other schemes may be used to access and activate any one or more of a multiplicity of configuration profiles of programmable apparatus. For example, encoding schemes may be used to generate N trigger signals to select any one of the N configuration profiles. As illustrated, the encoding scheme may include a well known hardware encoder with N inputs from contact switches (not shown) that can convert the received inputs and encode a corresponding configuration profile number into a data packet in well known methods that transmit a "play back command."

It should be reemphasized that the illustrated screenshots and GUI icons are non-limiting, exemplary illustrations of only a few, handful of specific examples of screenshots and GUI icons used for a few, handful of operations and functions for only a single, very specific apparatus (e.g., the intelligent micro-spotlight lighting fixture 104) for convenience of example and discussion purposes, and are by no means exhaustive and should not be limiting. Further, computing device 102 is only used to control and eventually program apparatus 104. Once programmed, programmable apparatus 104 may then be operated in standalone (connected only to the power source with computing device 102 removed). Any one of the one or more configuration profiles saved in the integrated memory of programmable apparatus 104 may then be activated by any optional trigger (for example, as shown in FIG. 3C) and output. Outputs of one or more programmable apparatuses 104 may also be coordinated to operate as multiple standalone programmable apparatuses 104 for entertainment.

Figure 4A:
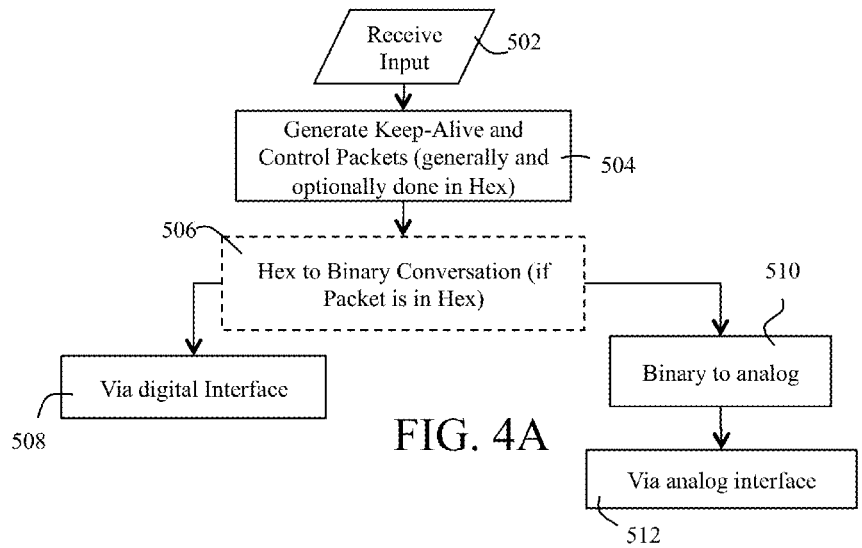
FIG. 4A is a non-limiting, exemplary flowchart for eventual transmission of keep alive and control packets by the controller application in accordance with one or more embodiments of the present invention.

FIG. 4A is a non-limiting, exemplary flowchart for input and eventual transmission of keep-alive packets and control packets by the controller application in accordance with one or more embodiments of the present invention. As indicated above, manipulations of any one of the illustrated GUI icons in well-known conventional manner (e.g., via touch screen) is received as input command (e.g., tactile gesture input by one or more keystrokes) 502 by controller application 110 of computing device 102 and translated to control signals that are eventually transmitted via the connected physical interface 180 to control the physically connected programmable apparatus 104.

In general, a keystroke may be defined as when a GUI icon is selected (or in multi-touch when a GUI icon is released), which corresponds to a function of programmable apparatus 104. In other words, a keystroke is a command for programmable apparatus 104 to output a desired function. Any GUI input (e.g., modulation of color palettes, etc.) received at operation 502 is converted to a byte stream at operation 504 to be transmitted, with each byte converted to its binary bits at operation 506 to generate a binary stream.

Controller application 110 converts the input gestures received at operation 502 into desired packet. In other words, users' gestures (one or more keystrokes) are input via a touch screen that manipulate GUIs, with the user gestures interpreted by controller application 110 of computing device 102 in well-known manner, and converted or mapped to desired packets as command control signal packets.

The generated packets (which may optionally be expressed in hexadecimal values) may then be converted to binary bits at operation 506 (if packets are generated in hexadecimal). It should be noted that controller application 110 may in fact, directly convert the input gestures at operation 502 into binary bits without having to first generate hexadecimal set of packets (at operation 504) to be later converted to binary bits at operation 506. In other words, controller application 110 at operation 504 may simply generate keep-alive and control packets directly in binary rather than hexadecimal, eliminating the need or requirement for operation 506.

As indicated above, computing device 102 may include a single or multiple physical interface ports 180 that may be analog or digital based interfaces, non-limiting examples of which may include the illustrated audio port 106 that is analog based, a USB port that is digital based, or other types of ports such as XLR. Accordingly, after controller application 110 generates the data packets (formatted unit of digital data) at operation 504 in to binary bits (assuming no need or requirement for conversion at operation 506), next, depending on the type of physical interface port 180 used, the packets (control or Keep-Alive) are either directly transmitted via a digital interface (e.g., a USB port) at operation 508 or converted to analog signal at operation 510 for transmission via an analog interface (e.g., the audio signal port 106) at operation 512.

Figures 1, 4B:
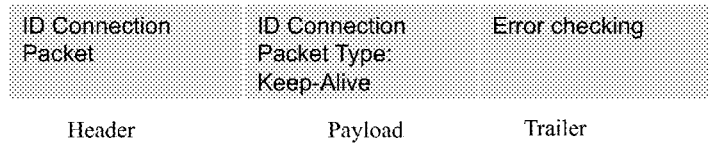
Figures 2, 4B:
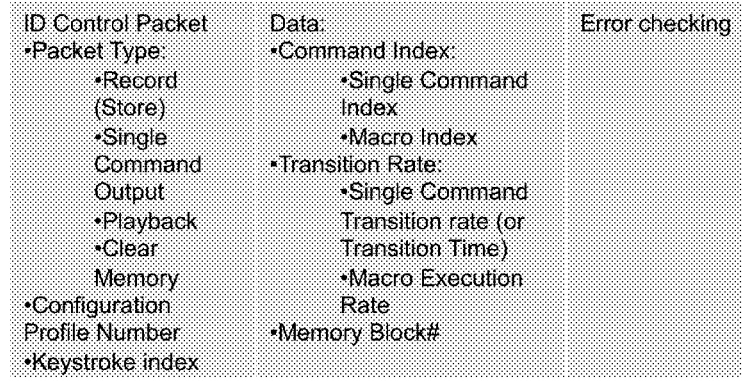

FIGS. 4B-1 and 4B-2 are non-limiting, exemplary illustrations of different types of data packets used in accordance with one or more embodiments of the present invention. FIG. 4B-1 is non-limiting example of keep-alive packet in accordance with one or more embodiments of the present invention, generated upon launching of controller application 110 and formatted to include a header that has a specific sequence of bytes that identifies the packet as a keep-alive packet, a payload that has specific sequence of bytes associated with a keep-alive packet, and a trailer that contains error checking data such as the well-known checksum error checking scheme.

FIGS. 4B-2 is non-limiting example of command control signal packet in accordance with one or more embodiments of the present invention, generated as a result of input received by controller application 110. The command control signal packets (or simply "control packets") are formatted to include a header, a payload, and trailer.

The header of the command control signal packet identifies the packet as a particular type of control packet (or packet type), which may include, for example, a record (or store or save) packet, single command output packet, playback packet, and clear memory packet. The header further includes configuration profile number (which enables access to specific memory location of programmable apparatus 104), and Keystroke index, which enables access to specific address within the specified memory location (detailed below). Keystroke index may be used to effect output of programmable apparatus in the sequence (order) defined by the keystroke index.

Header ID control packet as "record" identifies the control packet as a record type where record GUI icon 220 is selected and its payload data is to be recorded and saved at the specific memory location defined by configuration profile number in the header, and at start address of the memory location defined by keystroke index of the header. It should be noted that when record GUI icon 220 is selected, computing device 102 generates a clear memory packet, which would clear memory based on configuration profile number of header and memory block number of payload (detailed below) to "ready" for recording, including resetting the keystroke index. There may be an implementation where the clear packet is not sent and the keystroke index is not reset to zero, in this case the content of record packet would be appended to the previous content in memory, further adding data to the rest of the memory block.

Header with ID control packet as "single command output" identifies the control packet as a control signal where apparatus 104 executes and outputs any command in control signal packet payload received from computing device 102.

Header with ID control packet as "playback" identifies the control packet as a playback of a saved configuration profile where, for example, play GUI icon 222 is selected and configuration profile number of header points to memory location of the integrated memory of apparatus 104 of the saved configuration profile for execution and output. The keystroke index of the header points to an address of the memory location. The payload of the control packet includes control data (actual data for configuration control and programming of the programmable apparatus), with the trailer containing error-checking data such as the well-known checksum error-checking scheme.

In general the payload of the command control signal packet may include (at the very least) a command index (a mapped index number) that associates the GUI icon with corresponding one or more functions of the programmable apparatus 104. The command control signal packet further includes a command transition rate data (transition rate for short) indicative of rate of transition time between commands, from one command to next command or effect rate of a macro, and may also include memory block number (detailed below), indicative of the location within memory to delete memory data or save the payload data.

In general, and for discussion purposes only, the command index within the payload of the command control signal packet may be categorized as a single command index and a macro command index (or macro index for short). Single command index generally relates to selection of a single color GUI icons on color palette 218. A macro index (similar to single command index), generally relates to selection of any one of the macro GUI icons 228 (e.g., selection of strobe GUI icon 230, or flicker 232, or flash 234, or heartbeat 236). In other words, both macro index number and single command index are index mapping numbers that points to either a macro function of firmware of the programmable apparatus 104 or a single function. Accordingly, both single command index and macro index are command indexes that point to a feature of the firmware of the programmable apparatus 104 and are indexed mapped and displayed as the illustrated GUI icons. The purpose of a macro function is to reduce the number of keystrokes required by a user to achieve the same effect, this also reduces the memory required to store such an effect.

As with command index, the transition rate is also categorized as a single command transition rate (or transition time) and macro execution rate (or time). Single command transition rate generally relates to rate of transition time between single commands associated with selection of color GUI icons on color palette 218. Macro execution rate generally relates to rate of execution (or output effect) of a single selected macro from macro GUI icon 228 that effect output. Macro execution rate and transition rate use the same array of GUI icons 216, but with different output effects. Combination of single command index (e.g., selection of two single colors) and the transition rate (selected from any one of the GUI icons 216) generates an output with transition from one command to next (one color to next color). Combination of macro index (e.g., selection from a single macro GUI icon 228) and macro rate (selected from any one of the GUI icons 216) generates an output effect in relation to the output of the single macro GUI icon selected. For example, selecting macro heartbeat GUI icon 236 and with macro execution rate by selecting fast GUI icon 244 would output a light that mimics a fast heartbeat rate—hence faster rate of execution. Selecting macro flash GUI icon 234 but with slow GUI icon 240 would output flashes of light at a slow rate (slow effect). Accordingly, the macro "execution rate" may be defined as the "output effect" of selected macro—when combined with any one of the array of GUI icons 216.

In general, a keep-alive packet identifies to a CPU 302 (FIGS. 6A and 6B) of programmable apparatus 104 that the keep-alive packet itself is an actual true keep-alive packet and not some random noise so that CPU 302 will continue to maintain communications with computing device 102 with the expectation of receipt of control packets from computing device 102.

It should be noted that the keep-alive packets and the control packets may follow any known protocol, and are preferably transmitted serially. Controller application 110 generates and transmits control packets along with keep-alive packets when input is received (operation 502) by controller application 110. In general, one or more control packets and one or more keep-alive packets are transmitted serially as a stream of packets, with at least one keep-alive packet transmitted within a predetermined time interval to maintain (or keep alive) communications between programmable apparatus 104 and computing device 102 as described above. Of course, the control packets may also be transmitted serially and keep-alive packets transmitted serially, with both transmitted in parallel as individual serial streams of packets (which may be physically accomplished by using two separate wires).

As indicated above, controller application 110 may generate the packets at operation 504 in hex-bytes (control and keep-alive packets) and converts the packets to binary bits at operation 506, next, depending on the type of physical interface port 180 used, the packets (control or keep-alive) are either directly transmitted via a digital interface (e.g., a USB port) at operation 508 or converted to analog signal at operation 510 for transmission via an analog interface (e.g., the audio signal port 106) at operation 512. Continuing with the non-limiting example illustrated in FIG. 1 where an audio port 106 is used to transmit control signals, the digital control signal and digital keep-alive signal are converted to an analog signal at operation 510 and transmitted via the analogue audio port 106.

The conversion of the binary control and keep-alive signals (the packets) into analog control and keep-alive signals is readily accomplished in well-known and conventional manner by existing hardware such as an audio codec and processor 166 of the computing device 102 that includes a Digital to Analog (D/A) and Analog to Digital (A/D) converter. The conversion is similar to conversion of stored digital music within a computing device 102 and output thereof via an audio port 106, which is in analog format as an analog audio signal. In other words, the digital control and keep-alive signals are converted to respective analog signals and output via the audio port 106, but output at normal audio frequency of less than 44.1 KHz. It should be noted that in general, 44.1 KHz is the general sampling rate of the audio codec and hence, the frequency (rate of data provided to it) generated by controller application 110 is less than half 44.1 KHz (or approximately 20.5 KHz). In practice however, using a sample rate of 38.4 KHz (which is less than 44.1 KHz) to generate a 9600 baud signal (4 samples per bit) is a preferred transmission speed because 9600 baud is a common serial transmission speed and having more than 2 samples per bit improves the fidelity of the signal shape. Specifically, increasing the number of samples per bit reduces signal overshoot and resonant ringing on the Digital to Analog converter output of the audio codec. One can certainly increase the samples per bit even further at the cost of slower transmission speeds, for example a 38.4 KHz sampling rate with 16 samples per bit would generate more precise signals but can only transmit at 2400 baud. It should further be noted that a conventional audio codec of a computing device 102 includes an Application Programming Interface (API) with various attributes (e.g., number of bits being coded and the sampling rate), the values of which may be changed in well-known and conventional manner by controller application 110 to output analog signals at a desired frequency. In particular, the API of the audio codec enables selection of a particular voltage level of an audio signal to be output via the audio port.

Since signals (control packet or keep-alive packet) from controller application 110 are all digital, for single ended signaling transmission (detailed below), for every digital "0," the audio-codec instructed by processor 166 outputs a maximum negative voltage (−Vmax) and for every digital "1," outputs a maximum positive voltage (+Vmax). The actual conversation of the digital signals (keep-alive and or control packets) is accomplished by the D/A converter of processor 166 of computing device 102, which instructs the codec to output maximum negative or positive voltages. As detailed below, for differential signaling transmission, for every digital "0," the audio-codec instructed by processor 166 outputs a first maximum negative voltage (−Vmax1) and a differential thereof, which is a first maximum positive voltage (+Vmax1), and for every digital "1," outputs a second maximum positive voltage (+Vmax2) and a differential thereof, which is a second maximum negative voltage (−Vmax2).

It should be noted that in order for audio-codec to be able to generate maximum voltages instructed by the processor 166 and actually output the maximum voltage (positive or negative), audio volume of computing device 102 must be set to maximum level to ensure signal integrity. If the audio volume of computing device 102 is low (not set to maximum highest level), resulting analog voltage level (or strength) may not be sufficient to be detected by programmable apparatus 104. Accordingly, during operation 206 (FIG. 3A), users may be provided with instruction to set the volume level of computing device 102 to maximum, highest level. As detailed below and best illustrated in FIG. 4C-1, analog signal output 514*b* from audio-codec within about 50 msec to about 200 msec is the maximum positive voltage (+Vmax), which is a representation of digital signal received from controller application 110.

Figures 1, 4C:
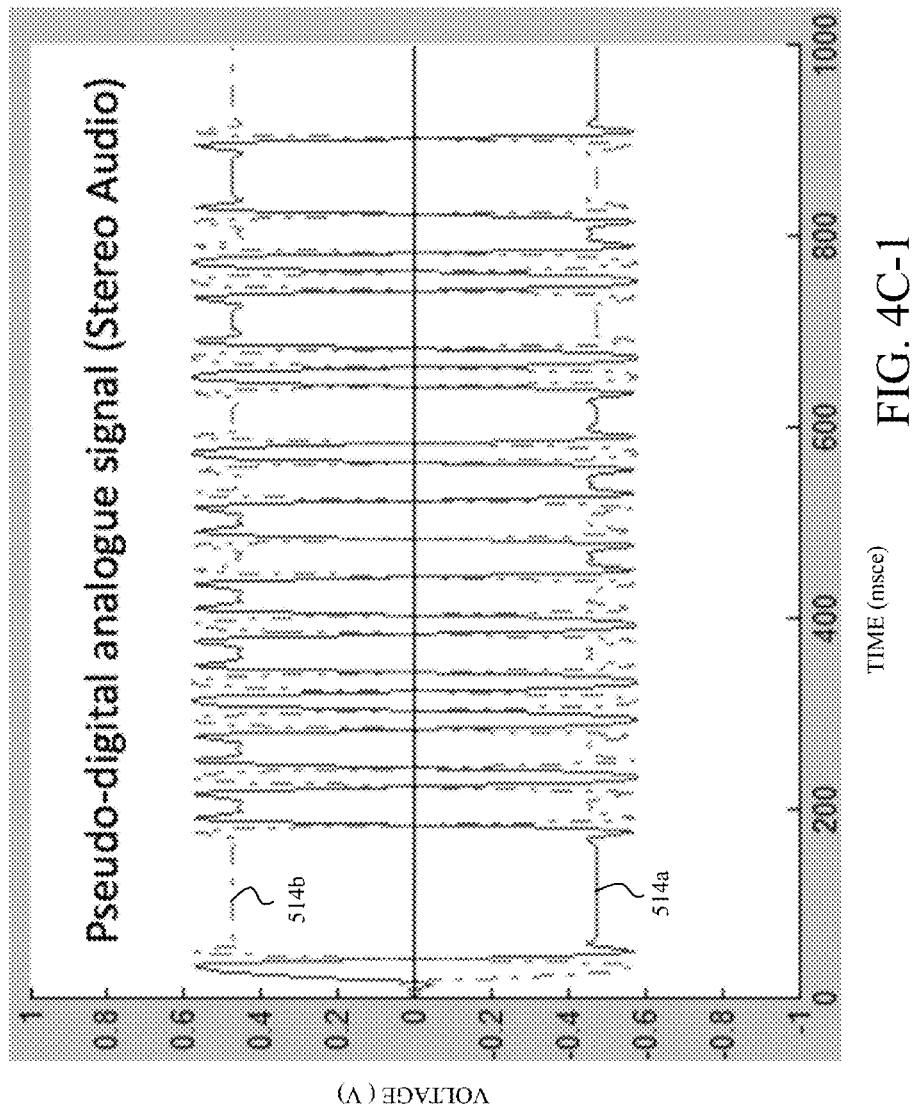
Figures 2, 4C:
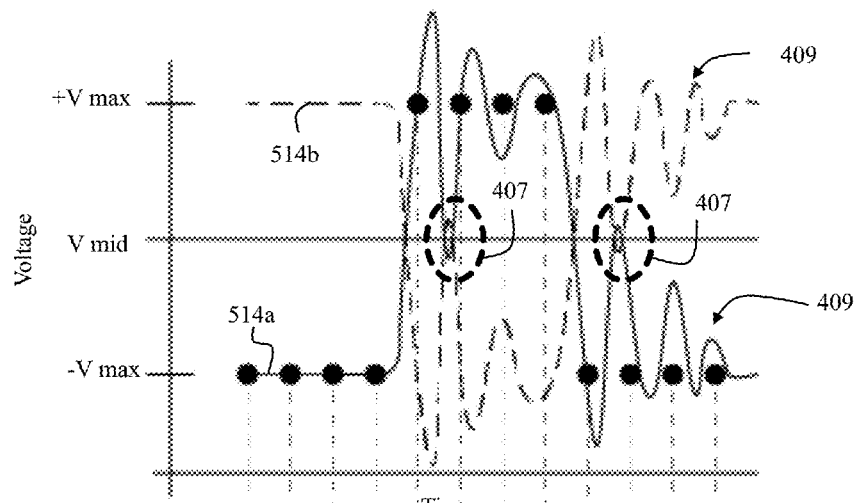
Figures 3, 4C:
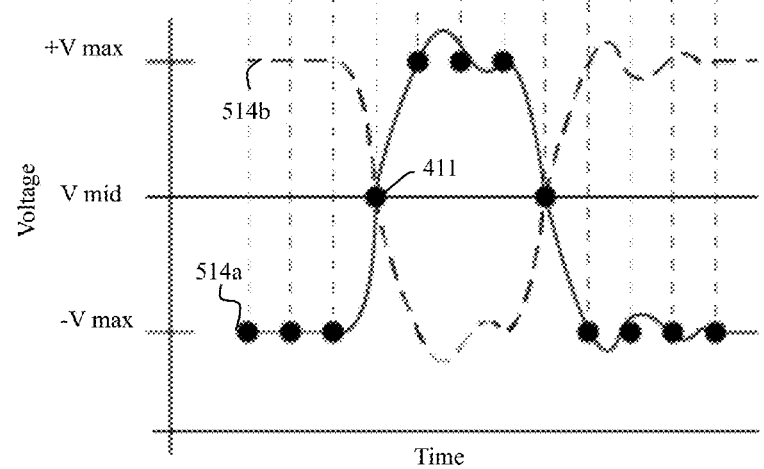

FIG. 4C-1 is a non-limiting example of an analog signal (in a pseudo-digital form) of a converted stream of digital packets (control and or keep-alive) using any number of well-known pre-existing hardware as part of the audio port interface of a computing device, which may include an audio codec. As illustrated, the high and low logic levels of the analog signal mask the analog signal (i.e., analog nature) of the audio signal and cast it as "digital-like" analog signal and hence, generating a pseudo-digital, but analog signal that contains application controller signaling information (as a result of entering commands). As illustrated, analog signal 514*a* is a non-limiting example of an analog version of a digital control and or keep-alive packets output at audio port 106 of computing device 102, where a digital zero (0) of a packet is converted to an analog negative voltage level and a digital one (1) of the packet is converted to an analog positive voltage level in accordance with predefined attributes of the API of the audio codec, the values for which are set by the controller application 110. (It should be noted that for differential signaling transmission (detailed below), signal 514*b* may be the differential of signal 514*a* or vice versa).

Figure 5A:
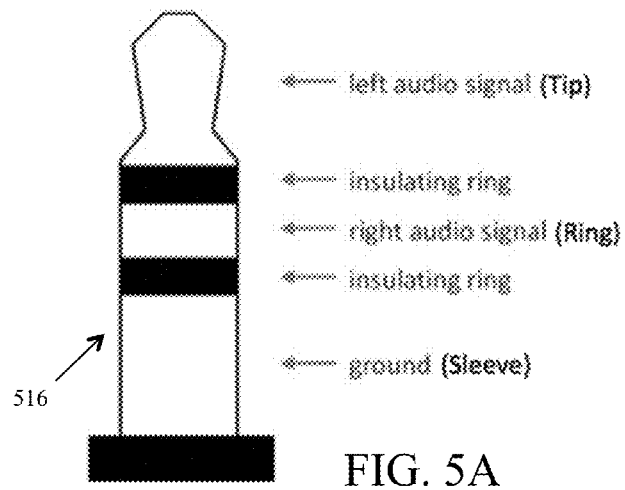
FIGS. 5A to 5F are non-limiting, exemplary illustrations of hardware and associated signaling schemes in accordance with one or more embodiments of the present invention.
Figure 5B:
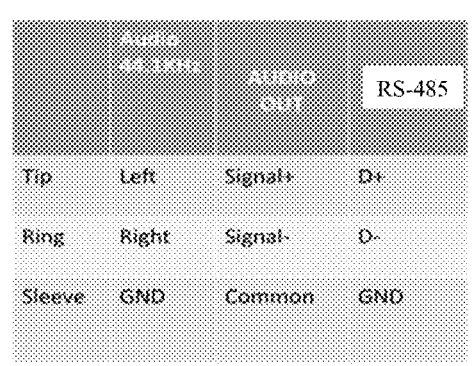
Figures 1, 5C:
Figures 2, 3, 5C:
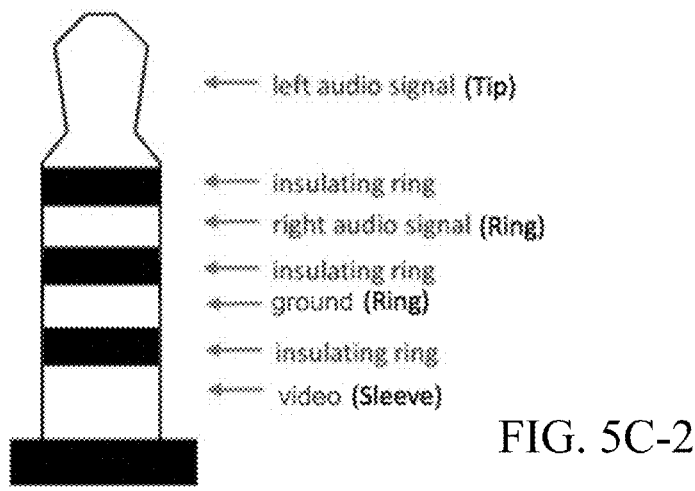

As is detailed below in relation to FIGS. 5A to 5F, the analog signal 514*a* may be transmitted using differential, single ended, multi-differential, or multi-single ended signaling transmission because most physical interface ports (e.g., a typical audio port or a typical USB port) have the actual hardware to enable these types of transmissions. As illustrated in FIG. 5A, a typical audio jack has a tip, ring, sleeve configuration, which as illustrated in the table of FIG. 5B, may for example, be mapped to an RS-485 implementation protocol values of D+, D−, and GND for differential signaling transmission. On the other hand, FIG. 5C-1 is another example of a mapping table for an audio jack output to transmit serial data as a single-ended transmission. As yet another example, other audio jacks may comprise of a tip, multiple rings, and sleeve configurations that may, for example, be mapped to other permutations of serial transmission for single-ended/differential transmission. Further, as illustrated in FIGS. 5C-2 and 5C-3, multi-single ended and or multi-differential transmission may also be used to control multiple apparatuses simultaneously using a single computing device 102 by transmitting several serial signals S1, S2, S3, Sn using other well-known audio jacks with multiple ring configuration (FIG. 5C-2). It should be noted that the tip, ring, sleeve mapping to various signaling may be varied, for example, tip may be mapped to right or signal− (or D−) and ring to left (or D+) or some other combinations or permutations.

Figures 5D, 5E, 5F:
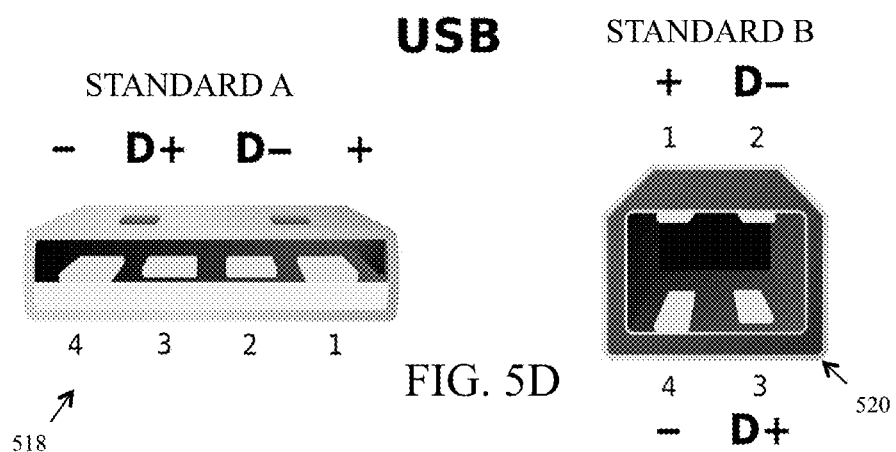

FIG. 5D illustrates two conventional USB jacks 518 and 520 with a set of pins, which as illustrated in the table of FIG. 5E, may also be mapped to an RS-485 implementation values of D+, D−, and GND for differential signaling transmission using USB. On the other hand, FIG. 5F is a mapping table for USB that maps USB ports to an RS-458 implementation of values of D+, D−, and GND for single-ended transmission. As with an audio jack, various permutations of mapping USB or XLR connection to various signaling is possible for example, Pin 2 (or Data− or Signal−) of USB may be mapped to D+RS-485 instead of the illustrated (D−).

Accordingly, whether using an audio port 106 with its D+/D− or USB port with its D+/D−, both differential and single-ended transmissions are possible. For single ended transmission scheme, the D− may be set to GND by controller application 110, which means the D− terminal may be at a constant voltage GND, whereas D+ terminal varied in voltage output.

Referring back to FIG. 4C-1, for single-ended signaling via the audio port, in the exemplary instance illustrated, only the analog signal 514*a* is output via the Tip of the audio jack, with the Ring set to GND by controller application 110. For USB for example, actual digital signals may be output via pin 3 while the pin 2 may be set to GND, for example. However, for differential signaling via audio port 106, analog signal 514*a* may for example, be output via the Tip, and its differential (complementary signal) 514*b* via the Ring with the sleeve connected to GND. For differential signaling via the USB, the digital signals may be output via the pin 3, the differentials via the pin 2 with pin 4 connected to GND. Accordingly, with differential signaling, analog signals 514a and its differential 514b are generated and transmitted as illustrated in FIG. 4C-1, with differential voltages carried over cable 108 to connected programmable apparatus 104 whereas with single ended signaling, only analog signal 514a is generated and transmitted, with D− transmitting a GND signal. It should be noted that the physical interface port of the computing device may be an audio port or other type of port (e.g., USB, XLR, etc.) whereas that of the programming apparatus may be a USB port and or other type such as, for example an XLR connection. Accordingly, the ports of the first and the second devices need not be the same and may be different.

For analog pseudo digital signals (such as those shown in FIG. 4C-1), signal integrity (signal decay, data corruption (due to signal crossings 407), ringing 409 etc. shown in FIG. 4C-2) is an issue with respect to certain computing devices 102 and more specifically, for differential signaling. Accordingly, (as best illustrated in FIG. 4C-3) to maintain the integrity of sync or control packet signals transmitted from device 102 to apparatus 104 (as singles 514a and 514b), application controller 110 may transmit (or drive) the signals to some set intermediate voltage value Vint at the transition point when the signals rise or fall between +Vmax/−Vmax. This scheme prevents data corruption for differential signals due to potential signal overshoot (causing signal crossing) or "ringing." That is, by driving the signal 514a/514b to an intermediate value Vint, the application controller 110 generates a smoother signal at a lower bandwidth transition between +Vmax and −Vmax (best shown in FIG. 4C-1). Stated otherwise, the scheme reduces or impedes the "sudden" transition between +Vmax and −Vmax. It should be noted that Vint is a replacement of one or more samples 411 (mentioned above with respect to the 4 samples per bit), which would have been either +Vmax or −Vmax. As indicated above, 4 samples per bit is only a non-limiting, exemplary sampling rate.

Figure 6A:
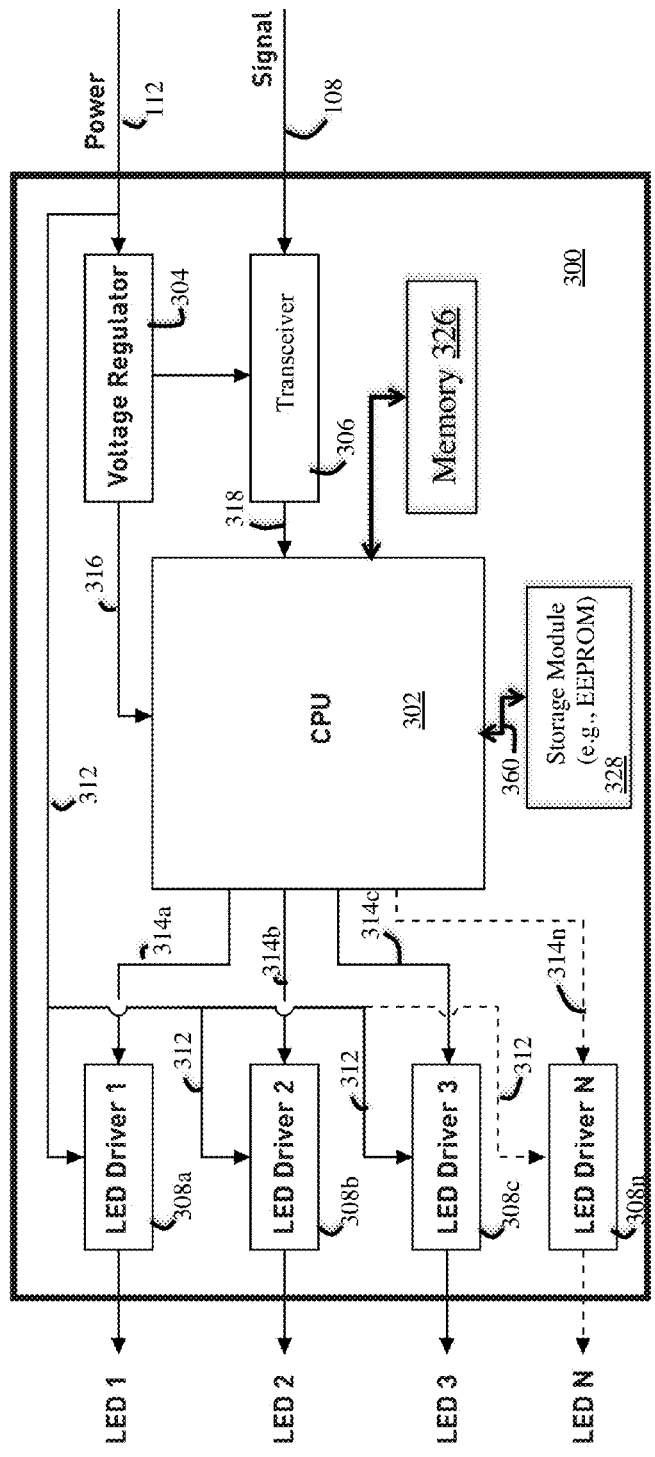
FIGS. 6A and 6B are non-limiting, exemplary block-diagram illustrations that detail a circuit topography of an intelligent micro-spotlight lighting fixture (to be used as an example of a programmable apparatus) in accordance with one or more embodiment of the present invention.
Figure 6B:
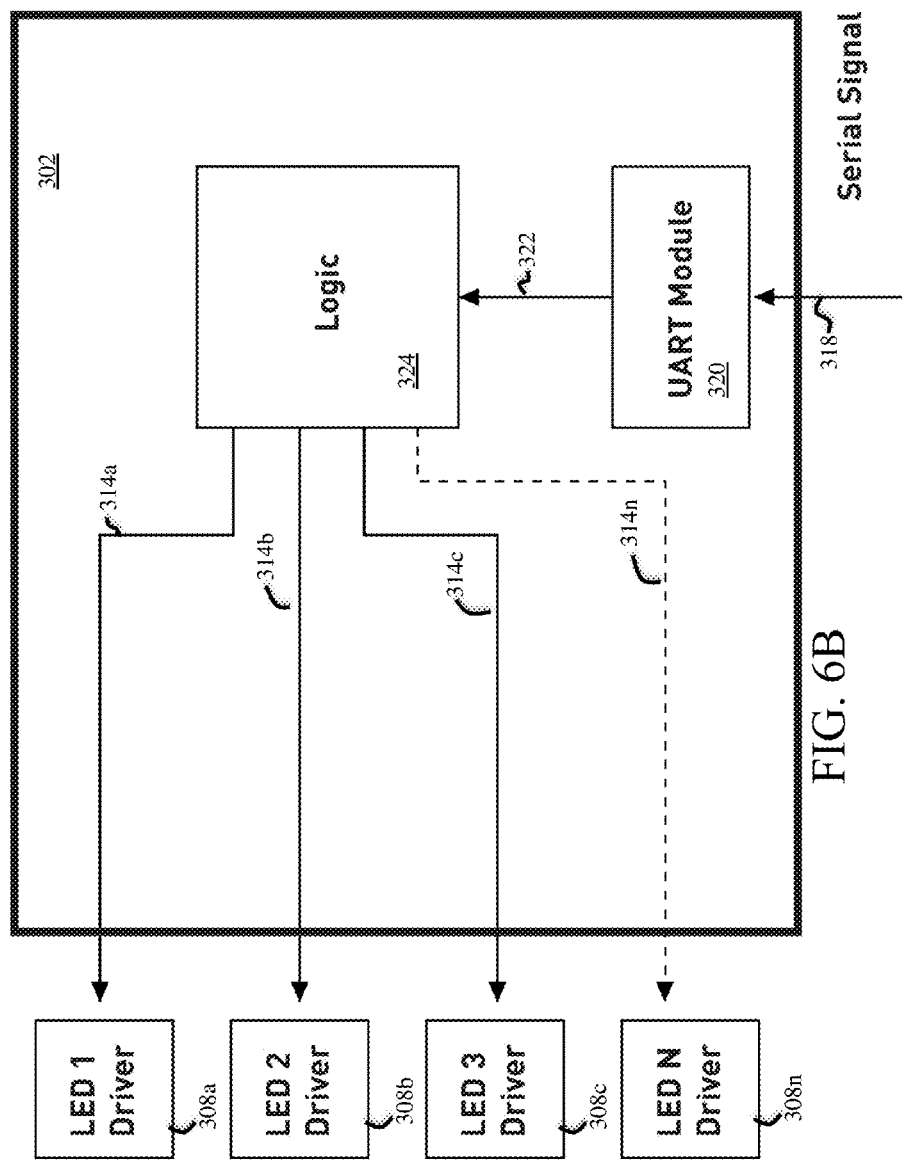

FIGS. 6A and 6B are non-limiting, exemplary block-diagram illustrations that detail a circuit topography of an intelligent micro-spotlight (to be used as an example of a programmable apparatus 104) in accordance with an embodiment of the present invention. As illustrated in FIGS. 6A and 6B, control circuit 300 of intelligent micro-spotlight 104 is comprised of Central Processing Unit (CPU) 302 for processing of power and control signals (keep-alive and or command control signal packets). Control circuit 300 further includes storage module 328 and memory 326, which may comprise a Read Only, Random Access, Volatile, and or Non-Volatile memory for storage of applications and instructions. A voltage regulator 304 of control circuit 300 receives power from power cable 112 and provides regulated voltage (step-down voltage) 316 to CPU 302.

Further included in control circuit 300 is a signal receiver 306 that receives control signal from signal cable 108 and provides logic level signal 318 to CPU 302. It should be noted that signals on signal cable 108 are typically higher voltage and using multiple (differential) lines (D+ and D−) such as using the RS-485 standard to overcome transmission noise whereas signal 318 are single logic level signals. Receiver 306 does a conversion of signal format and shifts the voltage. Signal receiver 306 (exemplarily illustrated as a differential amplifier 301 in FIG. 6C) and its functionality are well-known. It should be noted that signal cable 108 is illustrated in FIG. 6A for completeness and discussion in view of programming intelligent micro-spotlight 104 (detailed below), but would not be required when intelligent micro-spotlight 104 is already programmed and in use in standalone operation. Control circuit 300 also includes one or more light source driver modules 308 that receive power (PCB power lines 312) from power cable 112 and processed signals (PCB signal lines 314) from CPU 302 to power and operate (modulate) one or more light sources 206.

As best illustrated in FIG. 6B, CPU 302 is comprised of a well-known Universal Asynchronous Receiver Transmitter (UART) module 320 for receiving programming control signal 318, and a Logic Unit 324 for decoding received serial signal 322 from UART module 320 and for outputting one or more processed signals 314 for operation of one or more light sources 206. It should be noted that similar communication is possible where the received programming control signal 318 is connected to another input port of the CPU 302, bypassing UART module 320. At minimum, received control signal 318 must be processed and hence, it may be accomplished without input to UART module 320, such as being connected to a general input/output port of the CPU.

Figure 6C:
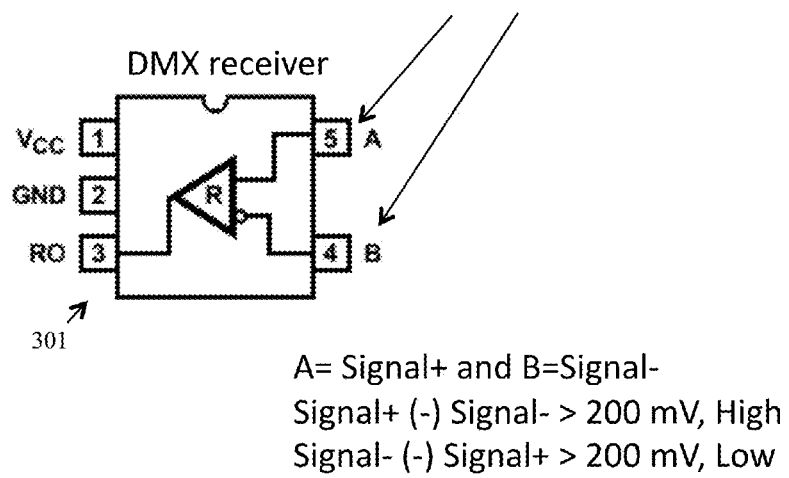
FIG. 6C is a non-limiting, exemplary illustration of a signal receiver in accordance with one or more embodiments of the present invention.

As indicated, if in standalone operation, control signals 360 would be retrieved and read by CPU 302 from storage modules 328 as preprogrammed, stored data, and if used in a non-standalone operation (where intelligent micro-spotlight 104 is being programmed or controlled, which is detailed below), control signal 318 would be used. Referring to FIG. 6C, assuming differential signaling is output via audio port 106, then the generated differential signals 514a and 514b are received at terminals A and B of the differential amplifier 301 of receiver 306, and processed in accordance with the signals shown in FIGS. 6D and 6E.

Figure 6D:
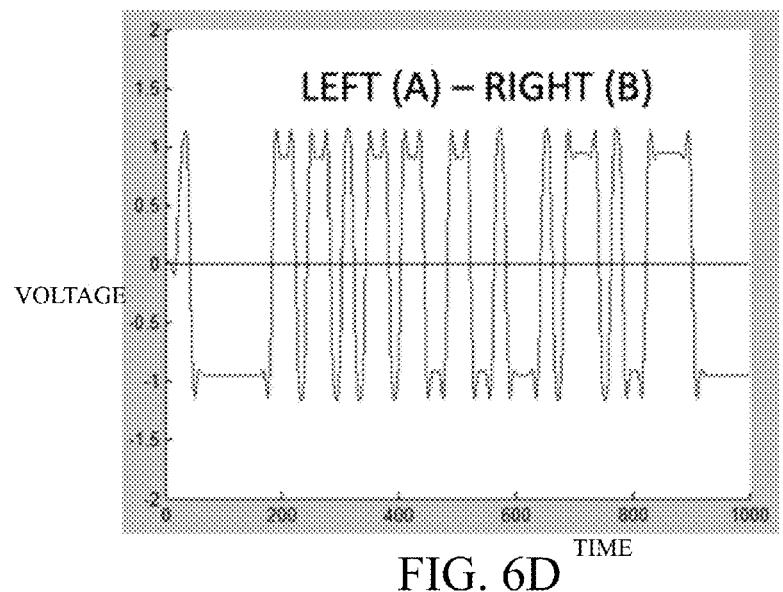
FIG. 6D is a non-limiting, exemplary illustration of processing of analog pseudo-digital signal by the signal receiver of FIG. 6C in accordance with one or more embodiments of the present invention.
Figure 6E:
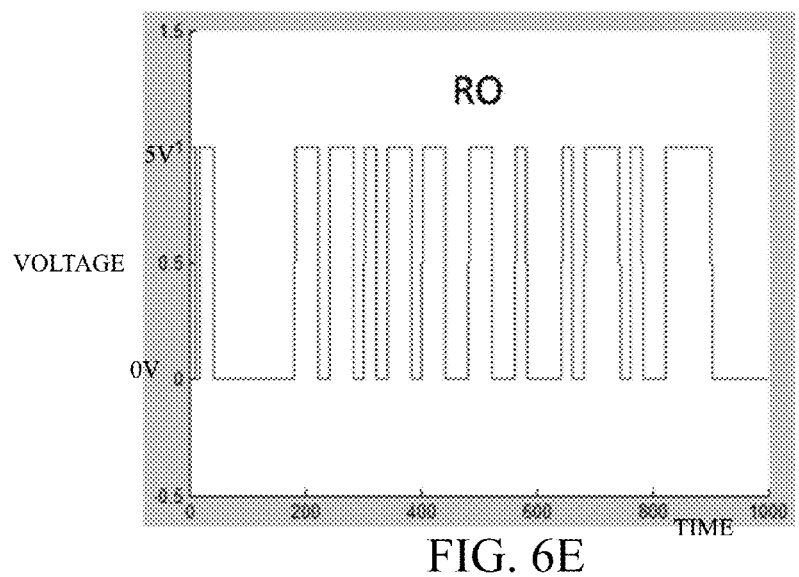
FIG. 6E is a non-limiting, exemplary illustration of an output thereof in accordance with one or more embodiments of the present invention.

FIG. 6D is the actual processing of the input differential pair signals 514a and 514b internal to the differential amplifier 301, and FIG. 6E is the actual output RO, which is a high and low logic level signals (0V and 5V) that mimic signals for control of the programmable apparatus 104 a rate of 9600 baud. In the non-limiting, exemplary instance illustrated, signal 514a (shown in FIG. 4C-1) may be input to terminal "A" of receiver (FIG. 6C) and its differential signal 514b may be input to terminal "B." It should be noted that at input terminal A and B, analog signal 514a and or 514b mimic signals for control of programmable apparatus 104, with the high and low logic levels masking the analog signal (i.e., analog nature) of the audio signal and casting it as "digital-like" analog signal and hence, generating a pseudo-digital, but analog signal that contains control signaling information. The control signaling information at A and B terminals are at baud rate 9600 baud and voltage levels of −1 to +1 Volts.

It should be noted that with single-ended transmission, D− terminal would output the constant voltage (e.g., GND) and D+ would have the fluctuating voltage, with the differential amplifier 301 outputting the differential between the two. It should further be noted that transmitting a single voltage level from audio jack or USB may be directly input into the serial port (UART 320) of the CPU 302, bypassing receiver 306 (and hence, the differential amplifier 301). In other words, the UART 320 may instead directly receive the transmitted signals 514a as a single-ended transmission.

Figure 7A:
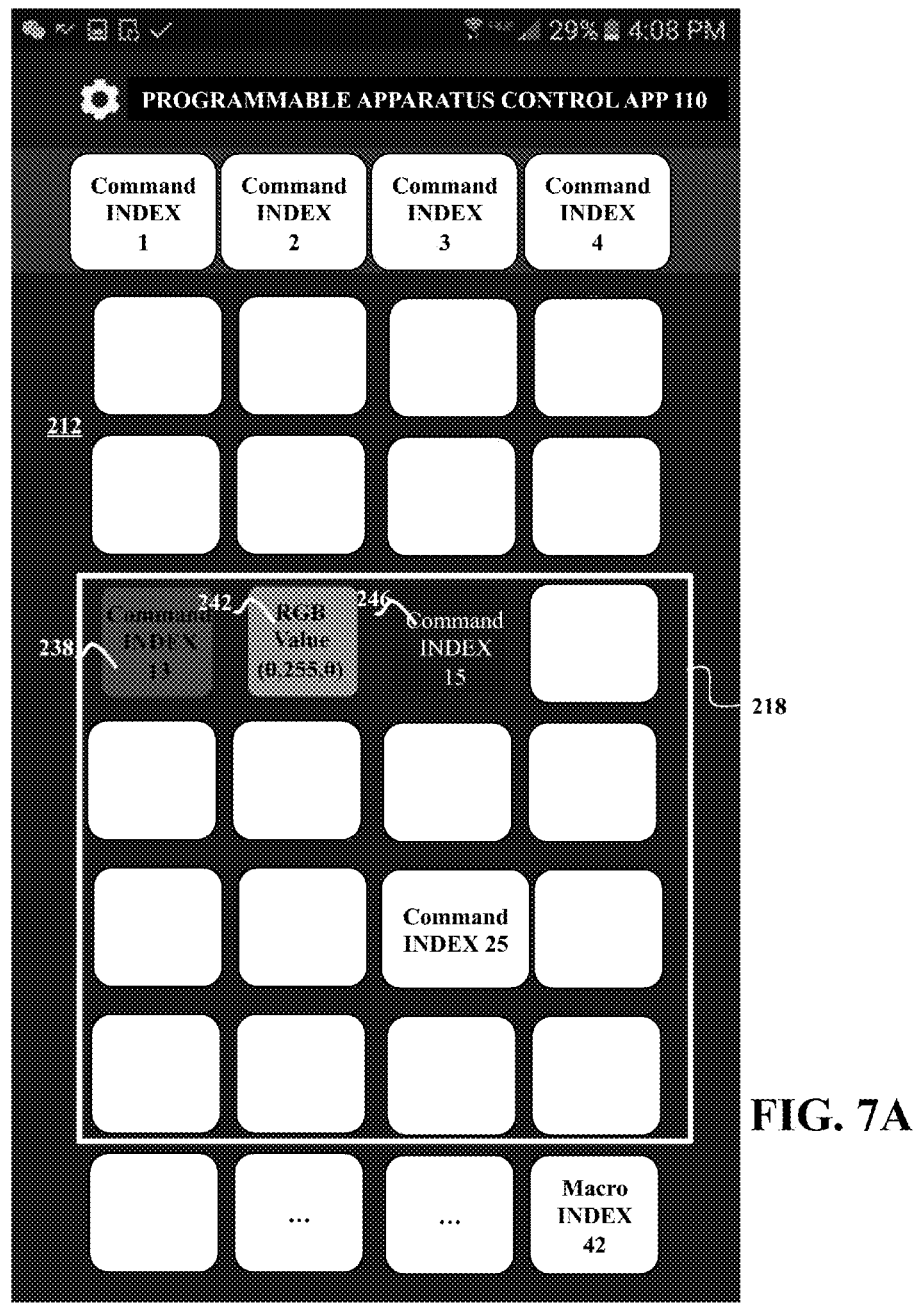
FIG. 7A is a non-limiting, exemplary illustration of a index mapping scheme in accordance with one or more embodiments of the present invention.

Referring back to FIGS. 3B-4 to 3B-8 and in particular FIG. 7A, as indicated above, computing device 102 displays one or more GUI icons, representing index mapping of one or more functions of the firmware of programmable apparatus 104. In other words, the illustrated GUI displays shown in FIGS. 3B-4 to 3B-8 are visual representations of one or more functions (or capabilities) of the firmware of programmable apparatus 104. For example, if the firmware supports output of red color light, controller application 110 in accordance with one or more embodiments of the present invention may be programmed to display red GUI icon 238 that when selected, would cause programmable apparatus 104 to output red color light.

The link or association between any particular GUI icon displayed by computing device 102 and its corresponding (or associative) specific function of the firmware residing in programmable apparatus 104 may be accomplished through many well-known techniques, a non-limiting, exemplary method of which may include, for example the use of well-known index mapping and lookup table. In other words, as best illustrated in FIG. 7A, a GUI icon representing one or more functions of the firmware of programmable apparatus 104 may be mapped to a specific physical position on control configuration screen 212 and displayed by computing device 102, be given a position number (a mapping index or position index), and presented in an appropriate GUI icon design that provides the best visual representation of the one or more function. Put simply, control configuration screen 212 is a visual representation of mapping of the functions (capabilities) of the firmware of programmable apparatus 104. For example, the red color function of the firmware of programmable apparatus 104 may be best visually represented by red GUI icon 238, mapped to a specific physical position on control configuration screen 212 and displayed by computing device 102, and be assigned an arbitrary position number (a mapping index— for example position index 13).

As indicated above, alternatively, for GUI icons representing all of the individual colors within color palette 218, selecting any one or more of the colors may simply transmit an Red, Green, Blue (RGB) or some other color combination value of the selected color as command index rather than a single position number. For example, selecting green GUI icon 242 may transmit to programmable apparatus 104 the RGB values (color code) of Red output=0; Green output=255, and Blue output=0 instead of a single position index of "14."

Programmable apparatus 104 may use a lookup table (best illustrated in FIG. 7B) that matches an index number (or RGB value) associated with any particular GUI icon displayed by computing device 102 with corresponding one or more functions of the firmware of programmable apparatus 104. In other words, the mapped index number points to and call corresponding one or more functions defined by the lookup table.

Continuing with the example of red color function, when red GUI icon 238 is selected, mapped index number thereof (e.g., mapped index 13) is received by programmable apparatus 104, and through the use of lookup table shown in FIG. 7B the corresponding function (red color light function attributes and values thereof) of the firmware pointed to by the index number 13 is called and executed, resulting in output of red color light by apparatus 104. Accordingly, the significant advantage derived from the use of index mapping and lookup table is that only an index number (amongst others as detailed below) may be transmitted as part of a command control signal packet from computing device 102 to programmable apparatus 104 rather than large amount of data that define the one or more functions and their respective attributes represented by the selected displayed GUI icon. In other words, programmable apparatus 104 is not aware that a red color light keystroke was selected, but only that keystroke with index 13 was selected, which when processed by programmable apparatus 104 through lookup table of FIG. 7B, red color light function is called and executed by programmable apparatus 104 and output as red light.

Figure 7C:
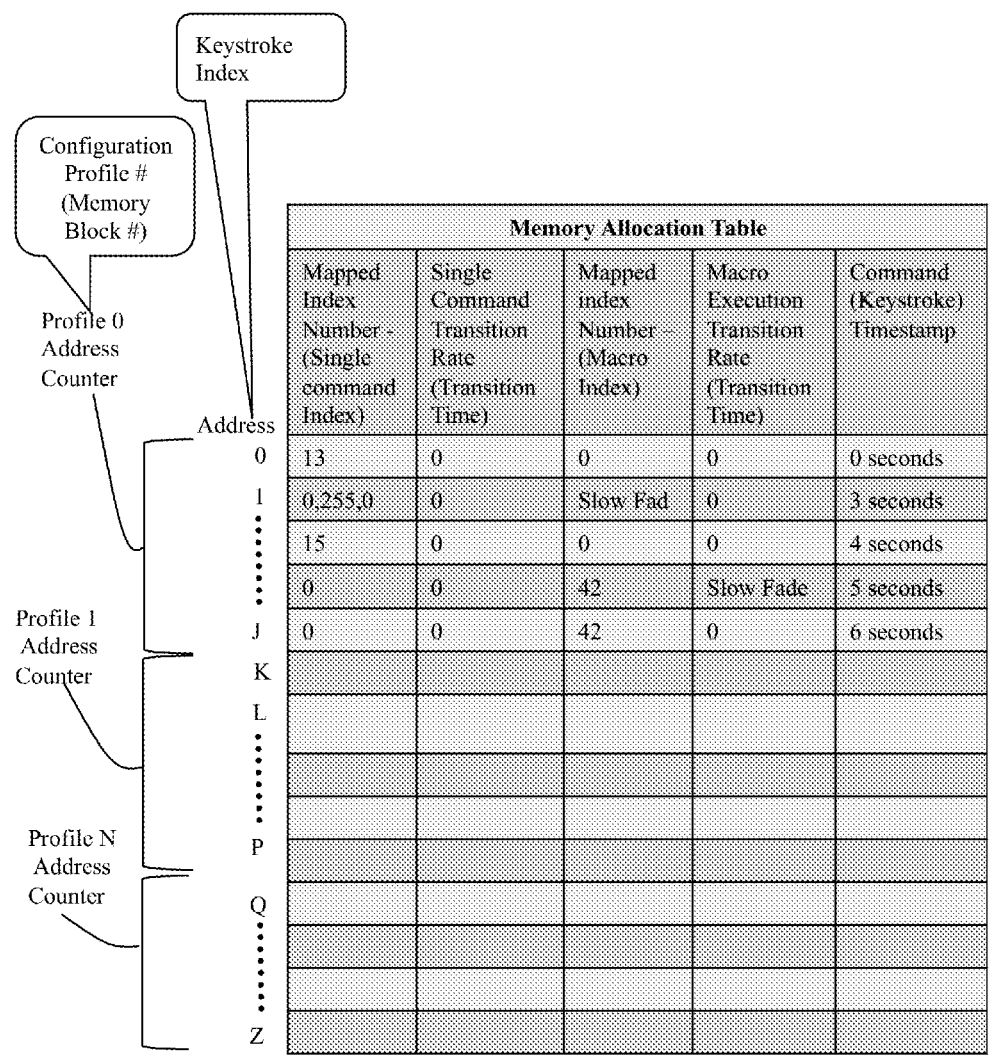
FIG. 7C is a non-limiting, exemplary illustration of an exemplary memory allocation table (or scheme) in accordance with one or more embodiments of the present invention.

FIG. 7C is a non-limiting, exemplary illustration of memory allocation scheme for discussion purposes for one or more command control signal packets recorded as a sequence-set (as a configuration profile) of a programmable apparatus in accordance with one or more embodiments of the present invention. As illustrated, memory of programmable apparatus 104 may be segmented into memory blocks defined by configuration profile number of the header, with each block reserved for a correspondingly index-mapped configuration profile as shown in FIG. 3B-8. For example, configuration profile N is a GUI representation (indexed mapping) of memory block N, which in the non-limiting, exemplary instance includes command control signal packets addressed at Q to Z (with each address pointed to by keystroke index of the header). Accordingly, when configuration profile N is selected for recording commands, all associated command control signal packets recorded are saved within memory segment or block N reserved for configuration profile N. It should be noted that segmenting of memory blocks need not be equal in size and may vary.

As further illustrated, each segment or block may comprise of one or more command control signal packets that are sequenced (ordered) and sequentially saved in the order they were input in their segment. For example, segment or memory block 0 associated with default configuration profile (segment numbered as "0"), may include sequentially entered and saved command control signal packets, with sequence numbers starting at 0 and ending at J.

Payload of each command control signal packet is saved within command sequence (order) number that points to the specific address of the specific memory location as shown. For example, first control packet (with sequence number "0" being may have a command index number 13, which points to and calls a function of the firmware of programmable apparatus 104 (exemplarily shown in the memory allocation table as "13"). The actual firmware and functions shown pointed to by the command index may reside in a completely different memory module, which may actually be a physically different hardware (a dedicated ROM, for example), with command index number in the memory allocation of FIG. 7C simply calling the functions from where functions reside. As further illustrated, memory allocation scheme includes memory locations for a control packet transition rate and also, timestamp.

One or more embodiments of the present invention may optionally provide 8 bits for color representation, which may comprise 2 bits for each color (Red=2 bits, Green=2 bits, Blue=2 bits) and 2 bits for brightness, which reduces the need for the amount of data to be stored in the integrated memory of fixture 104. Of course, even with reduced data (if any), intermediary colors may be generated by calculation and interpolation schemes when transitioning from an initial color value to a final color value (detailed below).

Since only command index numbers (or equivalent such as RGB values) are transmitted and stored as illustrated in FIG. 7C, all the explicit color data between keystrokes does not need to be stored (when transitioning from one color to next). The transitional color data may be calculated in real time by extrapolation from the previously selected color and the next selected color (detailed below). Accordingly, a compressed data format is generated in the memory allocation table (FIG. 7C) by storing end states or end data points of outputs rather than all intermediate data between start and desired final output result, significantly improving communication and data transfer between computing device 102 and programmable apparatus 104 in addition to significantly minimizing the memory size requirements of apparatus 104. Further, the extrapolation scheme as disclosed significantly increases the actual output values available, which are not necessarily index mapped and displayed by computing device 102.

Since recording is done "live" and in real time, a non-limiting, arbitrary time step of about 0.1 s is used to provide sufficient resolution for proper processing of commands (actual, physical keystrokes) by a user. In general, users will most likely be unable to control a user interface (enter different keystrokes) faster than 0.1 s by physically tapping keys or GUI icons. Additionally, one or more embodiments place a non-limiting, arbitrary 10 minutes upper limit of show length (as determined by timestamp data), which means that an arbitrary 13 bits of timestamp data may be used for each command.

With the above non-limiting, exemplary arbitrary parameters, each command may occupy up to 3 bytes (24 bits) of data. In a non-limiting, exemplary embodiment, microcontroller 302 provides sufficient memory to store a few hundred commands and output (e.g., a light show) that may be up to an arbitrary limit of about 10 minutes long. This arbitrary upper limit is more than sufficient for most non-professional users, but may easily be increased or decreased, based on the memory size.

Figure 8A:
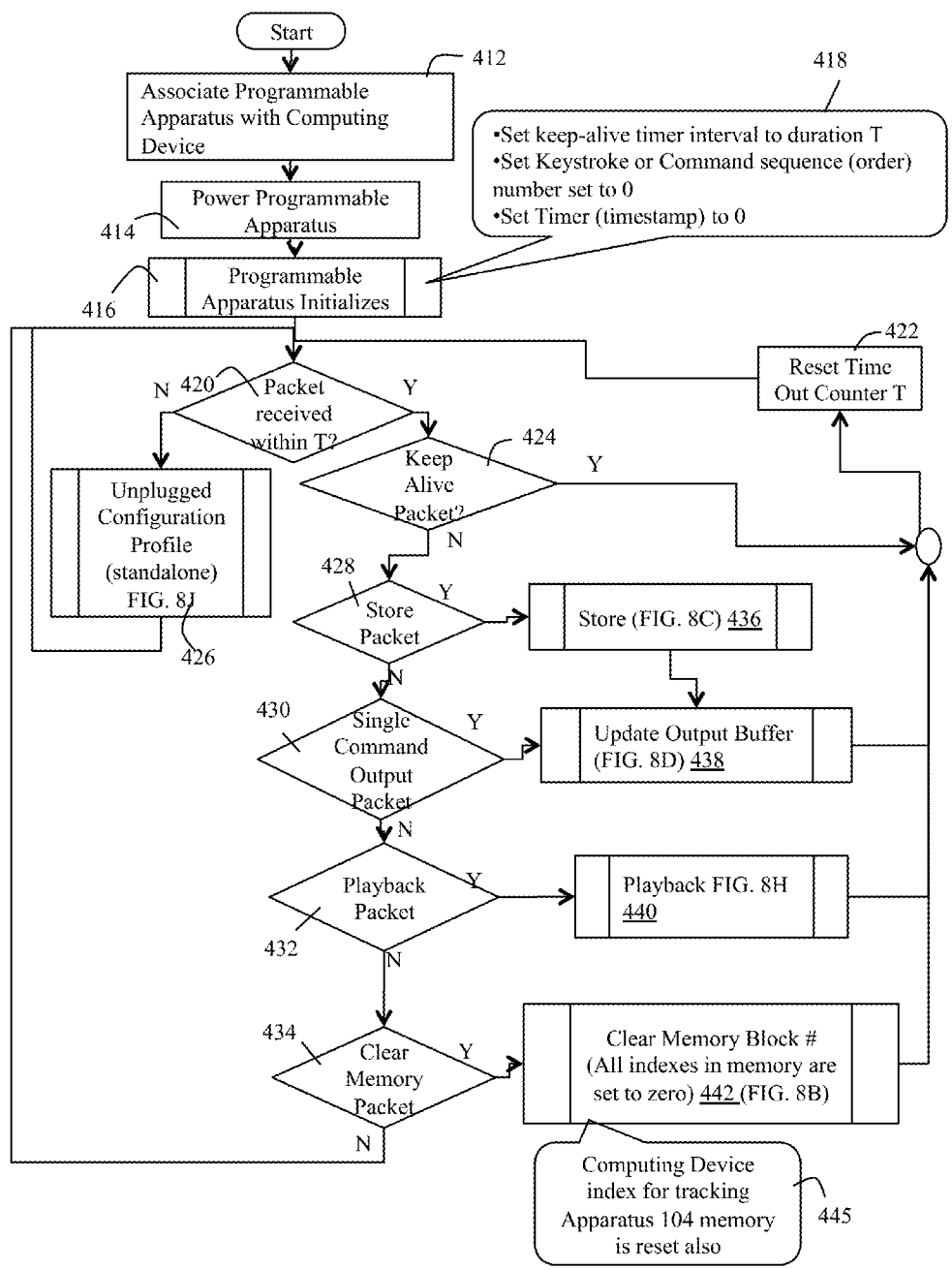
FIGS. 8A to 8J are non-limiting, exemplary flowcharts that illustrate processing of received control signals by the programmable apparatus in accordance with one or more embodiments of the present invention.

FIGS. 8A to 8J are non-limiting, exemplary flowcharts that illustrate processing of received control signals by the programmable apparatus in accordance with one or more embodiments of the present invention. As illustrated in FIG. 8A, at operation 412 programmable apparatus 104 is associated with computing device 102 in accordance with operations 208, which lead to operation 414 where programmable apparatus 104 is powered, and operation 416 where apparatus 104 is initialized, with few non-limiting, exemplary initialization data defined by callout 418.

More specifically, as indicated above, keep-alive packets are generated and transmitted at operations 204 or 504 by computing device 102 and received by CPU 302 of programmable apparatus 104, which enable CPU 302 to set a timer to a predetermined time period for receiving a keep-alive packet. As indicated above, keep-alive packets are to enable programmable apparatus 104 to determine that it is still connected to computing device 102 and not operate as a standalone device. In other words, while receiving keep-alive packets, programmable apparatus 104 expects to receive command control signal packets from computing device 102. As further indicated above, keep-alive packets also help programmable apparatus 104 to distinguish between some random noise signal verses a predetermined signal packet (the keep-alive packet) that is recognized by CPU 302 of programmable apparatus 104.

At operation 420, CPU 302 determines if a packet (a keep-alive packet or a command control signal packet, or any packet) is received within a time interval T. If at operation 420 CPU 302 determines that no packet is received within time interval T, CPU 302 will operate programmable apparatus 104 as an unplugged standalone device at operation 426 (detailed below).

If CPU 302 at operation 420 determines that no packet is received within the predetermined time (which most likely means standalone operation), CPU 302 at operation 426 (detailed below) simply executes a selected configuration profile. If none is selected, then default configuration profile is executed by CPU 302. There are many reasons why packets may not be received on time or at all, for example, transmission of data may be fully completed or the user may have detached programming apparatus 104 from computing device 102, etc.

Regardless of the reasons for not receiving a packet, if at operation 420 CPU 302 determines that a packet is not received within the time set, programmable apparatus 104 via CPU 302 is switched to operate in standalone mode and functions in accordance with one of its saved configuration profiles, and executed as detailed below. For example, if programmable apparatus 104 as the intelligent micro-spotlight lighting fixture was configured to blink a red color light, then at operation 426 programmable apparatus 104 will simply blink red color light. If CPU 302 at operation 420 determines that a packet is received within a time interval T but that the received packet is not the appropriate packet expected within the time interval T (i.e., a keep-alive or a command control signal as determined by operations 424, 428, 430, 432, and 434 detailed below), CPU 302 loops or directs operations to operation 426 when time interval T expires, enabling programmable apparatus 104 to operate as standalone device.

If CPU 302 at operation 420 determines that a packet is received within a time interval T, at operation 424 CPU 302 determines if the packet is a keep-alive packet (based on packet header information). If CPU 302 determines that the keep-alive packet is received at operation 424 (based on keep-alive packet payload and trailer), CPU 302 at operation 422 resets duration of the time period of the timer to the predetermined time interval T, with operations 420 and 424 repeated until a command control signal packet is received within time interval T or, if no packet (or inappropriate packet) is received within time interval T, operations would be directed to unplugged operation 426 as indicated above when time internal T expires.

CPU 302 determines (based on packet header information) at operations 428, 430, 432, and 434 a type of command control signal packet received (e.g., record or store command packet, single command output packet, playback packet, or clear memory packet (for recording), etc. and executes the appropriate corresponding one or more predefined processes—store 436, update output buffer 438, playback 440, and or clear memory 442.

Assuming that the packet received is determined by CPU 302 to be a record (or store) packet at operation 428, then as further detailed below, a clear memory predefined process 442 is executed. That is, when the record GUI icon 220 is pressed, only a clear memory packet is transmitted. The GUI icon 256 shown in FIG. 3B-5 then waits in a "ready to record" state where subsequent button presses only send the record command. That is, when record GUI icon 220 is selected, a clear memory packet is transmitted, with computing device 102 display GUI illustrated in FIG. 3B-5.

Therefore, it is important to note that selecting record GUI icon 220 does not actually transmit a record packet. Such a selection only transmits a clear command and then sets the context of the GUI shown in FIG. 3B-5 to transmit a record packet for each keystroke thereafter.

In general, the header of the generated record command control signal packet includes a configuration profile number and keystroke index, with the payload including the command index number. However, if no configuration profile is selected, default configuration profile number is associated with the header of the record command control signal packet. This way, any recording will be saved as a default configuration profile 224.

Regardless of whether a configuration profile is selected, receipt of record command control signal packet enables programmable apparatus 104 (based on lookup table) to determine that the command control signal packet received is a record packet (operation 428) based on index number of record GUI icon 220, which calls record function of programmable apparatus 104 at operation 434. Selecting record GUI icon 220 only transmits a clear memory packet and sets the context (FIG. 3B-5) so that further keystrokes transmit record packets. The payload of clear memory packet enables operation 442 to be executed to clear the memory block associated with correspondingly index mapped configuration profile N. As indicated by callout 445, computing device 102 also resets its index for tracking the memory of programmable apparatus 104.

Figure 8B:
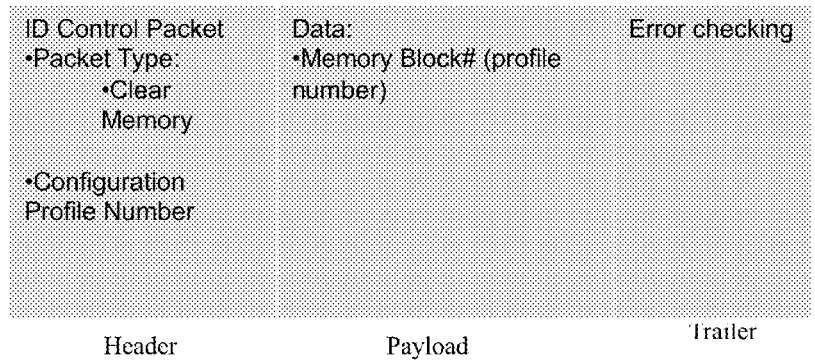
Figure 8B:
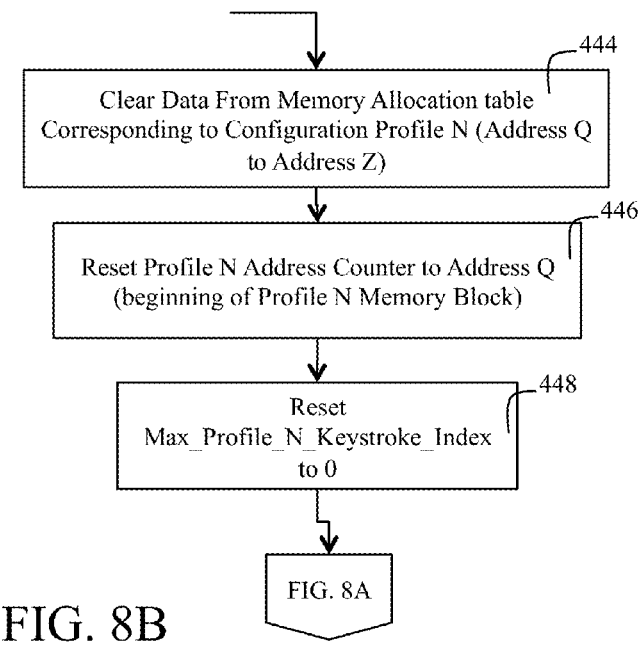
Figure 8C:
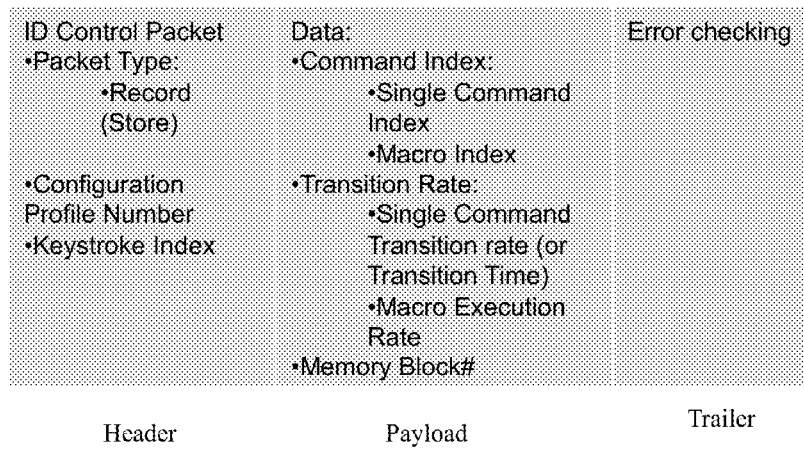
Figure 8C:
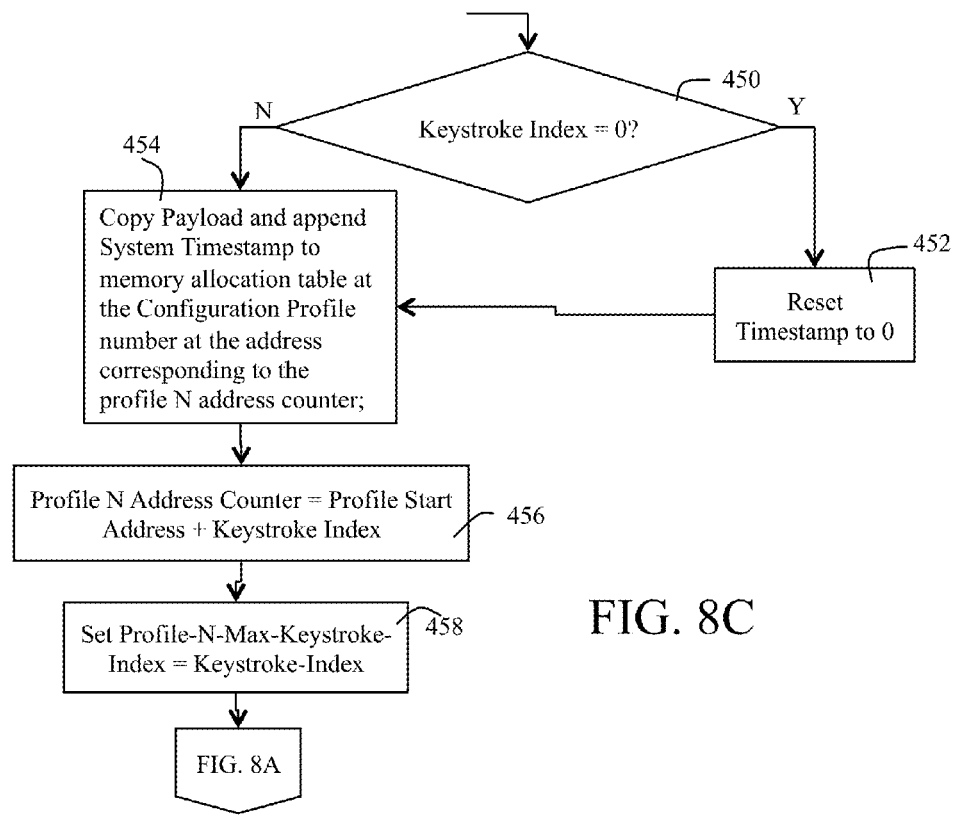

FIG. 8B is a non-limiting, exemplary flowchart diagram, detailing clear memory predefined process 442. A generic clear memory packet is also shown in FIG. 8B. FIG. 8C is a non-limiting, exemplary flowchart diagram, detailing record predefined process 436 in accordance with one or more embodiments of the present invention. A generic record packet is also shown in FIG. 8C.

As illustrated in FIG. 8B, when record GUI icon 220 is selected, a clear memory packet is generated and transmitted by computing device 102. The clear memory packet includes a configuration profile number, which point to a specific address of a specific memory location (block). As shown in FIG. 8B, at operation 444 CPU 302 clears data from memory allocation table corresponding to Profile N (memory block number N) from memory address Q to memory address Z of the memory block N.

At operation 446 CPU 302 resets profile N address counter to address Q (beginning of memory block of configuration profile N) and at operation 448 CPU 302 resets Maximum Profile N Keystroke Index to 0, which may have been pointing to the final or some random memory address. Thereafter, control is redirected to operation 422 while record packet is processed at operation 436 (FIG. 8C). It should be reemphasized that the record command is only transmitted when a button is tapped in the context of FIGS. 3B-5 and 3B-6. Pressing record GUI icon 220 only transmits a clear memory command and sets the GUI context to FIG. 3B-5 to actually receive recording data.

As illustrated in FIG. 8C, CPU 302 at operation 450 determines if keystroke index (from the header of the record packet) is zero. Keystroke index equaling to zero means that it is the very first command being received and hence, system timestamp should also be reset to zero (at operation 452). If CPU 302 determines at operation 450 that the keystroke index is not zero, system timestamp will continue to count time and operation 454 is executed.

CPU 302 at operation 454 simply copies payload of the record packet and appends system timestamp data (e.g., from system clock signal whether internal or external to fixture 104) to memory allocation table at location corresponding to the profile number N (memory block N) at the address corresponding to the profile N address counter. At operation 456, profile N address counter is set to equal to profile N start address plus keystroke index by the CPU 302.

The keystroke index is incremented by computing device 102 and transmitted as part of the header of the record packet, which is used by programmable apparatus 104 to increment the profile N address counter. CPU 302 at operation 458 sets the profile N maximum keystroke index equal to the keystroke index received from computing device 102, and returns operations to predefined process—update output buffer operation 438 in FIG. 8A. Profile N maximum keystroke index points to the current final address (the furthest address) within memory location N. Accordingly, when playing back a recorded configuration profile N, programmable apparatus 104 uses the profile N maximum keystroke index as the final memory address required to be executed.

As indicated above, the recording of command sequences is in real time (or "live"), using timestamp data and the resulting output while recording or manipulating any of the GUIs is also in real time. For example, users may tap record GUI icon, 220 which places both computing device 102 and apparatus 104 in ready mode to record. Next, users may tap red GUI icon 238. Actual selection of red GUI icon 238 after selecting record GUI icon 220 may take place as quickly or as slowly or late as needed as recoding does not commence until a first keystroke.

Users may then wish to wait 1 second before selecting a next color, for example, white GUI icon 250, then wait another 1 second and select stop GUI icon 254. Selection of stop GUI icon 254 enables transmission of a final white command (again) with a new timestamp data that is 1 second after the selection of white GUI icon 254.

As users enter the red GUI icon while recording, programmable apparatus 104 also outputs a red light until (e.g., 1 seconds) the users selects a white GUI icon where apparatus 104 outputs a white light. This way, when play GUI icon 222 is selected (after recording is stopped), programmable apparatus 104 is instructed by saved data to play back the saved configuration profile exactly as it was recorded live. That is, programmable apparatus 104 would output a red light, wait 1 second (from timestamp data saved), and then output a white light for 1 second. When powered in standalone mode (not connected to any device), programmable apparatus 104 will not receive any keep-alive signals within the time interval duration T, which means that if powered ON, programmable apparatus 104 will continuously and repeatedly replay any one of the selected recorded and saved configuration profiles.

Figure 8D:
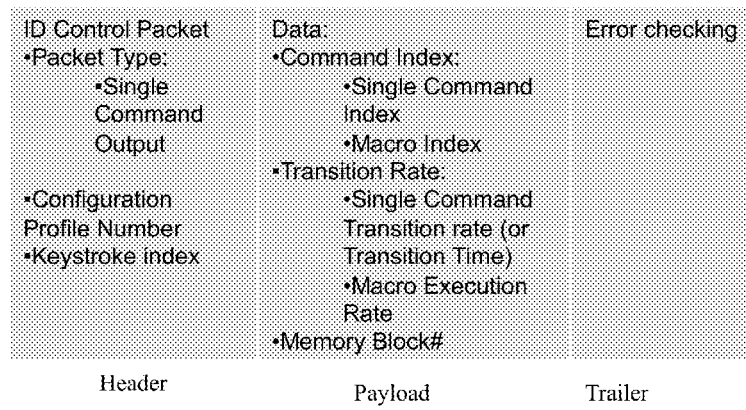
Figure 8D:
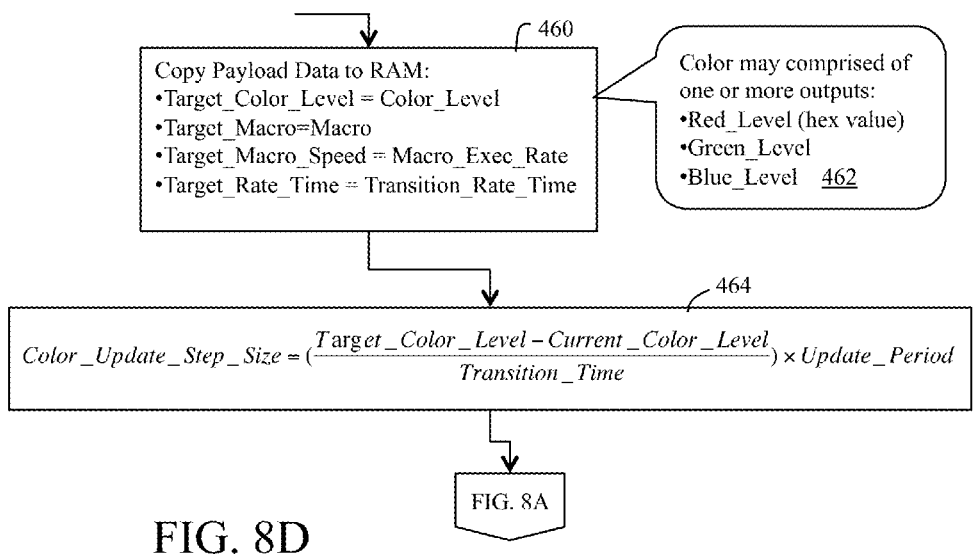
Figures 1, 8E:
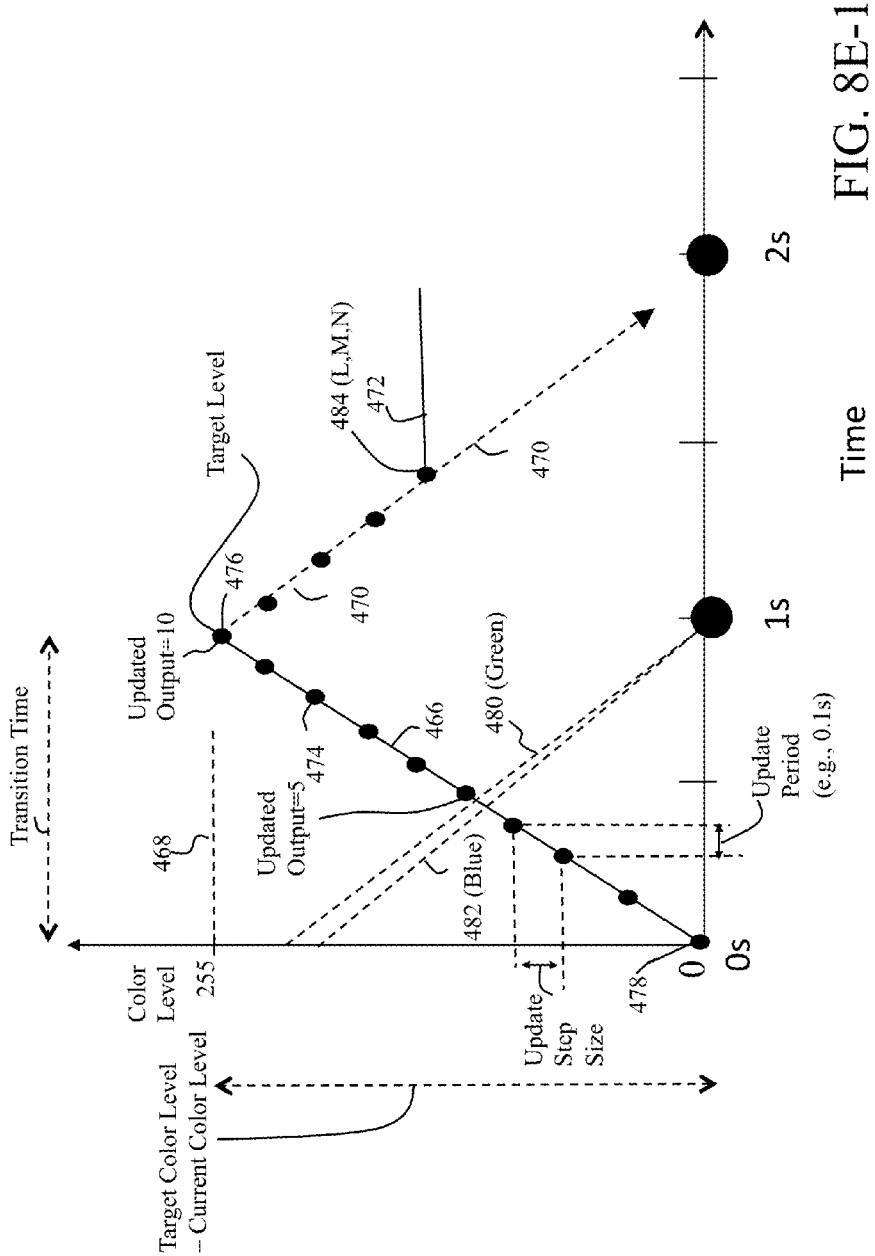
Figures 2, 8E:
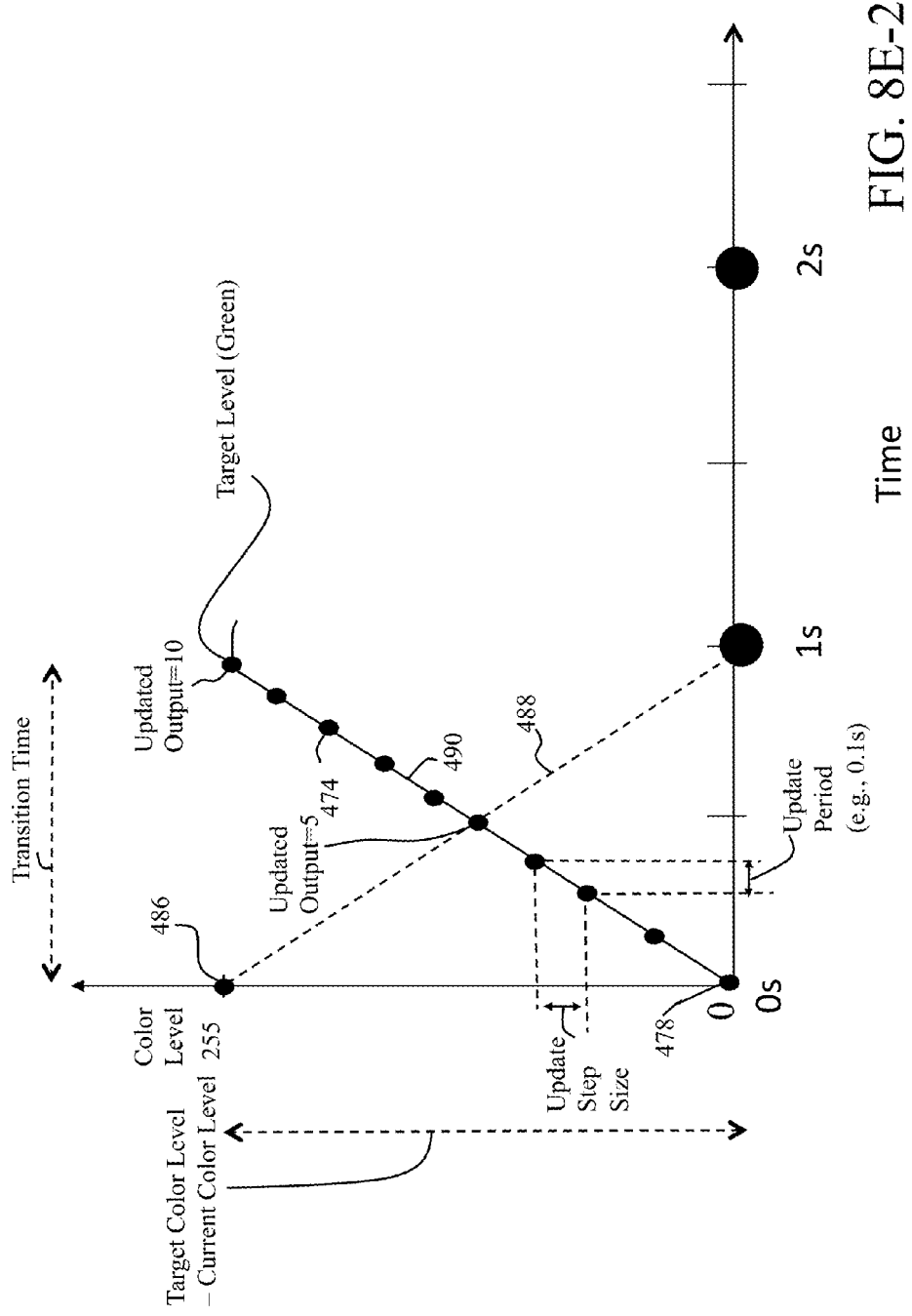
Figures 3, 8E:
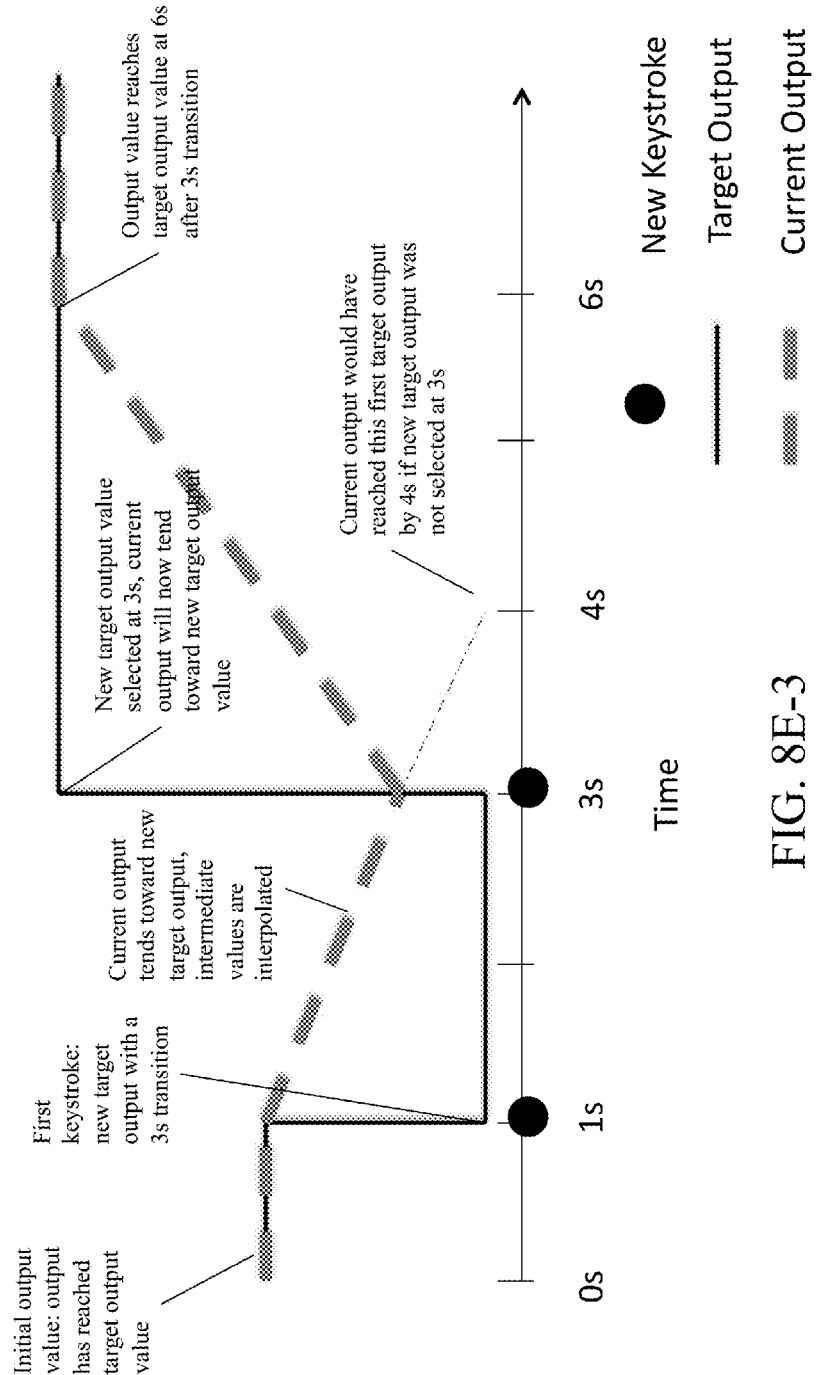

Referring back to FIG. 8A, after completion of operation 458 (FIG. 8C), CPU 302 executes update output buffer operation 438 (FIG. 8A), details of which are shown in FIGS. 8D and 8E. As indicated above, the output of programmable apparatus 104 while recording or manipulating any of the GUIs is also in real time, and defined by a single command output packet and hence, update output buffer operations 438 detailed in FIG. 8D are part of the overall output process of programmable apparatus 104. Update output buffer operations 438 shown in FIG. 8D enable buffering (and eventually output of) explicit as well as transitional color data by extrapolation based on the end states or end data points of color commands.

As illustrated in FIG. 8D, after execution of the predefined processes—store operation 436, CPU 302 executes update output buffer operation 438 as part of the overall output process of programmable apparatus 104, which includes copying payload data to RAM of the programmable apparatus 104. Accordingly, command index and transition rate of the payload are copied into RAM at operation 460 for further processing by CPU 302. For example, if a single command index (referring to a selected color on the color palette 218), then Color_Level value from payload is assigned to Target_Color_Level, and if transition rate included, then single command transition rate is assigned to Target_Fade_Time. Alternatively, if a macro index (referring to selection of one of the macro GUI icons 228), then Maco_Index value is assigned to Target_Macro, and if transition rate included, then Macro Execution rate is assigned to Target_Marco_Speed.

As indicated by callout 462, a color may comprise of one or more outputs or color channels. For example, if color is defined by RGB color code for example, then operations 460 and 464 are executed for each color output or color channel to determine color update step size for the specified color channel. For example, if color red (R=255, G=0, B=0) is selected as the first input color (first end point) with a transition rate (slow fade) to color blue (R=0, G=0, and B=255) as the second end point, operations 460 and 464 must be calculated for all three color channels RGB. As a specific example, Color_Level$_R$ may be a value for Red, Color_Level$_G$ for Green, and Color_Level$_B$ for Blue, and so on. The term "level" in FIG. 8D refers to the color code value for example, Red=(255,0,0).

CPU 302 uses the data in RAM to calculate update step size required to vary an attribute of a function (e.g., color attribute "blue") towards desired attribute of a next function (e.g., color attribute "red") using operation 464. It should be noted that the rate of update step size calculations are based on the arbitrary time step (or update period) of 0.1 s described above. This means that a new update step size is determined every 0.1 second update period. Of course, the smaller the arbitrary time step or update period (e.g., 0.01 seconds), the higher the number of updates (100 updates per second), and the smaller (more granulated) update step size. It should be noted that a minimum transition time is that of the update period (in this case 0.1 second). Specifically, transition time≥Update period, which means that transition time will never be allowed to be zero as that would generate a divide by zero error.

After operation 464 for each update step of each channel, the resulting color update step size for each channel is stored in RAM, with CPU 302 directing operations back to main operations shown in FIG. 8A. CPU 302 also copies color update step size data for that channel to output routine shown in FIG. 8F, where the final output routine shown in FIG. 8G finally outputs the actual color of light (detailed in FIGS. 8E-1 to 8E-3).

FIG. 8E-1 is a non-limiting, exemplary graphical illustration that maps color light outputs resulting from executing operation 464 for a single color channel. It should be noted that it is only for discussion purposes that only a single color channel on a single graph is illustrated. For multi-color channels for example, separate graphs similar to the graph illustrated in FIG. 8E may be used to represent the remaining color channels. Using a single red color channel with exemplary RGB color code value (255,0,0) as an example of final desired output value 476 from a random color value 478 of (0,X,Y) with 1 second transition rate, the graph illustrates a solid line 466 for a plurality of red color outputs with start color value of (0,X,Y) at zero seconds (first end point 478) and a value of red=(255,0,0) at end of one second (second end point 476), including intermediate colors 474 (between some color value (0,X,Y) and red=(255,0,0)).

It should be noted that color value (0,X,Y) at point 478 means that the current value of red color channel is zero, which means that it is not a red color but some other color with RGB value of (0,X,Y) as the starting point that is output. This would mean that the transition time from some color value of (0,X,Y) to final red (255,0,0) for that channel is 1 second, divided into 10 steps (of 0.1 second per step). Accordingly, there are 10 output updates in one second per color channel. This means that CPU would execute operation 528 (FIG. 8F) 10 times per second for each color channel to generate 10 color update step sizes for each color channel to generate 10 updated intermediate color outputs 474 for each color channel, resulting in, for example, (0,X,Y) . . . (51,M,N) . . . (102,V,W) . . . until red channel reaches the target red=(255,0,0) at point 476. Accordingly, intermediate colors 474 represented are also output, but step from some value (0,X,Y) towards desired red color value (255,0,0). As further illustrated, as the target red color (255,0,0) is reached, the other color channels (e.g., Green and Blue) shown by respective dashed lines 480 and 482 calculated by operation 464 are stepped towards zero at the 1-second transition deadline. It is important to understand that operation 464 in FIG. 8D is executed once to determine color update step size when record command is received. Accordingly, it is operation 528 in FIG. 8F that is executed repeatedly to actually move the current output towards the desired output.

As another simple example, FIG. 8E-2 illustrates super imposing of two channels when users select a blue color at start value 486 (0,0,255) shown by broken line 488 with 1 second transition rate, and next selecting a green color (0,255,0) shown by solid line 490. That means that the fixture 104 outputs a blue light while transitioning to green in one second. In this instance, the blue channel represented by dashed line 488 decrease values from 255 to 0 while the green channel output represented by solid line 490 increases values from 0 to 255. The blue channel reaches the value 0 and the green channel reaches the value 255 in one second while the red channel remains at 0 at all times. Therefore, a transition of RGB values (0,0,255) to (0,255,0) is achieved.

As another simple example illustrated by dashed lines 468 in FIG. 8E-1, users may select only blue GUI icon 246 from start (0,0,255), which would mean that both the current as well as the target color levels are equal, with red and green channels zero. In that case, subtracting current color level (0,0,255) from target color level (0,0,255) in operation 464 would result in zero (since they both have the same value), which would mean that color update step size would be zero. This means that CPU would execute operation 528 (FIG. 8F) 10 times per second for each color channel to generate 10 color update step sizes for each color channel with values zero to generate 10 updated intermediate color outputs per color channel, all of which will have a value of blue=(0,0,255).

Referring to FIG. 8E-1, as yet another simple example, while outputting red=(255,0,0) light at end point 476, the user may select a new target value green (0,255,0) with a 1 second transition time. At this instant the actual output value red=(255,0,0) as shown by dashed line 470 will start to fade into the new target value green=(0,255,0) at a 1 second transition time (this means the actual output will reach the target output of green=(0,255,0) at 2 seconds if the target output value green=(0,255,0) is not changed before time reaches 2 seconds). However, in this case the user selects a new target value 484 (L,M,N) at 1.5 seconds with a 1 second transition (0.5 seconds into the first 1 second transition). At this instant, the output will no longer fade into the original target output green=(0,255,0) with 0.5 second to go, it will instead fade toward the new target output (L,M,N) as shown by line 472 and attempt to reach the new target color (L,M,N) with a 1 second transition at 2.5 seconds. With this scheme, the user is able to activate output values smoothly between target values. One should note target values have a limited palette (e.g. only 20 colors selectable on a screen) compared to the overall achievable output from fixture 104 (3 channels of 8 bit color would result in over 16 million possible output colors). Using this fading scheme, the user could achieve a vast number of "in between" outputs 474 with a limited palette of target outputs. The limited color palette is also very important in reducing the memory requirements for storage, e.g. sending information about which 1 of 20 colors (in a reduced palette) chosen only requires 5 bits of information to encode instead of 24 bits. Having a reduced palette also makes color selection easier for the novice user.

FIG. 8E-3 is another graphical representation of the same concept of color output transitions/fading disclosed above in view of FIG. 8E-1, illustrated for purposes of discussions. As illustrated, fixture 104 starts out at a default output value. 1 second later the user selects a new target value with a 3 second transition time. At this instant the actual output value will start to fade into the new target value at a 3 second transition time (this means the actual output will reach the target output at 4 seconds if the target output value is not changed before time reaches 4 seconds). However, in this case the user selects a new target value at 3 seconds with a 3 second transition (2 seconds into the 3 second transition). At this instant, the intelligent fixture output will no longer fade into the original target output with 1 second to go, it will instead fade toward the new target output and attempt to reach the new target color (with a 3 second transition) at 6 seconds.

Figure 8F:
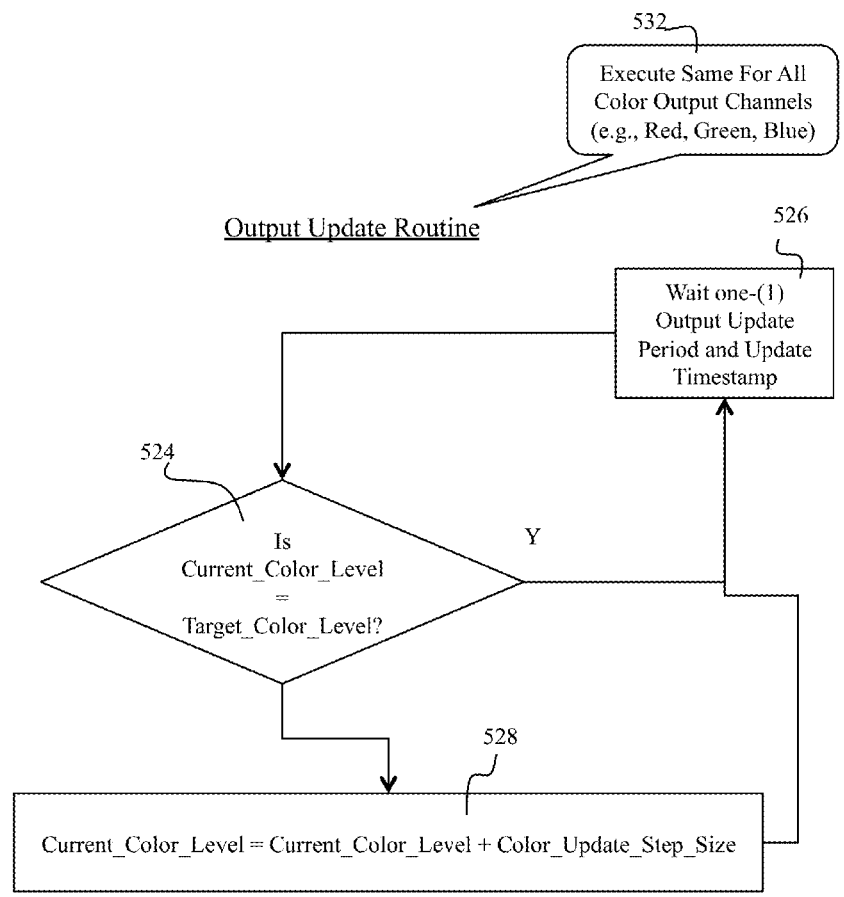
Figure 8G:
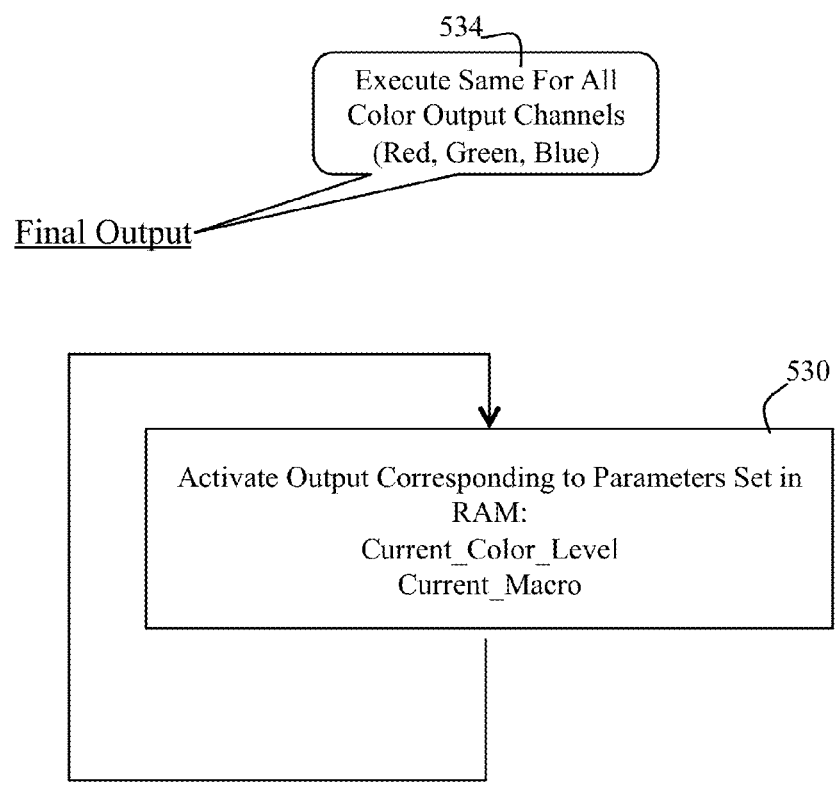

As indicated above, what is actually output (shown by FIGS. 8E-1 to 8E-3) after operation 464 for each update step size of each channel is processed by output routine shown in FIG. 8F and final output as shown in FIG. 8G. In other words, once as color update step size for a channel in operation 464 is determined for a color channel, CPU 302 at operation 524 determines if the Current Color Level for that channel equals the Target Color Level for that channel.

If at operation 524 CPU 302 determines that the Current Color Level for the channel equals the Target Color Level for the channel, CPU 302 waits one—(1) output update period (e.g., 0.1 s) and updates timestamp data at operation 526. Otherwise, CPU at operation 528 sets current color level for the specified channel to be current color level (for that channel)+color update step size (for that channel). In other words, using color update step size data, operation 528 determines the actual current color level for a specified channel. The current color level is saved in RAM, with CPU 302 directing operations to final output illustrated in FIG. 8G.

At operation 530 of FIG. 8G, CPU 302 outputs the actual color (current color level determined by output routine of FIG. 8F) and or current macro from RAM by well-known techniques such as Pulse Width Modulating (PWM) the LED drivers (FIGS. 6A and 6B) to output current color level for that channel. Accordingly, as indicated by respective callouts 532 and 534, output routine shown in FIG. 8F and final output in FIG. 8G are repeated for each color output channel (e.g., may be repeated three times if the RGB color code with three channels is used, just as described above in relation to FIGS. 8E-1 to 8E-3). It should be noted that output routine of FIG. 8F and final output of FIG. 8G are routines that continuously loop while receiving a next color update step size and current color level data for a channel. In other words, these routines "run" in the "background" while for example, CPU 302 may redirect operation to main operations shown in FIG. 8A (which may look for a keep alive packet while routines shown in FIGS. 8F and 8G determine current color level and output current color level, for example).

After a recording a desired configuration profile, users may select stop GUI icon 254 (FIGS. 3B-5 and 3B-6) to stop recording. Stop GUI icon 242 generates a command control signal packet that includes the command index of the last command entered as its payload data. For example, if the last command keyed is red GUI icon 238 for recording a desired configuration profile after which stop GUI icon 242 is selected, the command control signal packet for the stop GUI icon 242 would include command index associated or linked to the red GUI icon 238. Accordingly, the final memory address of the memory allocation pointed to by the keystroke index of the stop GUI icon 242 will include a copy of the data of the memory address before the stop GUI icon 242 was selected. Nonetheless, once a stop GUI icon 242 is selected, CPU 302 returns control to operation 420 (FIG. 8A). It is important to note that a final timestamp is appended to the address of the memory location where stop command is saved, which indicates the end time and max keystroke of the sequence. This will provide playback the proper information to know the duration it should hold the last effect before ending (or repeating) the sequence.

Figure 8H:
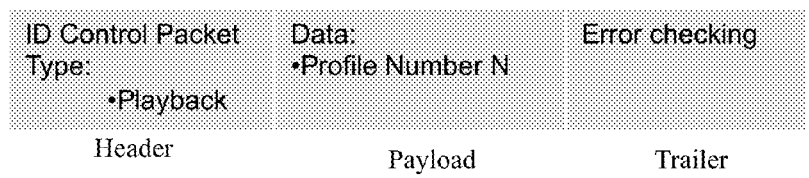
Figure 8H:
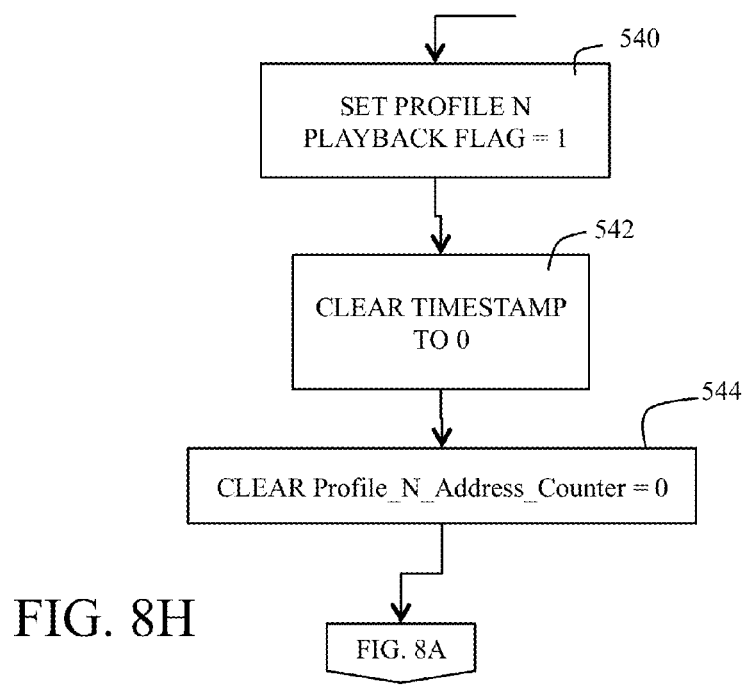

Assuming a sequence of commands is recorded and saved and while programmable apparatus 104 is still connected to computing device 102, selecting a playback GUI icon 222 (FIG. 3B-4) would generate a playback command control signal packet, best shown in FIG. 8H. The playback command control signal packet is identified by operation 432 (FIG. 8A), with CPU directing operations to playback operations 440, detailed FIGS. 8H and 8I. A playback command control signal packet includes a profile number N as its payload (generated by computing device 102) when a user selects the desired profile to be played, which points to a memory location that includes a saved configuration profile N.

As illustrated in FIG. 8H, at operation 540, profile N playback flag is set (which enables profile N to be played—described in detail with respect to FIG. 8I below). CPU 302 at operation 542 clears timestamp to 0, and at operation 544 clears profile N-address counter (sets it to 0). In other words, operations shown in FIG. 8H essentially point to the memory location where the selected configuration is saved and further, point to the exact address within the saved allocated memory location. Further, the operation 542 resets the timestamp to allow the saved configuration to play back every command in sequentially and chronologically (based on saved timestamp data) from start address to end address. FIG. 8H may be thought of as initialization process for playback after which, CPU 302 directs operation to main routine operations illustrated at FIG. 8A to determine if a keep alive packet has been received, but returns operations to playback routine of FIG. 8I due to the already set flag operation 540 (FIG. 8H).

Figure 8I:
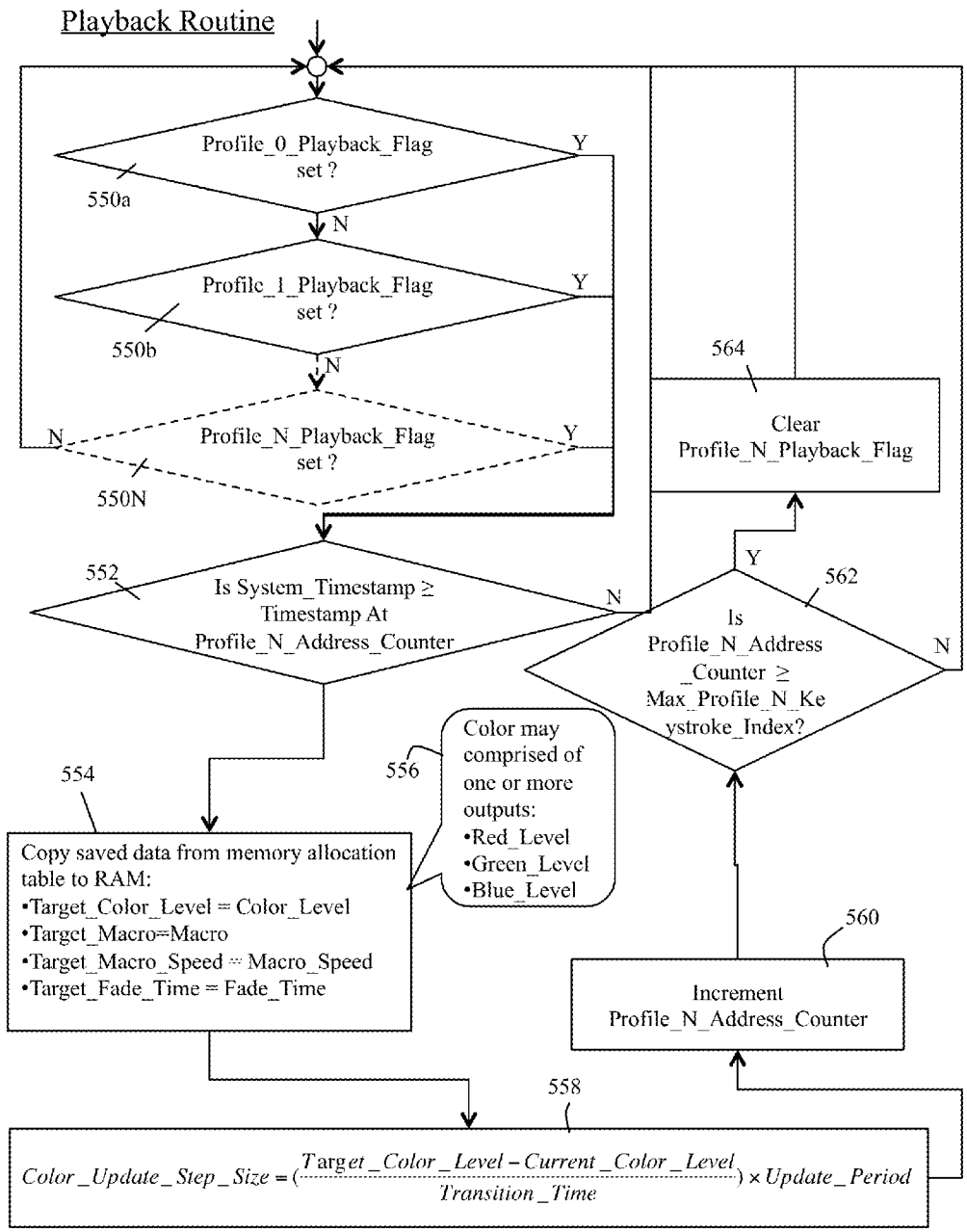

As illustrated in FIG. 8I, as with output routine operations and final output operations illustrated in respective FIGS. 8F and 8G, the playback routine of FIG. 8I is also a continuous loop that is continuously executed in the "background" by the CPU 302. At operations 550 to 550N CPU 302 continuously determines which one of the configuration profiles is it supposed to output based on the set flag operation 540 (FIG. 8H). For example, if playback command control signal packet has profile N as its payload, CPU 302 will set the flag for profile N at operation 540 and at operation 550N commence to execute configuration profile N at memory location N.

Assuming a flag for profile configuration N is set, CPU 302 at operation 552 determines if system timestamp is greater than or equal to timestamp at profile N address counter. In other words, the current system timestamp must be at least equal to saved timestamp data at the memory address pointed to by profile N address counter. This ensures sequential and chronological executions of saved commands in the order and with respect to timing data they were saved.

If CPU 302 at operation 552 determines that system timestamp is not greater than or equal to timestamp at profile N address counter, operations are looped as illustrated until system timestamp equals or is greater than the timestamp saved at the memory address pointed to by the profile N address counter.

If CPU 302 at operation 552 determines that system timestamp is greater than or equal to timestamp at profile N address counter, CPU 302 at operation 554 copies saved data from the memory address of the memory block N pointed to by the profile N address counter into RAM. As indicated by callout 556, a color may comprise of one or more outputs or color channels. CPU 302 at operation 558 calculates color update step size. Operations 554 and 558 function similar to operation 460 and 464 in FIG. 8D described in detail above, with color update step size saved in memory, used by output update routine (shown FIG. 8F) to determine current color level, and actually output by final output (FIG. 8G), with CPU 302 returning operations to operation 560 where the profile N address counter is incremented to point to the next memory address of memory location N that has the saved data of configuration profile N.

At operation 562 CPU 302 determines if the last memory address of the memory location N for the configuration profile has been reached by determining if Profile N address counter is pointing to the maximum profile N keystroke index. If the last memory address of the memory location N is reached, the Flag of profile N playback (that was set by operation 540 of FIG. 8H) is cleared at operation 565, and CPU 302 continuously loops operations 550a to 550N until a new flag is set. Otherwise, operations are ultimately redirected and looped back to operation 552. Reaching the "end of file" determined by operation 562 would mean that last final command within the saved memory address of configuration profile N is executed. It should be noted that the playback is executed only once if programmable apparatus 104 is connected to computing device 102, where control is returned to main operations illustrated in FIG. 8A.

Figure 8J:
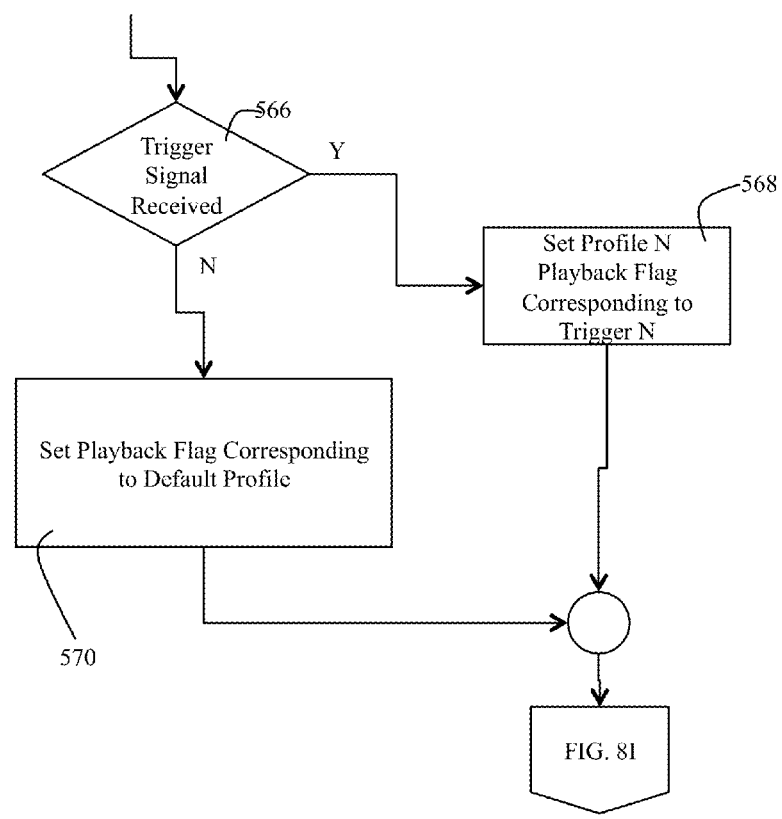

Referring back to FIG. 8A, if at operation 420 CPU 302 determines that no packet is received within time interval T, CPU 302 will operate programmable apparatus 104 as an unplugged standalone device at operation 426, which is detailed in FIG. 8J. As illustrated in FIG. 8J, at operation 566 CPU 302 determines if a trigger signal is received (e.g., from switch shown in FIG. 3C or an encoding scheme shown in FIG. 3D) or some other known method that would enable selection of a non-default profile. If CPU 302 determines at operation 566 that a trigger signal is received for a specific profile (e.g., configuration profile N), CPU 302 sets the profile N playback flag corresponding to Trigger N, similar to the way operation 540 (FIG. 8H) set profile N playable flag. With operation 540, apparatus 104 was connected to the computing device 102, enabling selection via computing device 102 and hence, setting of desired profile N playback flag by apparatus 104. However, with operation 568, apparatus 104 is not connected to computing device 102 and hence, operates in standalone mode but still requires trigger signals (e.g., an encoded signal) for the playback of a desired configuration profile N, which is accomplished by an externally connected switching scheme shown in FIG. 3C or signal encoding scheme shown in FIG. 3D. As illustrated in FIG. 8J, if CPU 302 determines that no trigger signal is received at operation 566, CPU 302 will set the playback flag corresponding to default profile. Regardless of the type of profile flag set, operations are directed to playback routine illustrated in FIG. 8I.

As indicated above when discussing playback routine operations shown in FIG. 8I, when apparatus 104 is connected to computing device 102, apparatus 104 plays back a configuration profile only once with CPU 302 redirecting operations to FIG. 8A. However, when in standalone mode, apparatus 104 repeatedly loops through and continuously plays back the selected configuration until a new trigger signal for another configuration profile is received at which point, it loops through and repeatedly plays back the newly selected configuration. That is, only the default profile is continuously looped until a new trigger signal N is received. If after completing the playback of profile N there is still a trigger N signal, then profile N will be repeated again. If there is no trigger N signal, then the default profile will be played repeatedly. For example, once trigger signal N is received and configuration profile N flag is set, playback routine shown in FIG. 8J (and output routine of FIG. 8F and final output of FIG. 8G) executes configuration profile N at memory location N until the end of file is reach (operation 562) at which point, CPU 302 at operation 564 clears the flag. However, when in standalone mode, operations are redirected to FIG. 8A, with CPU 302 executing operation 426 again (no keep alive packet since no connection with computing device 102), redirecting control to operation 566 (FIG. 8J). Since trigger signal is still being received from an external scheme (FIG. 3C and or 3D), CPU 302 executes operation 568 otherwise, CPU 302 executes operation 570 and control is redirected back to playback routine operations shown in FIG. 8J. This way, playback routine is continuously and repeatedly plays back a selected configuration profile N when apparatus 104 operates in standalone mode.

Although the invention has been described in considerable detail in language specific to structural features and or method acts, it is to be understood that the invention defined in the appended claims is not necessarily limited to the specific features or acts described. Rather, the specific features and acts are disclosed as exemplary preferred forms of implementing the claimed invention. Stated otherwise, it is to be understood that the phraseology and terminology employed herein, as well as the abstract, are for the purpose of description and should not be regarded as limiting. Further, the specification is not confined to the disclosed embodiments. Therefore, while exemplary illustrative embodiments of the invention have been described, numerous variations and alternative embodiments will occur to those skilled in the art. For example, it should be reemphasized that computing device 102 displays one or more graphic user interface (GUI) icons, representing index mapping of one or more functions of the firmware of programmable apparatus 104. In other words, if programmable apparatus 104 is a fog machine or some other programmable device, then computing device 102 would be programmed to display one or more graphic user interface (GUI) icons, representing index mapping of one or more functions of the firmware of the fog machine or any other programmable apparatus. As another example, a plurality of programmable apparatuses operating independently with their respective specific operational configurations may be individually programmed and then operated independently together (for example, by use of a trigger or activation button) to create a lighting show. In other words, instead of using a single, centralized computing system to control plurality of programmable apparatuses, one or more computing devices are used to program each apparatus and allow all programmed apparatuses to operate independently. This forms a distributed computing scheme since no apparatus has any indication of existence of any other apparatus. Prior art uses a centralized computing scheme where a single computer controls a plurality of apparatuses. It should be noted that distributed computing as disclosed is significant in that it is substantially less complex in terms of control of programmable apparatuses (e.g., programming), but also reduced hardware use compared with the centralized scheme. For example, the centralized scheme at the very least would require power as well as a data lines, including various drivers for each apparatus. On the other hand, the distributed scheme in accordance with one or more embodiments of the present invention would only require power cable for each programmable apparatus, and at most a unified switch to trigger the desired configuration profiles on all devices to create a synchronized sequence of output effects. Another non-limiting embodiment is use of any well-known single- or multi-channel controller (for example, as disclosed in U.S. Pat. No. 9,204,519 to Gan et al.) that may include all of the aforementioned logic except the actual light is being output by an external light source. This type of controller is useful for driving a variety of external loads such as LED strip lights and other multi-color light modules. FIG. 6A may also represent a typical multi-channel controller if the disclosed LEDs (i.e., LED 1, LED 2, . . . LED N) were removed and positioned external the fixture. That is, the same FIG. 6A (without the illustrated "LED 1, LED 2, . . . LED N") may correctly represent a typical multi-channel controller. Such variations and alternate embodiments are contemplated, and can be made without departing from the spirit and scope of the invention.

It should further be noted that throughout the entire disclosure, the labels such as left, right, front, back, top, inside, outside, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction, orientation, or position. Instead, they are used to reflect relative locations/positions and/or directions/orientations between various portions of an object.

In addition, reference to "first," "second," "third," and etc. members throughout the disclosure (and in particular, claims) is not used to show a serial or numerical limitation but instead is used to distinguish or identify the various members of the group.

In addition, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of," "act of," "operation of," or "operational act of" in the claims herein is not intended to invoke the provisions of 35 U.S.C. 112, Paragraph 6.

What is claimed is:

1. A system for control of a programmable lighting fixture, comprising:
   a computing device that has a user interface, representing index mapping of one or more functions of a firmware of the programmable lighting fixture, enabling programming of a sequence of operations into an embedded memory of the programmable lighting fixture in real time, with the programmable lighting fixture executing the sequence of operations to output light effects with high fidelity in real time.

2. The system for control of a programmable lighting fixture as set forth in claim 1, wherein:
   the sequence of operations are transmitted as one or more commands in command control signal packets by selection of a GUI icon from the one or more GUI icons.

3. The system for control of a programmable lighting fixture as set forth in claim 1, wherein:
   the programmable lighting fixture is one of a single- or multi-channel controller for driving a variety of external loads.

4. A system for control of a programmable apparatus, comprising:
   a computing device that displays one or more graphic user interface (GUI) icons that represent index mapping of a corresponding set of functions of a firmware of the programmable apparatus, enabling transmission of a command as a command control signal packet to control and program a sequence of operations into embedded memory of the programmable apparatus in real time by selection of one or more GUI icons;
   wherein the programmable apparatus executes the sequence of operations with high fidelity in real time, including extrapolation and execution of non-corresponding set of functions of the firmware in relation to transmitted commands, wherein the non-corresponding set of functions of the firmware are not index mapped and are not displayed by the computing device.

5. A system for control of a programmable apparatus, comprising:
   a computing device that displays one or more graphic user interface (GUI) icons, representing index mapping of one or more functions of a firmware of the programmable apparatus, enabling transmission of a command as a command control signal packet to control the programmable apparatus by selection of a GUI icon from one or more GUI icons;
   a header of command control signal packet having an ID control packet that includes one or more of:
      Packet Type comprising one or more of:
         Record (Store)
         Single Command Output
         Playback
         Clear Memory
      Configuration Profile Number
      Keystroke index
   a payload of command control signal packet having payload data that includes one or more of:
      Command Index comprising one or more of:
         Single Command Index
         Macro Index
      Transition Rate comprising one or more of:
         Single Command Transition rate—Transition Time
         Macro Execution Rate
      Memory Block#
      the programmable apparatus operating in accordance with data modulated by the command control signal packet of the computing device;
   the programmable apparatus seamlessly executing functions sequentially and chronologically associated with the command index, at rates dictated by transition rate and with timing dictated by timestamp of that command.

6. The system for control of a programmable apparatus as set forth in claim 5, wherein:
   the command control signal packet is stored in a non-volatile memory of the programmable apparatus in the order received and assigned a timestamp.

7. The system for control of a programmable apparatus as set forth in claim 6, wherein:
   one or more command control signal packets within the programmable apparatus are grouped to form a configuration profile.

8. The system for control of a programmable apparatus as set forth in claim 7, wherein:
- a default configuration profile is executed and continuously repeated when the programmable apparatus is standalone until a non-default configuration profile is selected, which triggers execution of a non-default configuration profile.

9. The system for control of a programmable apparatus as set forth in claim 5, wherein:
- the programmable apparatus uses the command index to call and execute corresponding one or more functions of the programmable apparatus associated with the command index based on assigned timestamp.

* * * * *